United States Patent
Robinson et al.

(10) Patent No.: US 11,740,496 B2
(45) Date of Patent: Aug. 29, 2023

(54) PUPILLATED ILLUMINATION APPARATUS

(71) Applicant: RealD Spark, LLC, Beverly Hills, CA (US)

(72) Inventors: Michael G. Robinson, Boulder, CO (US); Graham J. Woodgate, Henley-on-Thames (GB); Jonathan Harrold, Leamington Spa (GB)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 17/739,996

(22) Filed: May 9, 2022

(65) Prior Publication Data

US 2022/0404654 A1    Dec. 22, 2022

Related U.S. Application Data

(63) Continuation of application No. 17/387,071, filed on Jul. 28, 2021, now Pat. No. 11,340,482.

(Continued)

(51) Int. Cl.
| | |
|---|---|
| *G02F 1/13* | (2006.01) |
| *F21V 8/00* | (2006.01) |
| *G02F 1/1335* | (2006.01) |
| *B60K 35/00* | (2006.01) |
| *G02F 1/139* | (2006.01) |

(52) U.S. Cl.
CPC ............ *G02F 1/1323* (2013.01); *B60K 35/00* (2013.01); *G02B 6/0053* (2013.01); *G02B 6/0055* (2013.01); *G02B 6/0068* (2013.01); *G02F 1/1393* (2013.01); *G02F 1/133528* (2013.01); *B60K 2370/152* (2019.05); *B60K 2370/23* (2019.05); *B60K 2370/336* (2019.05)

(58) Field of Classification Search
None
See application file for complete search history.

(56) References Cited

U.S. PATENT DOCUMENTS

| | | |
|---|---|---|
| 3,914,022 A | 10/1975 | Kashnow |
| 4,059,916 A | 11/1977 | Tachihara et al. |

(Continued)

FOREIGN PATENT DOCUMENTS

| | | |
|---|---|---|
| CA | 2222313 A1 | 6/1998 |
| CN | 1125943 C | 10/2003 |

(Continued)

OTHER PUBLICATIONS

CN-201880042320.X Notification of the Third Office Action from the Chinese Patent Office dated Dec. 30, 2022.

(Continued)

*Primary Examiner* — Phu Vu
(74) *Attorney, Agent, or Firm* — Penny L. Lowry

(57) ABSTRACT

A switchable backlight for a switchable privacy display apparatus comprises a collimated waveguide, first and second light sources and an optical turning film comprising elongate prismatic elements with facet orientations that pupillate the output of the waveguide in two orthogonal directions for each of first and second light sources. High luminance uniformity is achieved for a head-on user in privacy and public viewing modes and high uniformity of security factor is achieved for off-axis snoopers, with increased speed of privacy switch-on in privacy mode.

51 Claims, 34 Drawing Sheets

Related U.S. Application Data

(60) Provisional application No. 63/114,054, filed on Nov. 16, 2020, provisional application No. 63/112,823, filed on Nov. 12, 2020, provisional application No. 63/058,314, filed on Jul. 29, 2020.

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,099,433 B2 | 8/2021 | Robinson et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,366,358 B2 | 6/2022 | Wu et al. |
| 11,442,316 B2 | 9/2022 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |

(56) References Cited

U.S. PATENT DOCUMENTS

| | | |
|---|---|---|
| 2007/0064163 A1 | 3/2007 | Tan et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |

(56) References Cited

U.S. PATENT DOCUMENTS

| | | |
|---|---|---|
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0110301 A1* | 4/2020 | Harrold ............ G02F 1/133509 |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |

FOREIGN PATENT DOCUMENTS

| | | |
|---|---|---|
| CN | 1776484 A | 5/2006 |
| CN | 101042449 A | 9/2007 |
| CN | 101256251 A | 9/2008 |
| CN | 101454712 A | 6/2009 |
| CN | 101518095 A | 8/2009 |
| CN | 101681061 A | 3/2010 |
| CN | 103473494 A | 12/2013 |
| CN | 103688211 A | 3/2014 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 105842909 A | 8/2016 |
| CN | 106104372 A | 11/2016 |
| CN | 106415342 A | 2/2017 |
| CN | 209171779 U | 7/2019 |
| EP | 1956423 A1 | 8/2008 |
| EP | 2037318 A1 | 3/2009 |
| GB | 2405542 A | 3/2005 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H11174489 A | 7/1999 |
| JP | 2005316470 A | 11/2005 |
| JP | 2005345799 A | 12/2005 |
| JP | 2006139160 A | 6/2006 |
| JP | 2007501966 A | 2/2007 |
| JP | 2007148279 A | 6/2007 |
| JP | 2007273288 A | 10/2007 |
| JP | 2009020293 A | 1/2009 |
| JP | 2011103241 A | 5/2011 |
| JP | 2014032953 A | 2/2014 |
| JP | 2014099363 A | 5/2014 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017117570 A1 | 7/2017 |
| WO | 2018035492 A1 | 2/2018 |
| WO | 2018178790 A1 | 10/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

CN-201980082757.0 Notification of the 1st Office Action of the Chinese Patent Office dated Dec. 5, 2022.
JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
PCT/US2022/045030 International search report and written opinion of the international searching authority dated Jan. 3, 2023.
EP-20754927.0 Extended European Search Report of European Patent Office dated Sep. 19, 2022.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection dated Feb. 17, 2023.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.

(56) References Cited

OTHER PUBLICATIONS

PCT/US2021/029958 International search report and written opinion of the international searching authority dated Aug. 10, 2021.
PCT/US2021/043435 International search report and written opinion of the international searching authority dated Nov. 1, 2021.
PCT/US2021/043444 International search report and written opinion of the international searching authority dated Nov. 1, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium On Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN201880073578.6 Notification of the First Office Action dated Aug. 27, 2021.
CN-201980020303.0—Notification of the First Office Action dated Dec. 16, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP-19825448.4 Extended European Search Report of European Patent Office dated Mar. 10, 2022.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
JP2019-561773 Non-Final Notice of Reasons for Rejection dated Mar. 22, 2022.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
CN201980030279.9 Notification of the First Office Action dated Mar. 29, 2022.
EP-19881483.2 Extended European Search Report of European Patent Office dated Aug. 5, 2022.
JP2020-509511 Non-Final Notice of Reasons for Rejection dated Jul. 19, 2022.
Nelkon et al., "Advanced Level Physics", Third edition with SI units, Heinemann Educational Books LTD, London, 1970.
TW107132221 First Office Action dated Apr. 28, 2022.
EP-20835231.0 Extended European Search Report of European Patent Office dated May 15, 2023.
PCT/US2023/012240 International search report and written opinion of the international searching authority dated Apr. 27, 2023.
PCT/US2023/012243 International search report and written opinion of the international searching authority dated May 10, 2023.

* cited by examiner

Reflectivity

PUPILLATED ILLUMINATION APPARATUS

TECHNICAL FIELD

This disclosure generally relates to illumination from light modulation devices, and more specifically relates to control of privacy display and high efficiency display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is incorporated by reference herein in its entirety.

In a known privacy display the privacy mode is provided by the addition of a removable louver film, such as marketed by 3M Corporation, which may not be reliably or easily fitted or removed by users and therefore in practice, is not assiduously attached by the user every time they are outside the office. In another known privacy display the control of privacy mode is electronically activated but control is vested in the user who must execute a keystroke to enter privacy mode.

BRIEF SUMMARY

According to a first aspect of the present disclosure, there is provided an illumination apparatus comprising: at least one light source arranged to provide input light; a waveguide arrangement comprising at least a first waveguide that extends across a plane and comprises: first and second opposed light guiding surfaces arranged to guide light along the first waveguide, the second light guiding surface being arranged to guide light by total internal reflection; and an input end arranged between the first and second light guiding surfaces and extending in a lateral direction between the first and second light guiding surfaces, the first waveguide being arranged to receive the input light from the at least one light source through the input end, and being arranged to cause light from the at least one light source to exit from the first waveguide through the second light guiding surface by breaking total internal reflection; and an optical turning film component comprising: an input surface arranged to receive the light exiting from the first waveguide, the input surface extending across the plane; and an output surface facing the input surface, wherein the input surface comprises: an array of prismatic elements each comprising a pair of facets defining a ridge therebetween, the ridges extending along an array of lines across the plane in which the input surface extends, wherein the prismatic elements are arranged to deflect the light exiting the first waveguide, the deflection varying in at least one direction across the plane so that the deflected light is directed towards a common optical window in front of the illumination apparatus.

The lines may be curved across the plane so that the deflection varies in a direction that is orthogonal to an optical axis that is normal to the plane, and corresponds to the lateral direction. Advantageously uniformity may be increased in the lateral direction.

The facets may have respective facet angles, defined between a normal to the facet and a normal to the plane, that may vary across the array so that the deflection further varies in a direction orthogonal to the optical axis, and corresponds to a direction that is orthogonal to the lateral direction, so that the deflected light may be directed towards a further, common optical window in front of the illumination apparatus. Facet angles of respective facets, defined between a normal to the facet and a normal to the plane, may vary across the array so that the deflection varies in a direction orthogonal to an optical axis that is normal to the plane, the direction corresponding to a direction orthogonal to the lateral direction. Advantageously uniformity may be increased across the illumination apparatus in the direction orthogonal to the lateral direction.

The first mentioned common optical window and the further common optical window may be defined at different distances in front of the illumination apparatus. Advantageously a wider range of locations for which uniformity is increased is provided.

The first mentioned common optical window and the further common optical window may be defined at the same distance in front of the illumination apparatus. Advantageously the uniformity for an observer at or near the optical window is increased.

The facets may have respective facet angles, defined between a normal to the facet and a normal to the plane, that may vary across the array so that the deflection varies in a direction that is orthogonal to an optical axis normal to the plane and corresponds to a direction orthogonal to the lateral direction.

The lines of the array may have an arithmetic mean tangential angle projected on to the plane of 0° from the lateral direction. Advantageously uniformity may be increased for an on-axis observer.

The lines of the array may have an arithmetic mean tangential angle projected on to the plane that is inclined at more than 0° from the lateral direction. Advantageously uniformity may be increased for an off-axis observer.

The optical turning film component may have a rectangular shape across the plane and the lateral direction may be along a major or minor axis of the rectangular shape. Advantageously a rectangular shape for use in landscape or portrait orientations may be illuminated.

The output surface may be planar. Advantageously the cost of fabrication of the optical turning film component may be reduced.

The facets may have respective facet angles, defined between a normal to the facet and a normal to the plane may be between 40° and 70°, preferably between 42.5° and 65° and more preferably between 42.5° and 62.5°. Advantageously light cones may be directed to desirable optical window locations while achieving increased uniformity.

At least some of the facets may have respective facet angles, defined between a normal to the facet and a normal to the plane, of between 52.5° and 62.5°. In respect of at least some of the facets may have respective facet angles, defined between a normal to the facet and a normal to the plane, of between 42.5° and 52.5°. At least some of the facets may have a respective facet angle, defined between a normal to the facet and a normal to the plane, of between 40° and 52.5°. Advantageously displays may be provided with first and second viewing locations with increased uniformity.

In each pair of facets, a first facet may have a normal on the internal side of the input surface that is inclined towards the input end of the first waveguide and a second facet has a normal on the internal side of the input surface that may be inclined away from the input end of the first waveguide, the first facets having respective facet angles, defined between the normal to the facet and a normal to the plane, that vary across the array so that the deflection varies in a direction that is orthogonal to an optical axis normal to the plane and corresponds to a direction orthogonal to the lateral direction.

The first facets may have respective facet angles, defined between a normal to the facet and a normal to the plane, of between 52.5° and 62.5°. The second facets may have respective facet angles, defined between the normal to the facet and a normal to the plane, that are constant across the array. The second facets may have respective facet angles, defined between the normal to the facet and a normal to the plane, that vary across the array. The second facets may have respective facet angles, defined between a normal to the facet and a normal to the plane, of between 40° and 52.5°. The first facets may have respective facet angles, defined between the normal to the facet and a normal to the plane, that increase across the array with distance from the input end, and the second facets having respective facet angles, defined between the normal to the facet and a normal to the plane, that decrease across the array with distance from the input end. The first facets may have respective facet angles, defined between the normal to the facet and a normal to the plane, of between 42.5° and 52.5° and the second facets have respective facet angles, defined between a normal to the facet and a normal to the plane, of between 42.5° and 52.5°. Advantageously uniformity may be increased.

At least one light source may comprise an array of light sources arrayed across the input end. Advantageously the size of the source may be increased.

The common optical window may be aligned with an optical axis that extends from the centre of the optical turning film component normal to the plane. Advantageously the uniformity may be increased for an on-axis observer.

The common optical window may be offset from an optical axis that extends from the centre of the optical turning film component normal to the plane. Advantageously the uniformity may be increased for an off-axis observer.

The waveguide may further comprise a second input end arranged between the first and second light guiding surfaces opposite to the first mentioned input end, and the illumination apparatus further may comprise at least one second light source arranged to input light into the waveguide through the second input end in an opposite direction from the at least one first mentioned light source. Advantageously first and second illumination profiles may be provided.

The illumination apparatus may further comprise at least one second light source arranged to provide input light in an opposite direction from the at least one first mentioned light source as viewed along the optical axis normal to the plane; the waveguide arrangement may further comprise a second waveguide that extends across the same plane as the first waveguide and may comprise: first and second opposed light guiding surfaces arranged to guide light along the first waveguide, the second light guiding surface being arranged to guide light by total internal reflection; and an input end arranged between the first and second light guiding surfaces and extending in a lateral direction between the first and second light guiding surfaces, the second waveguide being arranged to receive the input light from the at least one second light source through the input end, and being arranged to cause light from the at least one second light source to exit from the second waveguide through the second light guiding surface by breaking total internal reflection, and the input surface of the optical turning film component being arranged to receive the light exiting from the first waveguide and the second waveguide. Advantageously uniformity may be increased.

The lines may be straight and the facets may have respective facet angles, defined between a normal to the facet and a normal to the plane, that vary across the array so that the deflection varies in a direction that is orthogonal to the optical axis and corresponds to a direction orthogonal to the lateral direction so that the deflected light from each input end is directed towards respective common optical windows in front of the illumination apparatus. Advantageously the first and second illumination profiles may provide increased brightness and uniformity across the illumination apparatus.

The deflected light through each input end may be directed towards the same common optical window in front of the illumination apparatus. The respective common optical windows may be in the same location in front of the illumination apparatus. Advantageously display brightness may be increased. Uniformity may be further increased.

The respective common optical windows may be in different locations in front of the illumination apparatus. Advantageously multiple viewing locations with increased uniformity may be provided.

The lines may be curved so that the deflected light input through the first end may be directed towards a common optical window in front of the illumination apparatus and the deflected light input through the second end may be directed towards a virtual common optical window behind the illumination apparatus. Advantageously uniformity may be increased for at least one of the light sources.

The illumination apparatus further comprising a control system may be arranged to control the at least one first light source and the at least one second light source independently. In one mode of operation the control system may be arranged to provide illumination from both the at least one first light source and the at least one second light sources so as to increase spatial uniformity of illumination across the illumination device for at least one viewing location. Advantageously the illumination apparatus may be arranged to switch between at least two different illumination profiles while achieving increased uniformity.

The waveguide may be arranged to cause light from the at least one first light source and the at least one second light source to exit from the waveguide with different angular distributions. Advantageously an illumination apparatus may be arranged to provide illumination for narrow and wider illumination profiles.

The waveguide may be arranged to cause light from the at least one first light source and the at least one second light source to exit from the waveguide with a common angular distribution. Advantageously multiple optical windows may be provided for multiple users or uniformity may be further increased.

The illumination apparatus may comprise: at least one first light source arranged to provide input light; at least one second light source arranged to provide input light in an opposite direction from the at least one first light source, a waveguide arrangement arranged to receive the input light from the at least one first light source and the at least one second light source and to cause light from the at least one first light source and the at least one second light source to exit from the waveguide arrangement by breaking total internal reflection, wherein the waveguide arrangement comprises at least one waveguide; and an optical turning film component comprising: an input surface arranged to receive the light exiting from a waveguide through a light guiding surface of the waveguide by breaking total internal reflection, the input surface extending across the plane; and an output surface facing the input surface, wherein the input surface comprises: an array of prismatic elements each comprising a pair of facets defining a ridge therebetween, the ridges extending along an array of lines across the plane in which the input surface extends, wherein the prismatic elements are arranged to deflect the light exiting the waveguide, the deflection varying in at least one direction across the plane so that the deflected light is directed towards a common optical window in front of the illumination apparatus.

The waveguide arrangement may comprise; a waveguide extending across a plane and comprising: first and second opposed light guiding surfaces arranged to guide light along the optical waveguide, the second light guiding surface being arranged to guide light by total internal reflection, and first and second input ends arranged between the first and second light guiding surfaces and extending in a lateral direction between the first and second light guiding surfaces; wherein the at least one first light source is arranged to input light into the waveguide through the first input end and the at least one second light source is arranged to input light into the waveguide through the second input end, and the waveguide is arranged to cause light from the at least one first light source and the at least one second light source to exit from the waveguide through one of the first and second light guiding surfaces by breaking total internal reflection. Advantageously thickness and cost may be reduced.

The waveguide arrangement may comprise: a first waveguide extending across a plane and comprising first and second opposed light guiding surfaces arranged to guide light along the optical waveguide, the second light guiding surface being arranged to guide light by total internal reflection; and a first input end arranged between the first and second light guiding surfaces and extending in a lateral direction between the first and second light guiding surfaces; wherein the at least one first light source is arranged to input light into the first waveguide through the first input end, and the first waveguide is arranged to cause light from the at least one first light source to exit from the first waveguide through one of the first and second light guiding surface by breaking total internal reflection; a second waveguide extending across the plane in arranged in series with the first waveguide and comprising first and second opposed light guiding surfaces arranged to guide light along the optical waveguide, the second light guiding surface being arranged to guide light by total internal reflection, and a second input end arranged between the first and second light guiding surfaces and extending in a lateral direction between the first and second light guiding surfaces; wherein the at least one second light source is arranged to input light into the second waveguide through the second input end, and the second waveguide is arranged to cause light from the at least one second light source to exit from the second waveguide through one of the first and second light guiding surfaces by breaking total internal reflection, and wherein the first and second waveguides are oriented so that at least one first light source and at least one second light source input light into the first and second waveguides in opposite directions. Advantageously luminance uniformity may be increased.

According to a second aspect of the present disclosure, there is provided a backlight apparatus comprising: an illumination apparatus according to the first aspect; and a rear reflector arranged to receive light exiting from the first surface of waveguide and direct it back through the waveguide. Advantageously efficiency of collection of light from the illumination apparatus is increased.

According to a third aspect of the present disclosure, there is provided a display apparatus comprising: a backlight apparatus according to the second aspect; and a spatial light modulator arranged to receive light from the backlight apparatus. Advantageously a display may be provided with high uniformity for desirable viewing locations. The viewing locations may be controlled by switching of the backlight light sources. The size of the illumination cones may be varied, to achieve switchable display viewing freedom.

The display apparatus may further comprise: at least one display polariser arranged on a side of the spatial light modulator; an additional polariser arranged on the same side of the spatial light modulator as the display polariser; and at least one polar control retarder arranged between the display polariser and the additional polariser, wherein the at least one polar control retarder may include a switchable liquid crystal retarder comprising a layer of liquid crystal material. Advantageously a switchable privacy display may be provided with a privacy mode and public mode of operation. The polar control retarder may cooperate with a switchable backlight to achieve increased viewing freedom in a public mode of operation. Uniformity of privacy mode security factor may be increased.

According to a fourth aspect of the present disclosure, there is provided a vehicle having a display apparatus according to the third aspect mounted therein. Advantageously occupants may be illuminated with high efficiency and may be provided with high luminance uniformity.

According to a fifth aspect of the present disclosure, there is provided an optical turning film component comprising: an input surface for receiving light exiting from a waveguide through a light guiding surface of the waveguide by breaking total internal reflection, the input surface extending across a plane; and an output surface facing the input surface, wherein the input surface comprises: an array of prismatic elements each comprising a pair of facets defining a ridge therebetween, the ridges extending along an array of lines across the plane in which the input surface extends, wherein the prismatic elements may be arranged to deflect the light exiting the waveguide, the deflection varying in at least one direction across the plane so that the deflected light is directed towards a common optical window in front of the illumination apparatus.

According to a sixth aspect of the present disclosure, there is provided illumination apparatus comprising: a waveguide extending across a plane and comprising: first and second opposed light guiding surfaces arranged to guide light along the optical waveguide, the second light guiding surface being arranged to guide light by total internal reflection, and an input end arranged between the first and second light guiding surfaces and extending in a lateral direction between the first and second light guiding surfaces; at least one light source arranged to input light into the waveguide through the input end, wherein the waveguide is arranged to cause light from the light sources to exit from the waveguide through the second light guiding surface by breaking total internal reflection; and an optical turning film component comprising: an input surface arranged to receive the light exiting from the waveguide, the input surface extending across the plane; and an output surface facing the input surface, wherein the input surface comprises: an array of prismatic elements each comprising a pair of facets defining a ridge therebetween, the ridges extending along an array of lines across the plane in which the input surface extends, wherein the prismatic elements are arranged to deflect the light exiting the waveguide, the deflection varying in at least one direction across the plane so that the deflected light is directed towards a common optical window in front of the illumination apparatus. The illumination apparatus may provide light to a common spatial location across at least part of the illumination apparatus. An observer viewing the illumination apparatus at or near the common optical window may advantageously be provided with increased uniformity of luminance across the illumination apparatus. An environmental illumination apparatus may provide a focused illumination region at a desirable working distance.

Embodiments of the present disclosure may be used in a variety of optical systems. The embodiments may include or work with or in cooperation with a variety of illuminators, environmental lighting, interior and exterior automotive illumination, projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
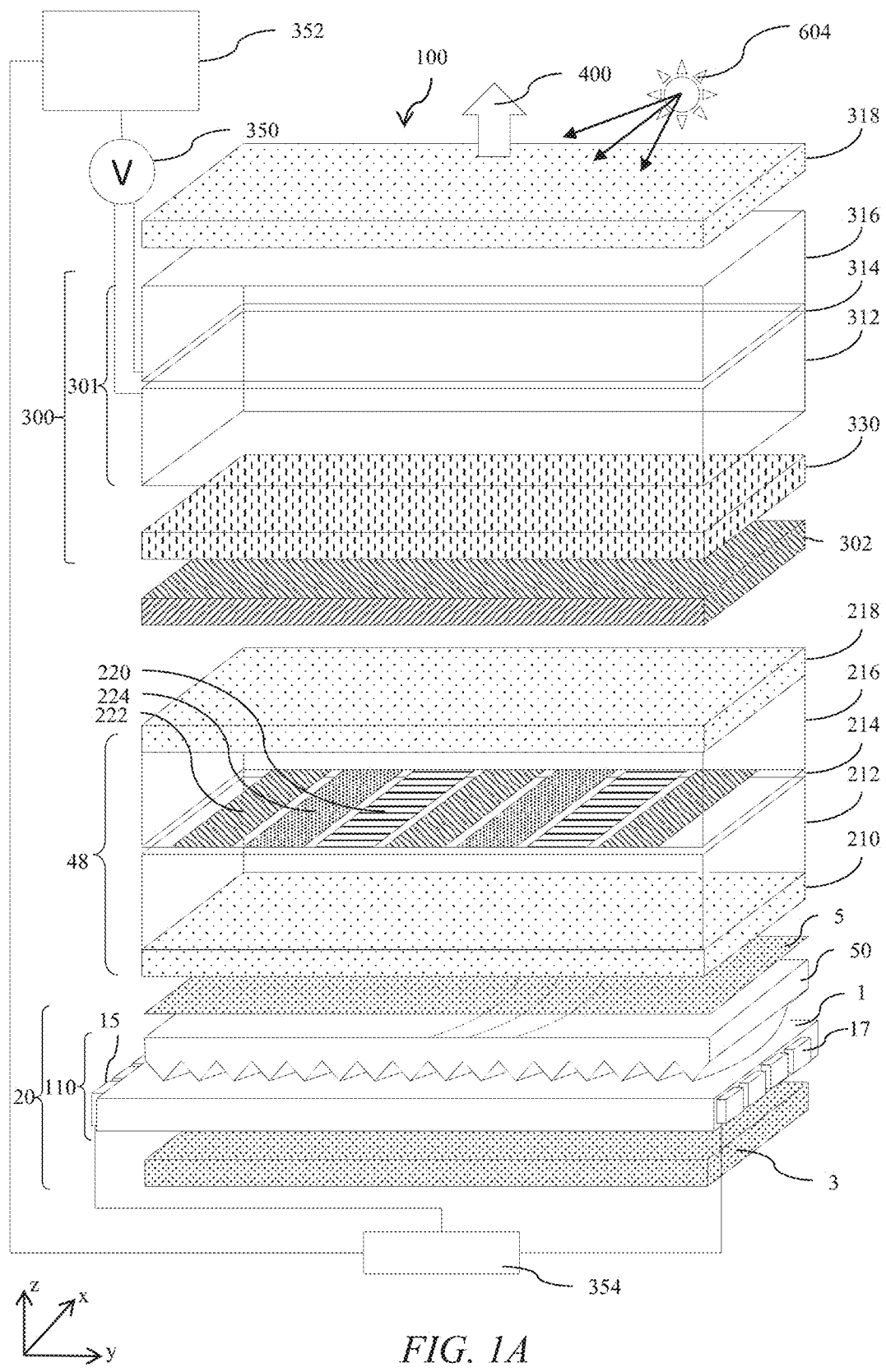
FIG. 1A is a schematic diagram illustrating a front perspective view of a switchable privacy display comprising a light pupillating turning film.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance Δn·d that varies with wavelength λ as $$\Delta n \cdot d / \lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

Terms related to privacy display appearance will now be described.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y + R)/(Y - K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y + K \sim P \cdot L \qquad \text{eqn. 6}$$

The visual security level may then be further given as:

$$VSL = \frac{(C + I \cdot \rho/\pi \cdot (C+1)/(P \cdot L))}{(C - 1)} \qquad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL=1+I \cdot \rho/(\pi \cdot P \cdot L)$$  eqn. 8

The perceptual image security may be determined from the logarithmic response of the eye, such that the security factor, S is given by:

$$S=\log_{10}(V)$$  eqn. 9

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation $I(\theta)$ of illuminance of a substantially Lambertian emitting lightbox with polar viewing angle was determined by measuring the variation of recorded reflective luminance with polar viewing angle considering the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(q=0)$, for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S>1.8 provides full image invisibility, independent of image content for all observers.

In comparison to privacy displays, desirably wide-angle displays are easily observed in standard ambient illuminance conditions. One measure of image visibility is given by the contrast sensitivity such as the Michelson contrast which is given by:

$$M=(I_{max}-I_{min})/(I_{max}+I_{min})$$  eqn. 10 and so:

$$M=((Y+R)-(K+R))/((Y+R)+(K+R))=(Y-K)/(Y+K+2 \cdot R)$$  eqn. 11

Thus the visual security level (VSL), is equivalent (but not identical to) 1/M. In the present discussion, for a given off-axis relative luminance, P the wide-angle image visibility, W is approximated as $$W=1/VSL=1/(1+I \cdot \rho/(\pi \cdot P \cdot L))$$  eqn. 12

In the present discussion the colour variation $\Delta \varepsilon$ of an output colour $(u_w'+\Delta u', v_w'+\Delta v')$ from a desirable white point $(u_w', v_w')$ may be determined by the CIELUV colour difference metric, assuming a typical display spectral illuminant and is given by:

$$\Delta \varepsilon = (\Delta u'^2 + \Delta v'^2)^{1/2}$$  eqn. 13

Catadioptric elements employ both refraction and reflection, which may be total internal reflection or reflection from metallised surfaces.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

A switchable privacy display apparatus will now be described.

Figure 1B:
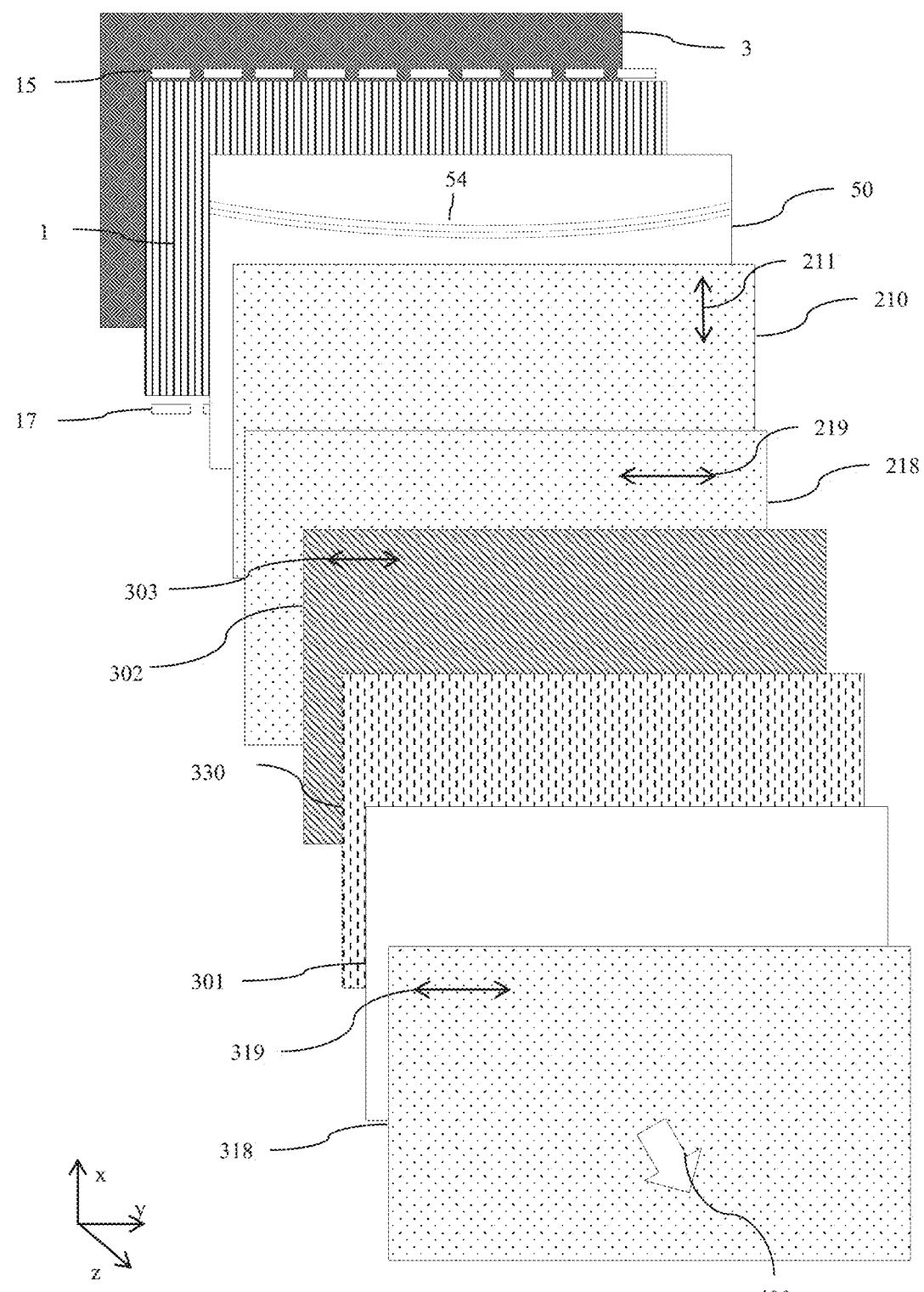
FIG. 1B is a schematic diagram illustrating a front perspective view of a stack of optical components in the apparatus of FIG. 1A.

FIG. 1A is a schematic diagram illustrating a front view of a privacy display apparatus 200 comprising a privacy display device 100 that is controlled by a privacy control system 350, 352, 354. The display device 100 displays an image; and FIG. 1B is a schematic diagram illustrating a front perspective view of a stack of some of the optical components in the apparatus of FIG. 1A.

Display apparatus 100 comprises a backlight apparatus 20; and a spatial light modulator 48 arranged to receive light from the backlight apparatus 20.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Optionally a reflective polariser 208 may be provided between the input display polariser 210 and backlight 20 to provide recirculated light and increase display efficiency. Advantageously efficiency may be increased.

The backlight apparatus 20 comprises a rear reflector 3; and an illumination apparatus 110. The illumination apparatus comprises a waveguide arrangement comprising waveguide 1, and optical turning film component 50 and arranged to receive light exiting from the first surface of waveguide 1 and direct it back through the waveguide 1.

The waveguide 1 further comprises a second input end 4 arranged between the first and second light guiding surfaces 6, 8 opposite to the first mentioned input end 2, and the illumination apparatus 110 further comprises at least one second light source 17 arranged to input light into the waveguide 1 through the second input end 4. In further embodiments described hereinbelow the second light source 17 may be omitted. Advantageously cost and bezel width may be reduced.

Optical stack 5 may comprise diffusers, optical turning film components and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

Display apparatus 100 further comprises: at least one display polariser that is the output polariser 218 arranged on a side of the spatial light modulator 48 that in FIG. 1A is the output side. Alternatively the display polariser may be the input polariser 210 arranged on a side of the spatial light modulator 48 that is the input side. Additional polariser 318 is arranged on the same side of the spatial light modulator 48 as the display polariser 218. Polarisers 210, 218, 318 may be absorbing dichroic polarisers.

The display polariser 218 and the additional polariser 318 have electric vector transmission directions 219, 319 that are parallel, and orthogonal to the input polariser 210 transmission direction 211. Reflective polariser 302 further has a polarisation transmission direction 303 that is aligned parallel to the polarisation transmission directions 219, 319.

In FIG. 1A, additional polariser 318 is arranged on the same side of the spatial light modulator 48 as the display output polariser 218. Alternatively (not shown) the additional polariser 318 may be arranged on the same side as the input polariser 210 and polar control retarder 300 may be arranged between additional polariser 318 and input polariser 210. Alternatively (not shown) plural polar control retarders and plural additional polarisers may be provided on the input side of the spatial light modulator 48. Alternatively (not shown) plural polar control retarders may be provided on the input and output sides of the spatial light modulator 48.

Polar control retarder 300 is arranged between the display polariser 218 and the additional polariser 318, the at least one polar control retarder 300 including a switchable liquid crystal retarder 301 comprising a layer 214 of liquid crystal material. Polar control retarders 300 comprise: (i) a switchable liquid crystal retarder 301 comprising a layer 314 of liquid crystal material arranged between transparent support substrates 312, 316 and arranged between the display polariser 218 and the additional polariser 318; and (ii) at least one passive compensation retarder 330.

FIG. 1A further illustrates a reflective polariser 302 that is arranged between the output polariser 218 and the polar control retarder 300. The operation of polar control retarders 300 arranged between polariser 218, 302, 318 will be described hereinbelow with respect to FIG. 22A to FIG. 23D.

The display further comprises a control system arranged to independently control the at least one first light source 15 arrayed across an input end of the waveguide 1 and the at least one second light source 17 arrayed across an input end of the waveguide 1. The light sources 15, 17 are arranged to provide input light to a waveguide 1.

Control of the polar control retarders is achieved by means of driver 350 to change the operating voltage across the liquid crystal layer 314. Controller 352 is provided to control the driver 350 and controller 354 that further controls the driving of light sources 15, 17.

The display device 100 is arranged to display an image and capable of operating in at least a public mode and a privacy mode, wherein in the privacy mode the privacy function is provided and the visibility of the image to an off-axis viewer is reduced compared to the public mode and the visibility of the image to the primary user in an on-axis position remains visible in both the privacy and public modes. The control system 350, 352, 354 selectively operates the display device 100 in the public mode or the privacy mode for at least one region of the displayed image, typically the entire displayed image. Such display device may be used in applications such as but not limited to switchable privacy displays such as laptops, monitors, TV, cell phone, tablets, wearable displays, ATM displays and automotive displays.

Figure 1C:
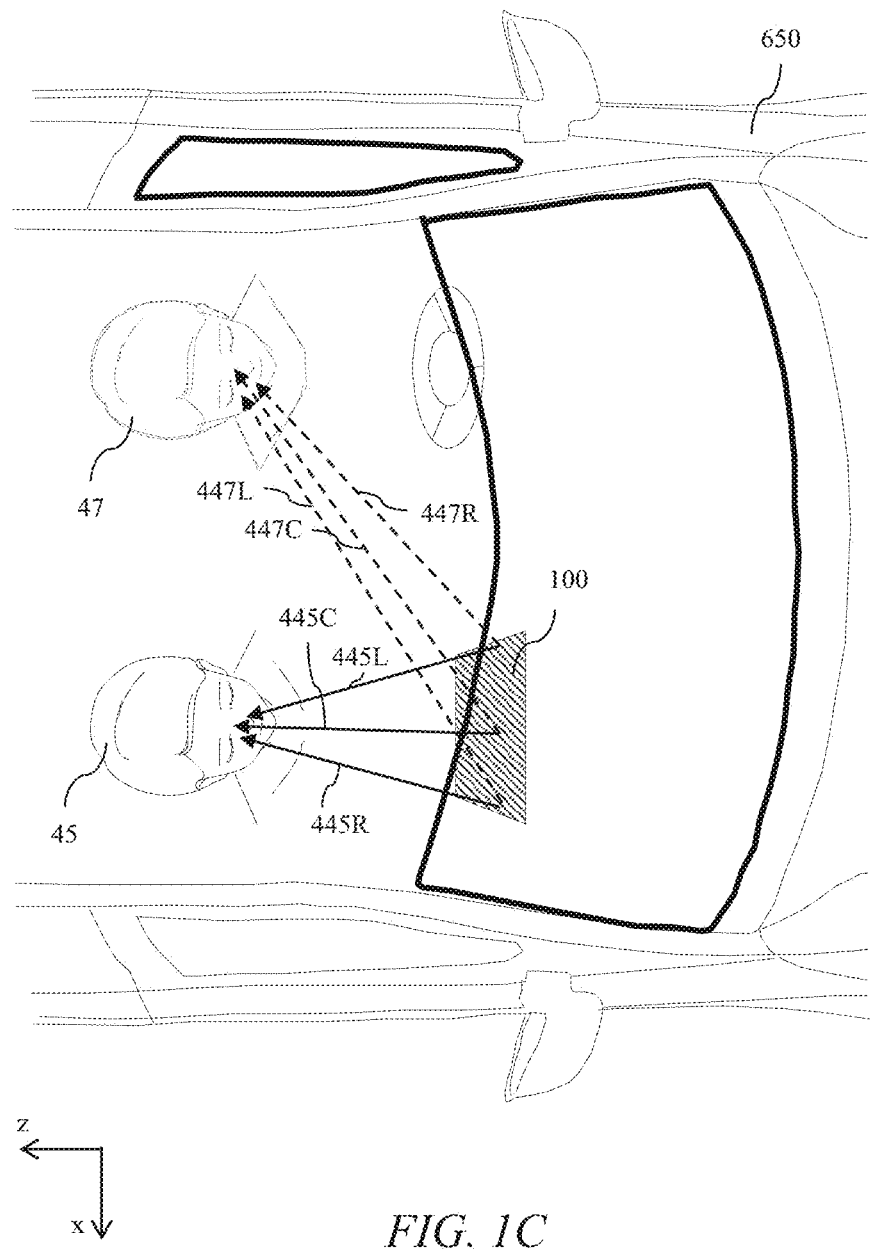
FIG. 1C is a schematic diagram illustrating a top view of a vehicle having the display apparatus of FIG. 1A mounted therein primarily for use by a passenger.

FIG. 1C is a schematic diagram illustrating a top view of a vehicle 650 having the display apparatus 100 of FIG. 1A mounted therein. Occupants may include a passenger 45 and driver 47. It may be desirable that display 100 is operated as a privacy display for the passenger 45 that is invisible to the driver 47 across the width of the display 100. Thus light rays 447L, 447C, 447R from across the width of the display desirably have uniformly high security factor, S. Further it is desirable that the passenger 45 sees an image with high luminance and image visibility uniformity such that rays 445L, 445C, 445R provide an image with substantially uniform and high luminance.

Figure 1D:
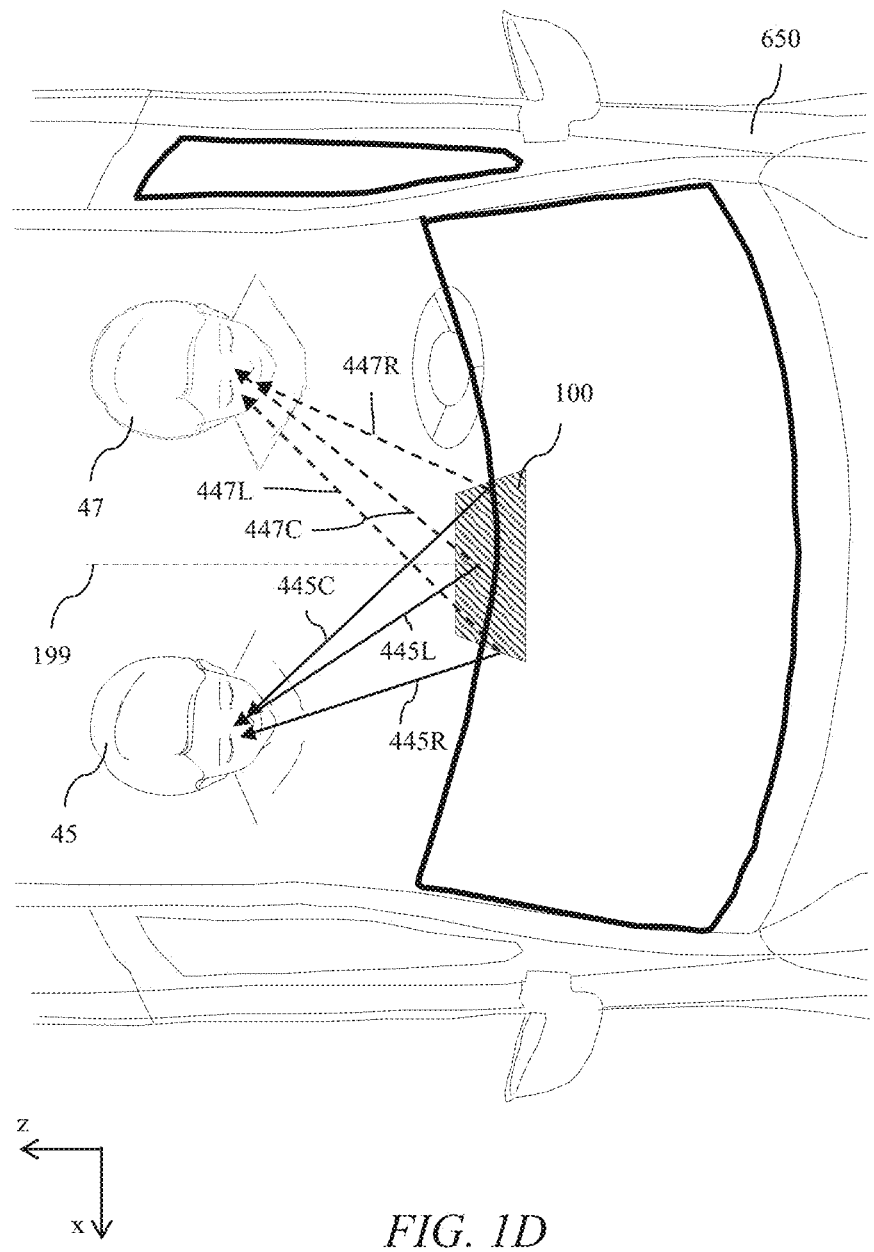
FIG. 1D is a schematic diagram illustrating a top view of a vehicle having the display apparatus of FIG. 1A mounted therein for use by both a passenger and a driver.

FIG. 1D is a schematic diagram illustrating atop view of a vehicle having the display apparatus of FIG. 1A mounted therein for use by both a passenger 45 and a driver 47. The operation of the display 100 of FIG. 1D is similar to that of FIG. 1C, other than the output light is directed either side of the optical axis 199 of the display 100 to achieve efficient illumination of the driver 47 and passenger 45 with high image uniformity.

It may be desirable to provide a high efficiency display with high uniformity of luminance.

Figure 2:
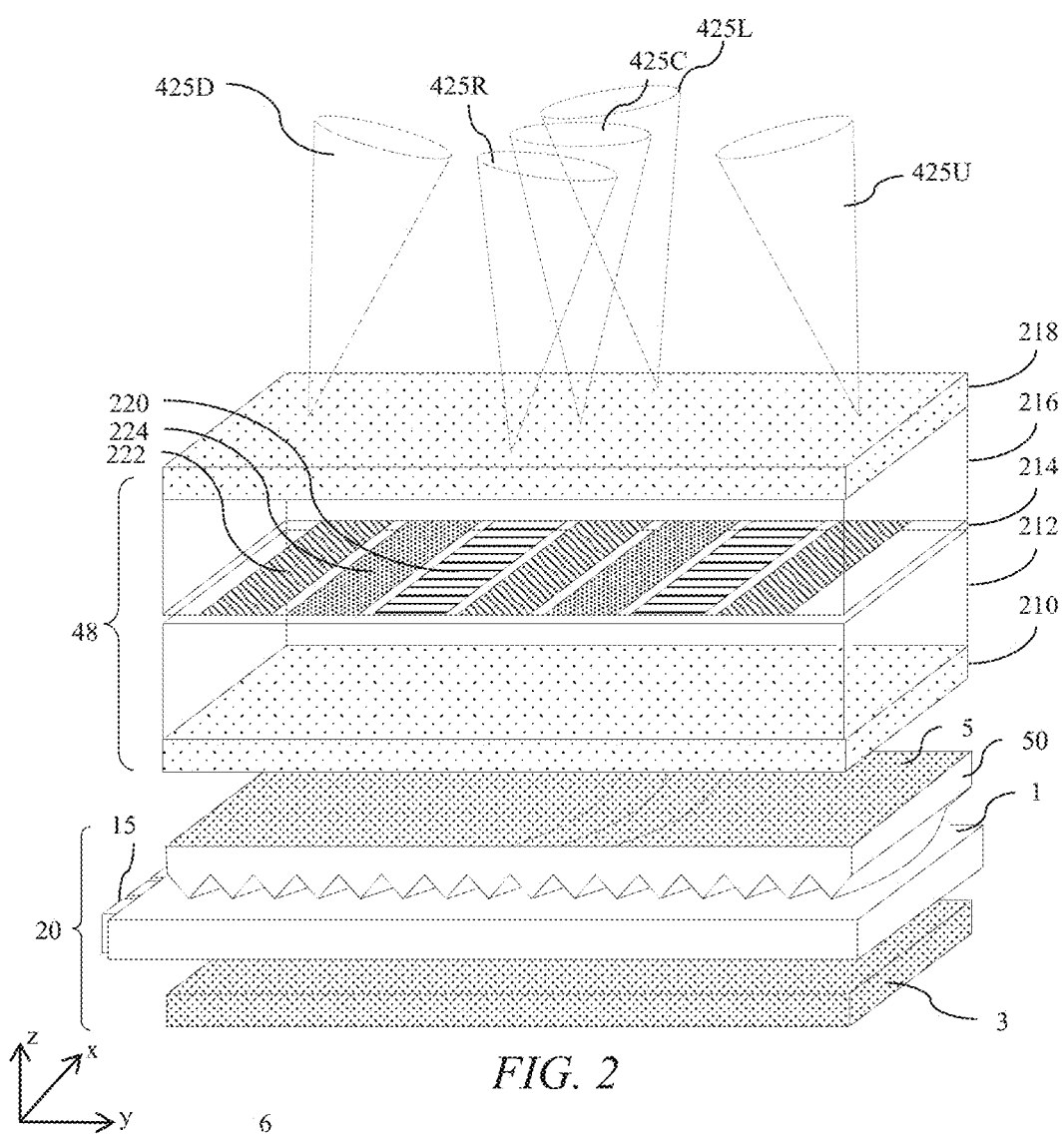
FIG. 2 is a schematic diagram illustrating a front perspective view of a high efficiency pupillated display.

FIG. 2 is a schematic diagram illustrating a front perspective view of a high efficiency pupillated display 100. Features of the embodiment of FIG. 2 not discussed in further detail may be assumed to correspond to the features with equivalent reference numerals as discussed above, including any potential variations in the features. In comparison to the arrangement of FIG. 1A, polar control retarder 300 and additional polariser 318 is omitted. Such a display does not provide desirable image security to off-axis snoopers. Collimation from waveguide 1 desirably achieves light cones 415 with high luminance over a restricted solid angle to on-axis users and low brightness to off-axis locations at which viewers are not typically located. In an illustrative example, light cones 415 may have a full width half maximum angular size of less than 25° and more preferably less than 20°.

FIG. 2 further illustrates that light sources 17 may be omitted. The present embodiments achieve increased uniformity for non-privacy displays while providing high efficiency as will be described.

It would be desirable that light cones 415C, 415L, 415R, 415U, 415D are each directed to a common direction.

The structure of an exemplary waveguide will now be described.

Figure 3:
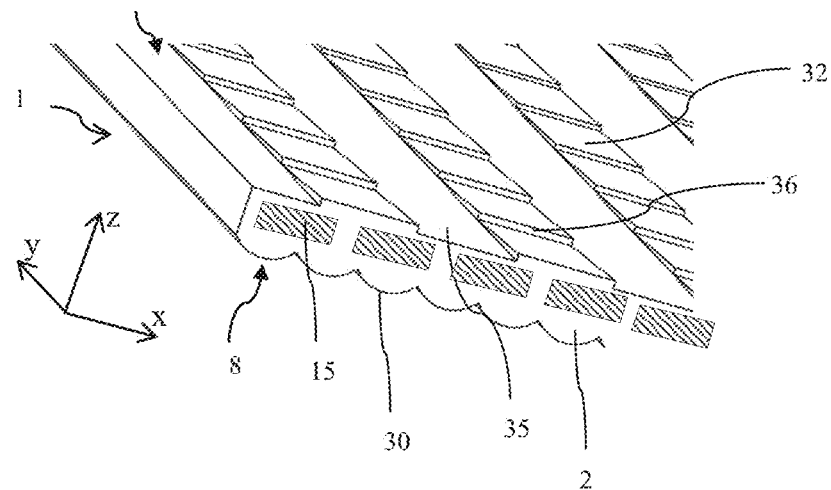
FIG. 3 is a schematic diagram illustrating a front perspective view of a waveguide for use in a pupillated display.

FIG. 3 is a schematic diagram illustrating a front perspective view of a waveguide 1 for use in a pupillated display 100.

Waveguide 1 is an optical waveguide that extends across a plane (x-y plane in FIG. 1A and FIG. 2) that comprises first and second opposed light guiding surfaces 6,8 arranged to guide light rays 415, 406 along the waveguide 1. In the embodiments of the present description, the x, y, z directions are provided as an illustrative coordinate system, other coordinate systems may be used as alternatives.

The first and second light guiding surfaces 6, 8 are arranged to guide light by total internal reflection. In the embodiment of FIG. 3, the surface 6 comprises prismatic optical surfaces comprising first gently sloped facets 32 and second steeply sloped facets 36 and the surface 8 comprises lenticular microstructures extending in the y-direction that is orthogonal to the lateral direction.

Waveguide 1 comprises an input end 2 arranged between the first and second light guiding surfaces 6, 8 and extending in a lateral direction (along the x-axis) between the first and second light guiding surfaces 6,8.

The at least one light source 15 comprises an array of light sources 15 that are arrayed across the lateral direction (that is parallel to the x-axis in the present embodiment). At least one light source 15 is arranged to input light into the waveguide through the input end 2. Light source may comprise an array of light sources, such as an LED array.

The operation of an illumination apparatus 110 will now be described.

Figure 4A:
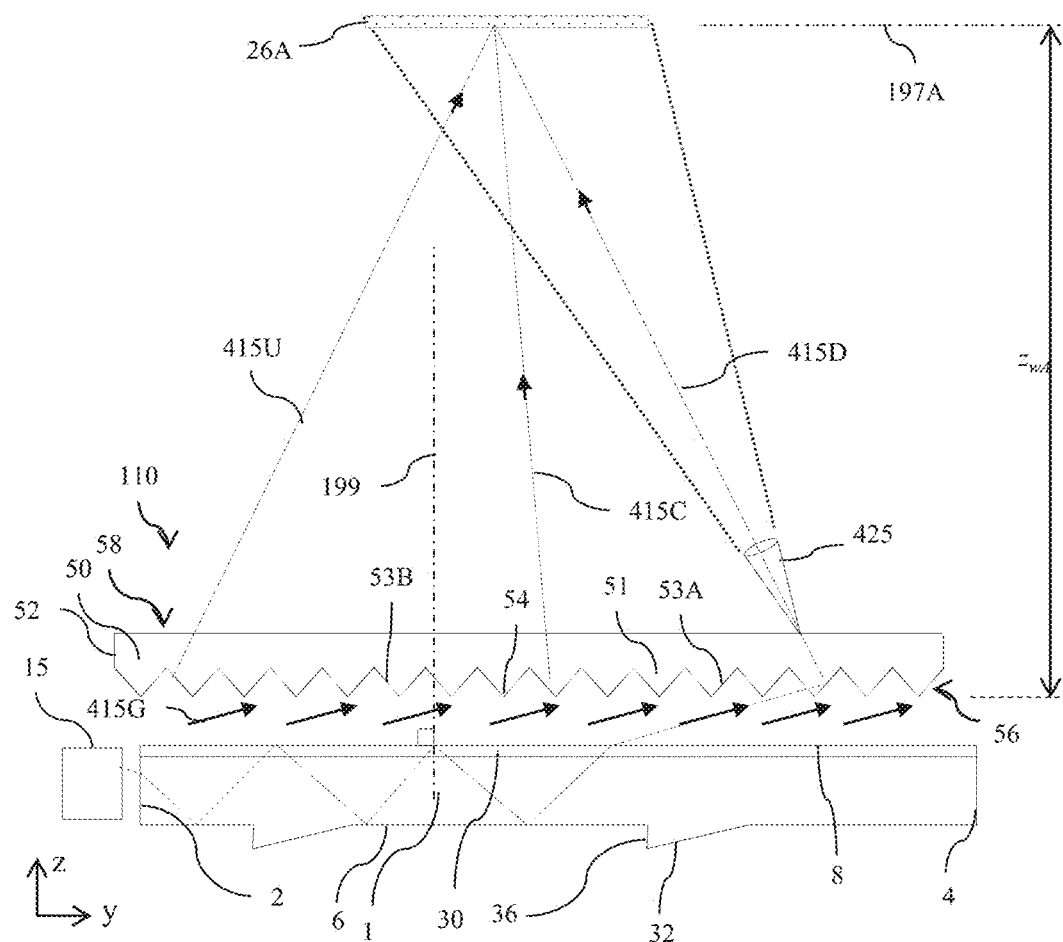
FIG. 4A is a schematic diagram illustrating a side view of a pupillated backlight for a first light source.
Figure 4B:
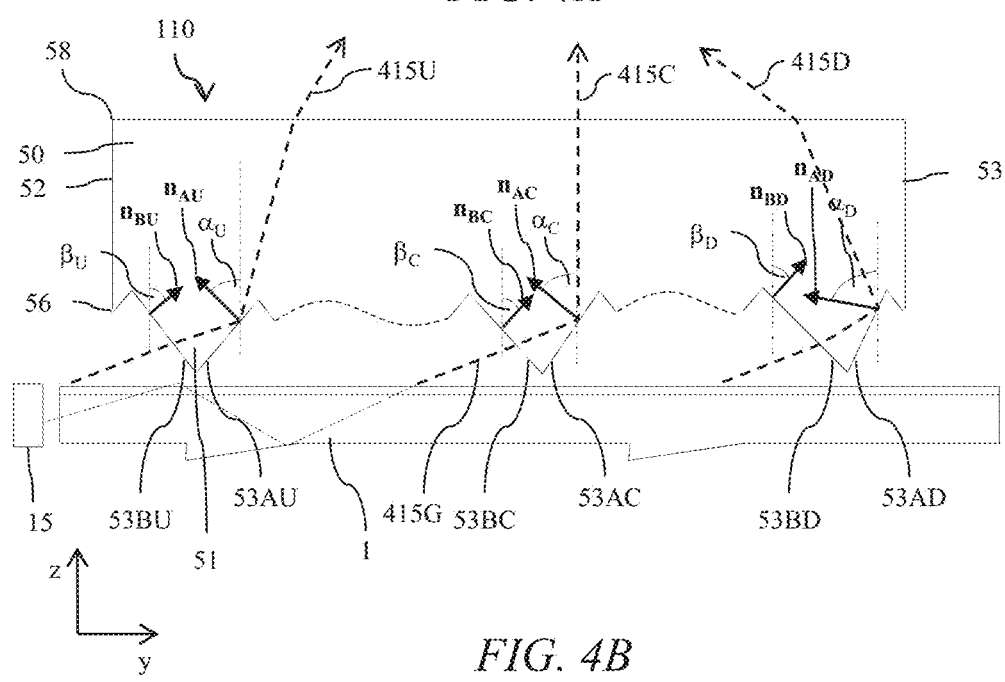
FIG. 4B is a schematic diagram illustrating a side view of operation of variable tilt facets of a turning film of a pupillated backlight for a first light source.

FIG. 4A is a schematic diagram illustrating a side view of a pupillated backlight 20 for a first light source 15; and FIG. 4B is a schematic diagram illustrating a side view of operation of variable tilt facets 53 of an optical turning film component 50 of a pupillated backlight 20 for a first light source 15. Features of the embodiment of FIGS. 4A-B not discussed in further detail may be assumed to correspond to the features with equivalent reference numerals as discussed above, including any potential variations in the features.

Illumination apparatus 110 comprises: a waveguide 1 extending across a plane (x-y plane) and comprising: first and second opposed light guiding surfaces 6, 8 arranged to guide light along the optical waveguide 1.

The second light guiding surface 8 is arranged to guide light by total internal reflection.

An input end 2 is arranged between the first and second light guiding surfaces 6, 8 and extending in a lateral direction between the first and second light guiding surfaces 6, 8.

At least one light source 15 arranged to input light into the waveguide 1 through the input end 2, wherein the waveguide 1 is arranged to cause light from the light sources 15 to exit from the waveguide 1 through the second light guiding surface 8 by breaking total internal reflection.

The optical turning film component 50 comprises: an input surface 56 arranged to receive the light exiting from the waveguide 1, the input surface 56 extending across the plane (x-y plane); and an output surface 58 facing the input surface 56. The input surface 56 comprises: an array of prismatic elements 52, each comprising a pair of facets 53 defining a ridge 54 therebetween. The output surface 58 is planar. For each pair of facets 53A, 53B, the first facet 53A has a normal $n_A$ on the internal side of the input surface 56 that is inclined towards a first side 52 of the optical turning film 50 and a second facet 53B has a normal $n_B$ on the internal side of the input surface 56 that is inclined towards a second side 53 of the optical turning film 50 opposite to from the first end 52, the first facets 53A having respective facet angles α, defined between the normal to the facet 53A and a normal (z-direction) to the plane (x-y plane), that vary across the array so that the deflection varies in a direction that is orthogonal (y-direction) to an optical axis 199 normal to the plane (z-direction) and corresponds to a direction orthogonal (y-direction) to the lateral direction (x-direction).

Incident rays 415 on the surface 8 of waveguide 1 have angles of incidence at the surface 8 that are less than the critical angle at the said surface 8. Light cone 415 is determined at least in part by the collimation of the light rays 415 from light sources 15 that breaks internal reflection at the surface 8.

Grazing output light rays 415G are output from the waveguide 1 with a cone angle 415 and substantially uniform output angle across the plane (x-y plane) of the waveguide 1.

The prismatic elements 51 of the optical turning film component 50 are arranged to deflect the light 415G exiting the waveguide 1, the deflection varying in at least one direction across the plane (x-y plane).

Near the upper edge of the display, light rays 415G are refracted by facets 53BU with facet angle $β_U$ and reflected by total internal reflection at facets 53AU with surface normal direction $n_{AU}$ with facet angle $α_U$ such that output light ray 415U is directed towards a window 26A at a window distance $Z_{wA}$ from the illumination apparatus 110. In at least one cross sectional plane (y-z plane in FIGS. 4A-B), the size of the window 26 in the window plane 197A is determined by the angular width of the light cone 415, that may be for example by the full width half maximum luminance of the cone 415.

In the present disclosure optical window 26A refers to the directing of light by illumination apparatus 110 from light sources such as sources 15 to defined spatial regions in a window plane 197, that is at the window distance $Z_{wA}$ from the illumination apparatus. The optical window 26 may also be referred to as an optical pupil. An observation from a location within the optical window provides light rays with common or substantially common optical properties from across the illumination apparatus 110.

The use of the term optical window 26 in the present embodiments is distinct and different from the use of the term window when used to refer to sheets or panes of glass or other transparent material such as plastics for use in house windows, car windows and windscreens, and other types of protective windows. Such sheets or panes do not contribute to the creation of desirable viewing regions with improved uniformity as described herein.

Similarly near the centre of the display, light rays 415G are refracted by facets 53BC with facet angle $β_C$ and reflected by total internal reflection at facets 53AC with surface normal direction $n_{AC}$ with facet angle $α_C$ such that output light ray 415C is directed towards a window 26A in the window plane 197A at a window distance $Z_{wA}$ from the illumination apparatus 110.

Similarly near the lower edge of the display, light rays 415G are refracted by facets 53BD with facet angle $β_D$ and reflected by total internal reflection at facets 53AD with surface normal direction $n_{AC}$ with facet angle $α_D$ such that output light ray 415D is directed towards a window 26A in the window plane 197A at a window distance $Z_{wA}$ from the illumination apparatus 110.

Facet angles α, β may vary continuously with location across the length of the optical turning film component. The deflected light rays 415U, 415C, 415D are directed towards a common optical window 26A in front of the illumination apparatus 110.

The operation of the optical turning film component with ridges 54 that are arranged as straight lines will now be further described.

Figure 4C:
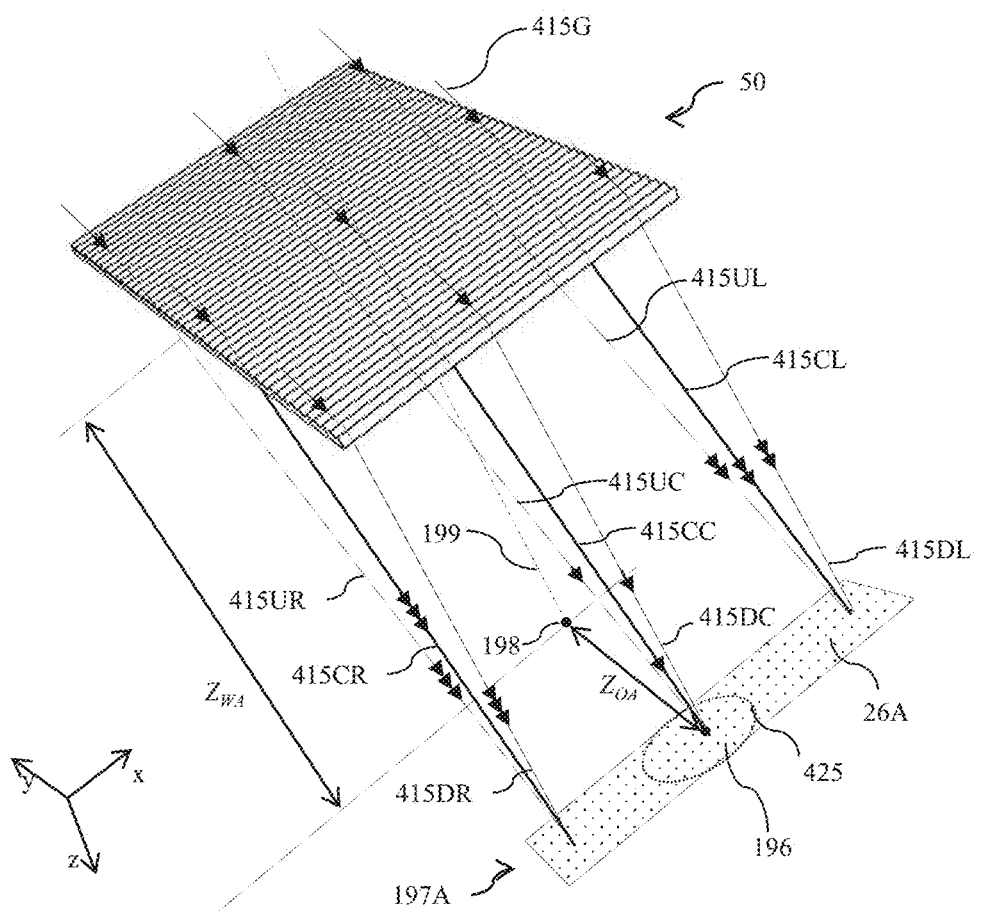
FIG. 4C is a schematic diagram illustrating a rear perspective view of light output from a pupillated linear optical turning film component comprising variable tilt facets.

FIG. 4C is a schematic diagram illustrating a rear perspective view of light output from a pupillated linear optical turning film component 50 comprising variable tilt facets 53 of FIGS. 4A-B. Features of the embodiment of FIG. 4C not discussed in further detail may be assumed to correspond to the features with equivalent reference numerals as discussed above, including any potential variations in the features.

FIG. 4C illustrates that the ridges 54 extend along an array of lines across the plane (x-y plane) in which the input surface 56 extends. The optical turning film component 50 has a rectangular shape across the plane (x-y plane) and the lateral direction is along a major or minor axis of the rectangular shape.

Facet angles α, β of respective facets 53, defined between a normal to the facet 53 and a normal (z-direction) to the plane (x-y plane), vary across the array so that the deflection varies in a direction (y-direction) that is orthogonal to an optical axis 199 that is normal to the plane (x-y plane), the direction corresponding to a direction (y-direction) that is orthogonal to the lateral direction (x-direction).

The lines are straight and facet 53 angles of respective facets 53, defined between a normal to the facet 53 and a normal to the plane (x-y plane), vary across the array so that the deflection varies in a direction that is orthogonal to the optical axis 199 corresponding to a direction that is orthogonal to the lateral direction.

The lines of the array have an arithmetic mean tangential angle projected on to the plane (x-y plane) of 0° from the lateral direction, that is the lines are parallel to the x-axis direction that is the lateral direction in the present embodiment.

Thus the rays 415G are directed by the optical turning film component 50 towards the common window 26A. Light rays 415UL, 415CL, 415DL from the upper, central and lower parts of the left edge region of the optical turning film are located to the window 26A at a location corresponding to the lateral location of the left edge region in the lateral direction. Light rays 415UC, 415CC, 415DC from the upper, central and lower parts of the central region of the optical turning film are located to the window 26A at a location in the lateral corresponding to the lateral location of the central region in the lateral direction. Light rays 415UR, 415CR, 415DR from the upper, central and lower parts of the right edge region of the optical turning film are located to the window 26A at a location in the lateral corresponding to the lateral location of the right edge region in the lateral direction.

In the embodiment of FIG. 4C there is no deflection in the lateral direction and the optical window 26A thus has an extent in the lateral direction that is determined by the width of the optical turning film component 50 and by the size of the solid angle of the cone 415; and a width that is determined by the size of the solid angle of the cone 415. The size of the optical window 26A in the window plane 197A may also be controlled by means of diffusion such as diffusers in the optical stack 5 of the display as illustrated in FIG. 1A.

The embodiment of FIG. 4C further illustrates that the common optical window 26A is offset from an optical axis 199 that extends from the centre of optical turning film component 50 normal to the plane (x-y plane). Thus the point 198 at which the optical axis 199 intersects the window plane 197A is offset by distance $Z_{OA}$ from the point 196 at which the ray 415CC intersects the window plane 197A. As will be described hereinbelow, off-axis illumination locations may be achieved with increased uniformity across the illumination apparatus.

It may be desirable to provide an optical window with reduced extent in the direction that is orthogonal to the lateral direction.

Figure 5A:
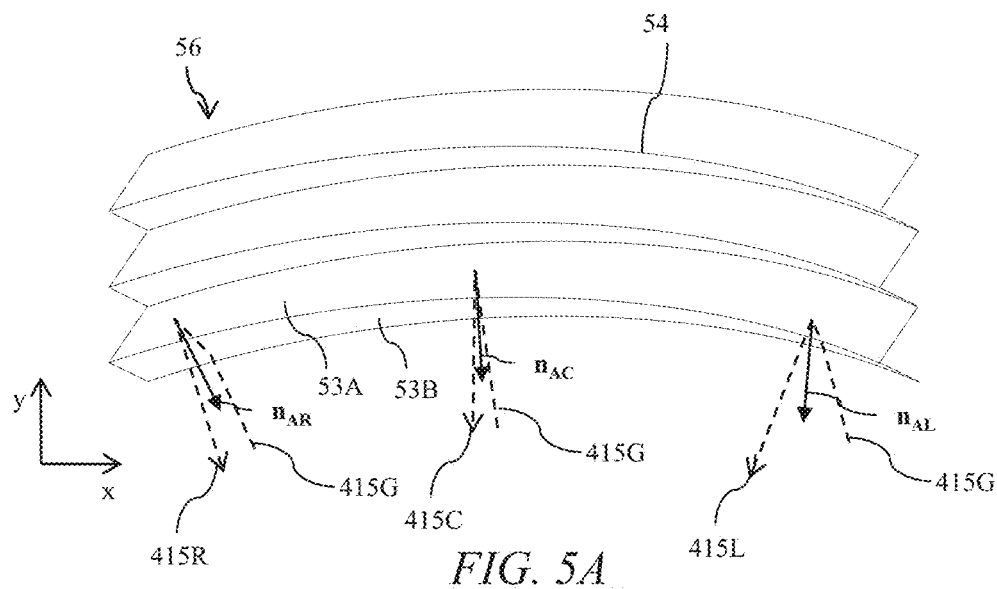
FIG. 5A is a schematic diagram illustrating a front perspective view of operation of facets of a curved optical turning film component of a pupillated backlight for light from a first light source.
Figure 5B:
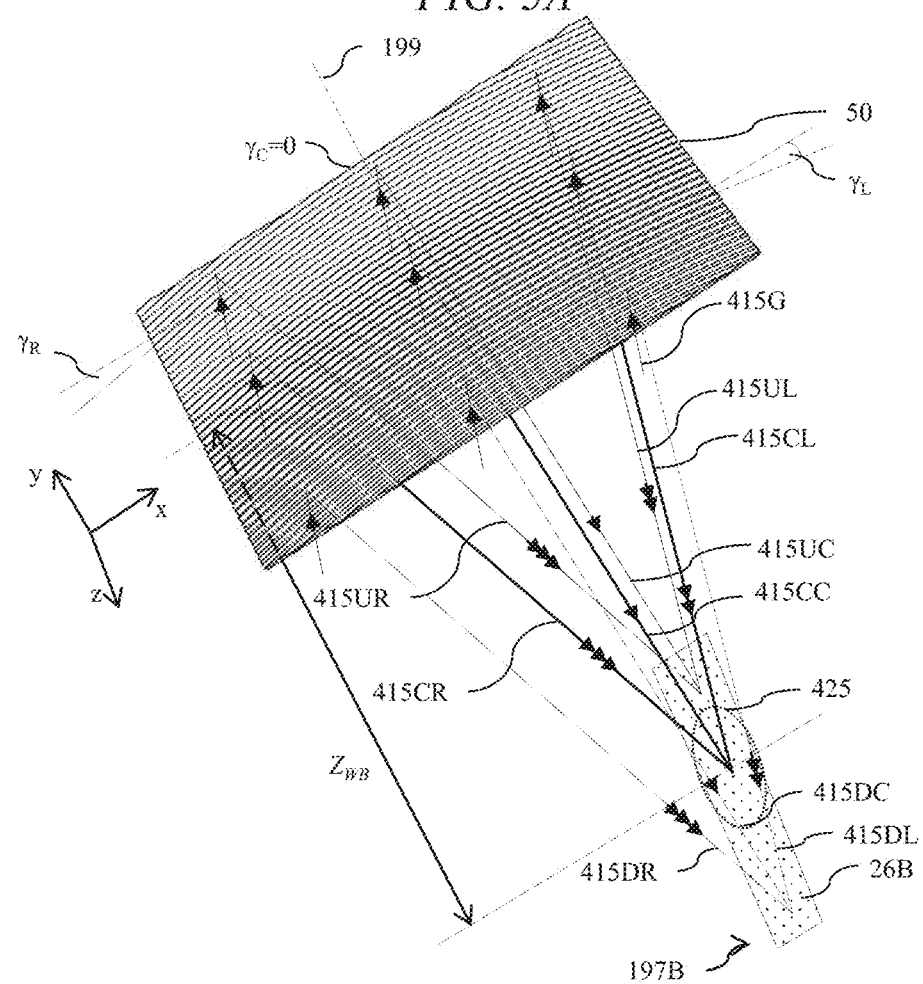
FIG. 5B is a schematic diagram illustrating a rear perspective view of light output from a curved optical turning film component comprising uniform tilt facets.

FIG. 5A is a schematic diagram illustrating a front perspective view of operation of facets 53 of a curved optical turning film component 50 of a pupillated backlight 20 for light from a first light source 15; and FIG. 5B is a schematic diagram illustrating a rear perspective view of light output from a curved optical turning film component 50 comprising uniform tilt facets 53. Features of the embodiment of FIGS. 5A-B not discussed in further detail may be assumed to correspond to the features with equivalent reference numerals as discussed above, including any potential variations in the features.

FIGS. 5A-B illustrate an alternative embodiment to the arrangement of FIGS. 4A-C. In comparison to the arrangement of FIG. 4C, the lines of the ridges 54 are curved across the plane (x-y plane) so that the deflection varies in a direction (x-direction) that is orthogonal to an optical axis 199 that is normal to the plane (x-y plane), the direction (x-direction) corresponding to the lateral direction (x-direction).

The curved facets have surface normal directions $n_{AK}$, $n_{AC}$, $n_{AL}$ that vary across the width of the optical turning film 50, that is the surface normal directions vary in the lateral direction along a ridge such that light rays 415G from the waveguide 1 are directed towards a common window 26B in a window plane 197B at a distance $Z_{WB}$ from the optical turning film component 50 of the illumination apparatus 110.

The optical window 26B has a cone width defined by cone 415 in direction orthogonal to the lateral direction and an extent determined by the cone width 415 and the height of the optical turning film component 50, and is thus orthogonal to the optical window 26A illustrated in FIG. 4C.

In the embodiment of FIG. 5B, the centre of the optical window 26B is illustrated as aligned with the centre of the illumination apparatus 110, that is the common optical window 26 is aligned with an optical axis 199 that extends from the centre of optical turning film component normal to the plane (x-y plane). The offset $Z_{OB}$ of the optical window 26B is zero and the lines of the array have an arithmetic mean tangential angle projected on to the plane (x-y plane) that is inclined at of 0° from the lateral direction.

The orientation of the lines of the array is described by facet peak 54 rotations γ where $γ_R$ is rotation at the right side of the display $γ_C$ is the rotation in the centre and ye is the rotation at the left edge. The arithmetic mean tangential angle projected on to the plane (x-y plane) is the average rotation γ across the lateral direction.

The lines of the array may alternatively have an arithmetic mean tangential angle that is inclined at more than 0° from the lateral direction. Such an arrangement achieves an offset $Z_{OB}$ that is non-zero. Advantageously the nominal window 26B location may be set for off-axis illumination with desirable properties as will be described further hereinbelow.

It may be desirable to provide a common optical window for all points across the illumination apparatus 110.

Figure 5C:
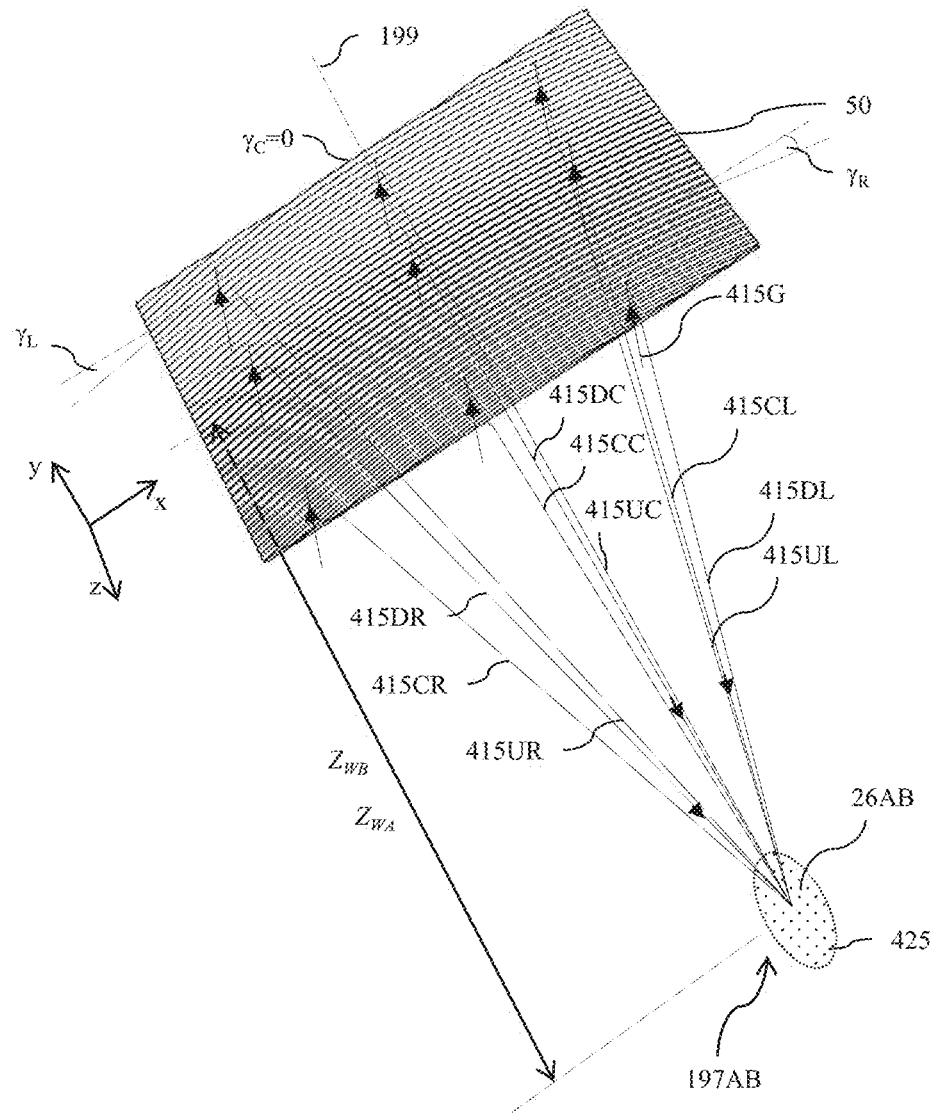
FIG. 5C is a schematic diagram illustrating a rear perspective view of light output from a curved optical turning film component comprising variable tilt facets with a common optical window distance.

FIG. 5C is a schematic diagram illustrating a rear perspective view of light output from a curved optical turning film component 50 comprising variable tilt facets 53 with a common optical window across the illumination apparatus. Features of the embodiment of FIG. 5C not discussed in further detail may be assumed to correspond to the features with equivalent reference numerals as discussed above, including any potential variations in the features.

The facet surfaces 53 are provided to achieve operation for rays 415G as illustrated in both FIG. 4B and FIG. 5A. Facet 53 angles of respective facets 53, defined between a normal to the facet 53 and a normal (z-direction) to the plane (x-y plane), vary across the array so that the deflection further varies in a direction orthogonal to the optical axis 199, corresponding to a direction orthogonal to the lateral direction, so that the deflected light is directed towards a further, common optical window 26AB in front of the illumination apparatus 110.

The first mentioned common optical window 26A and the further common optical window 26B are defined the same distance in front of the illumination apparatus 110, achieving common optical window 26AB. Advantageously increased uniformity of output is achieved across the whole of the illumination apparatus 110 from observation locations within the optical window 26AB.

Figure 5D:
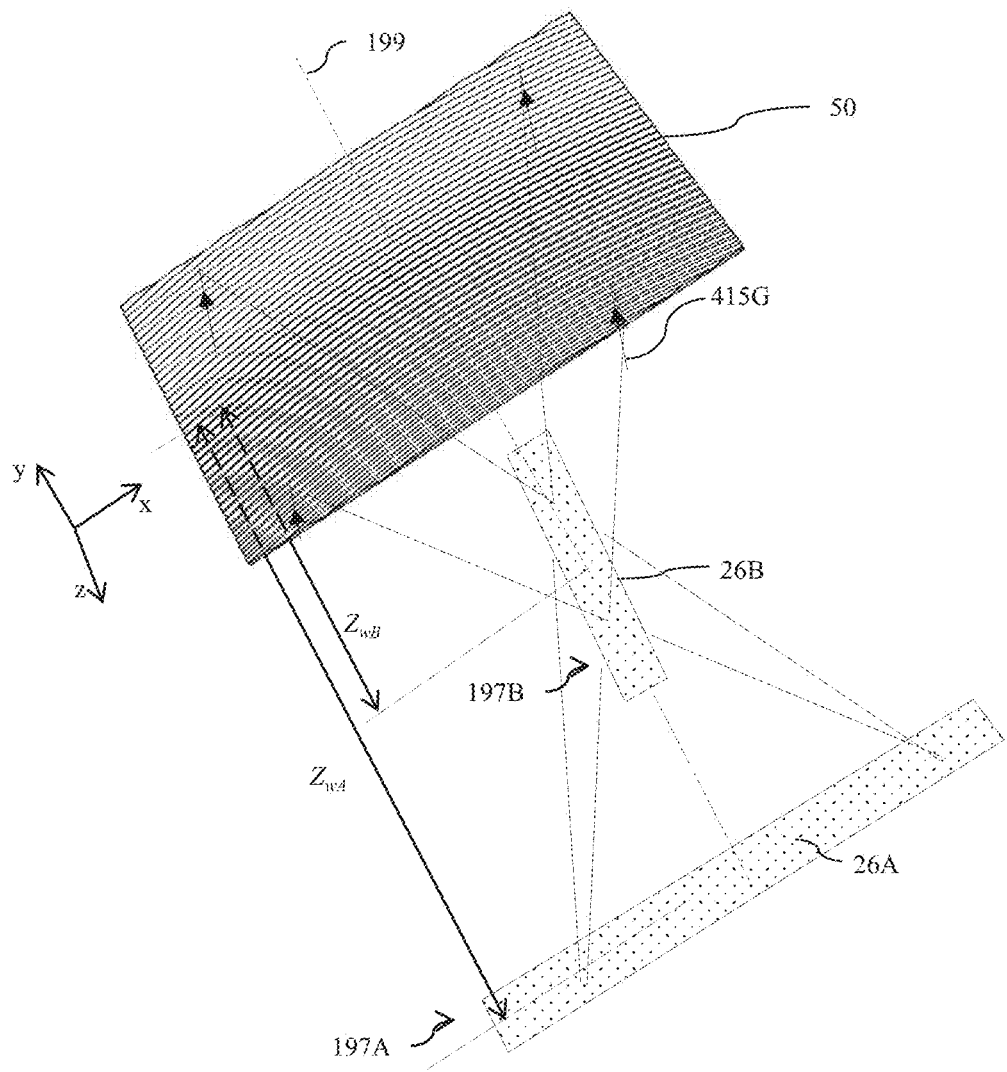
FIG. 5D is a schematic diagram illustrating a rear perspective view of light output from a curved optical turning film component comprising variable tilt facets with first and second different optical window distances.

FIG. 5D is a schematic diagram illustrating a rear perspective view of light output from a curved optical turning film component 50 comprising variable tilt facets 53 with first and second different optical window distances 197A, 197B.

The first mentioned common optical window 26A and the further common optical window 26B are defined at different distances $Z_{WA}$, $Z_{WB}$ in front of the illumination apparatus 110. Further as described above, the offset $Z_{OA}$ may be provided by facet 53 angle selection and offset $Z_{OB}$ may be achieved by selection of the arithmetic mean tangential angle projected on to the plane (x-y plane) of the inclination of the lines formed by the ridges 54 of the array. Advantageously increased uniformity may be achieved for two different nominal observation distances and angular locations.

The operation of the illumination apparatus 110 in a backlight 20 of a display apparatus 100 will now be described. For the purposes of the present description the backlights 20 are further referred to as pupillated backlights, that is backlights that provide optical windows 26.

Figure 6A:
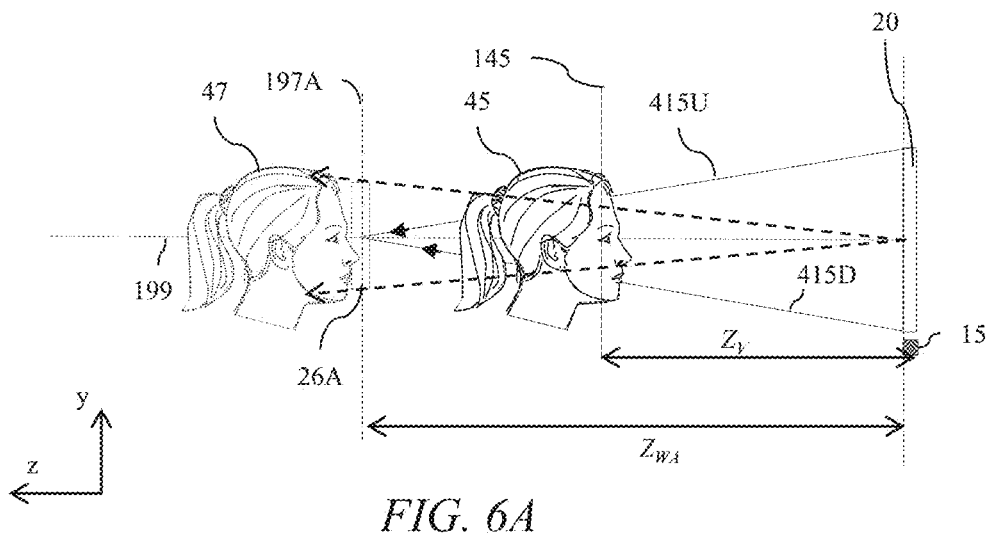
FIG. 6A is a schematic diagram illustrating a side view of operation of a turning film comprising variable tilt facets of a pupillated backlight.

FIG. 6A is a schematic diagram illustrating a side view of operation of an optical turning film component 50 comprising variable tilt facets 53 of a pupillated backlight 20.

Light source array 15 is arranged at the lower edge of the backlight and rays 415L, 415R are directed towards optical window 26A that has an extent in the lateral direction as described above. In typical operation, the window distance between the backlight 20 and the window plane 197 is arranged to be greater than the typical observer location.

In an illustrative example, a laptop display of diagonal size 14 inches is arranged with a window distance $Z_{WA}$ of 700 mm, while the nominal observer location is in plane 145 at a distance $Z_V$ of 500 mm. The window distance $Z_{WA}$ may be arranged by design of waveguide 1 and facets 53 to be at a nominal snooper distance which may for example be 700 mm.

Figure 6B:
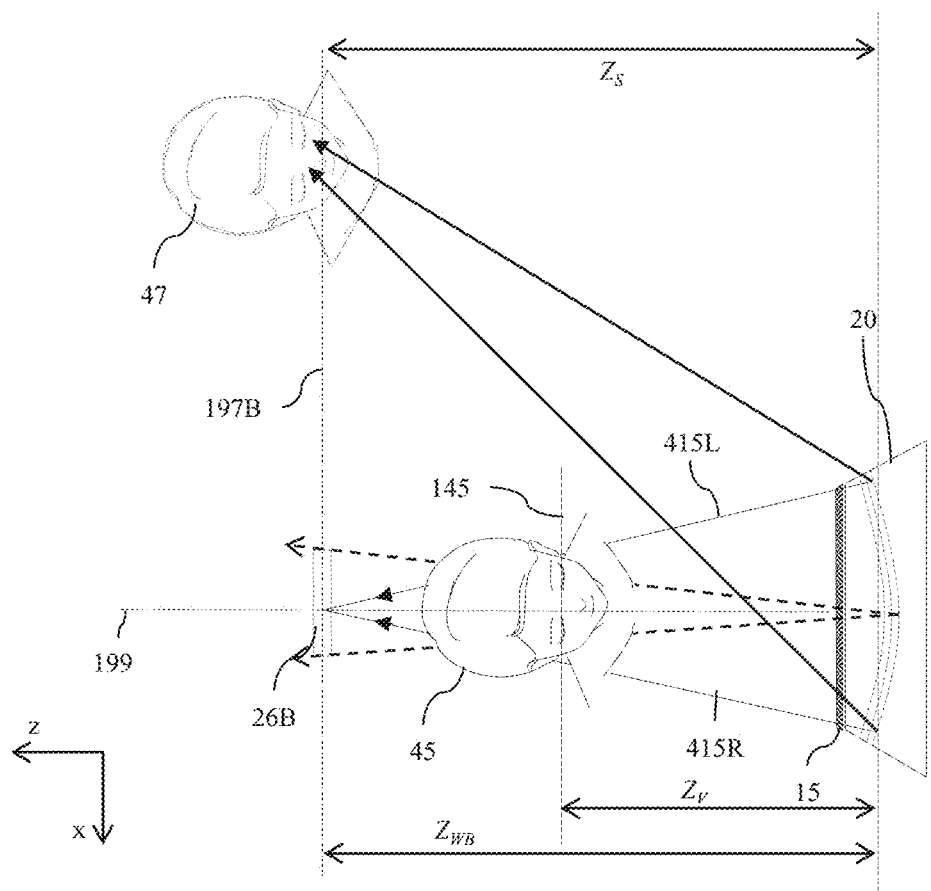
FIG. 6B is a schematic diagram illustrating a top view of operation of a curved optical turning film component of a pupillated backlight.

FIG. 6B is a schematic diagram illustrating a top view of operation of a curved optical turning film component 50 of a pupillated backlight 20.

The window 26B may be at substantially the same distance as the window 26A illustrated in FIG. 6A, and as illustrated in FIG. 5C, so that the planes 197A, 197B are coincident. The snooper 47 is typically offset in the lateral direction.

As will be described further in an illustrative example below, the arrangement of FIGS. 6A-6B advantageously achieve increased luminance uniformity across the backlight 20 for the primary user 45.

Desirably the nominal user 45 plane 145 is closer to the backlight 20 than the window plane 197. In operation the user 45 sees an image that has increased uniformity in comparison to unpupillated backlights (i.e. backlights which do not provide a common optical window 26, or in other words provide a common optical window at optical infinity). When the observer moves to the right side of the display, the display maintains increased brightness on the right side of the display in comparison to the left side. By way of comparison, if the nominal observer distance $Z_V$ is arranged to be greater than the window distance $Z_{WA}$, $Z_{WB}$ then as the observer moves to the right from the central optical axis 199, the right side of the display becomes darker than the left side of the image. Such a variation with observer position is typically considered unnatural and undesirable.

Further, the snooper 47 is desirably arranged at or further than the window distance $Z_{WA}$, $Z_{WB}$. Such an arrangement provides increased uniformity of security factor across the display area in comparison to unpupillated backlights.

In alternative embodiments the windows 26A, 26B may be at different distances from the backlight 20, such as illustrated in FIG. 5D. Advantageously increased uniformity across the display area may be achieved for an increased range of observer 45 locations. Further increased security factor in privacy mode of operation may be achieved for an increased range of snooper 47 locations.

Features of the embodiment of FIGS. 6A-B not discussed in further detail may be assumed to correspond to the features with equivalent reference numerals as discussed above, including any potential variations in the features.

An illustrative embodiment will now be described.

Figure 7:
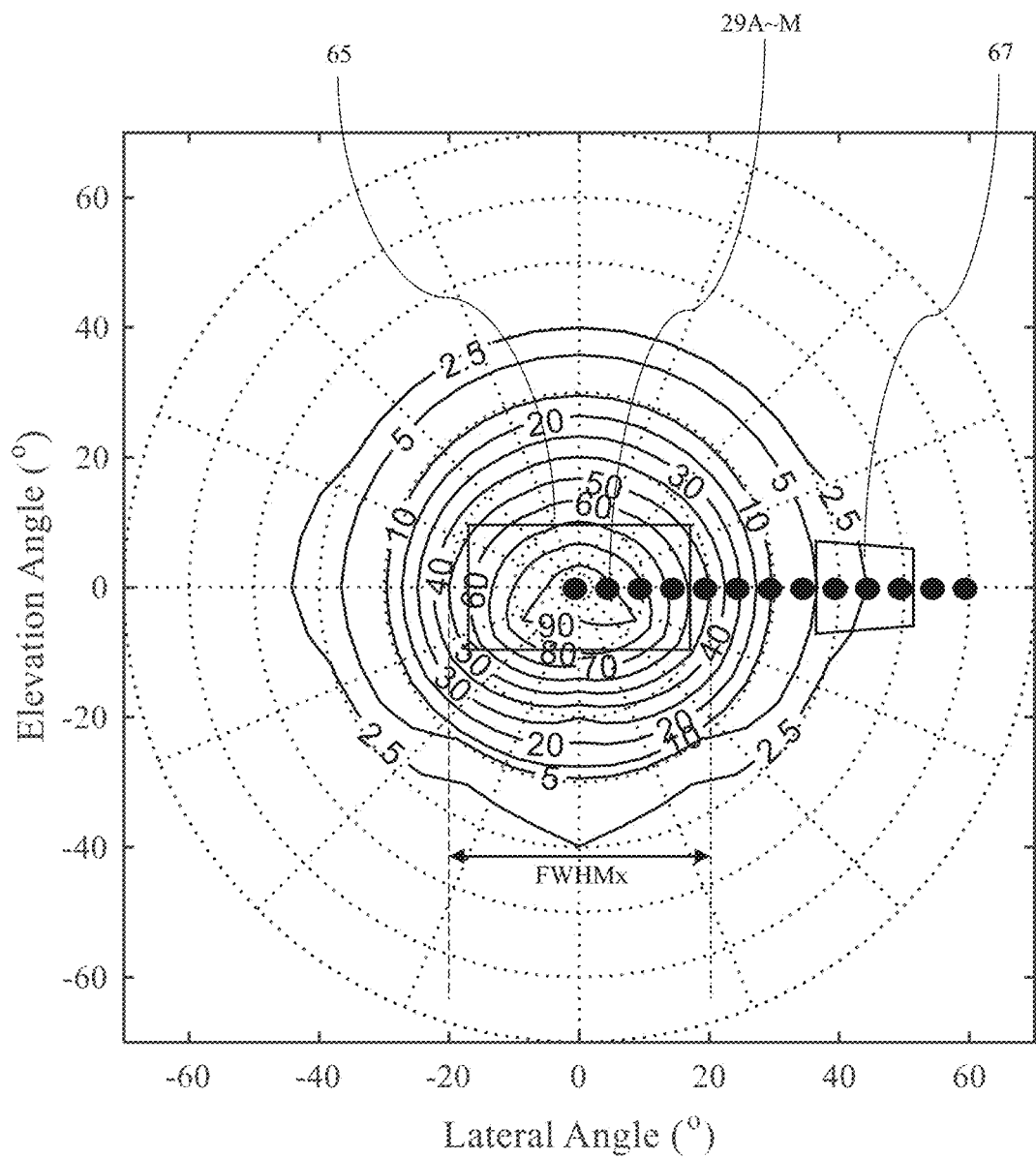
FIG. 7 is a schematic graph illustrating the polar variation of luminance for an illustrative backlight with light input at the first end of the waveguide.

FIG. 7 is a schematic graph illustrating the polar variation of luminance for an illustrative backlight 20 with light input at the first end of the waveguide 1. The waveguide 1 is of the form illustrated in FIG. 3, and further diffusers are arranged to provide a desirable full width half maximum in the lateral direction, FWHMx of 40°. Such a backlight profile is desirable to achieve high visual security levels in displays of FIG. 1A provided with switchable polar control retarders 300, while achieving desirable image luminance for higher viewing angles when operated in share mode.

Polar region 65 represents the field of view of the border of a 14" laptop display viewed by a head-on observer at 500 mm and polar region 67 represents the field of view of the border of the display viewed by an off-axis snooper at 45 degrees and a distance along the normal 199 of 600 mm.

In prior art unpupillated displays, the luminance contours vary across the field of view. Thus a prior art display with such an unpupillated backlight has a central luminance of 100% and less than 50% luminance in the upper right and upper left corners. It would be desirable to increase the luminance uniformity for such a backlight profile.

In an illustrative embodiment of the arrangements of FIGS. 6A-B facet ridges 54 are arranged as in TABLE 1.

TABLE 1

| | |
|---|---|
| αU | 58.1° |
| βU | 52.5° |
| αD | 52.5° |
| βD | 58.1° |
| γL | +12.5° |
| γC | 0.0° |
| γR | −12.5° |

In the present embodiments, facet angles of respective facets 53, defined between a normal to the facet 53 and a normal (z-direction) to the plane (x-y plane) may be between 40° and 70° preferably between 42.5° and 65°, and more preferably between 42.5° and 62.5° as will be further described with reference to FIG. 17C hereinbelow.

Further a polar control retarder 300 is provided as illustrated in FIG. 1A and in TABLE 2.

TABLE 2

| Alignment type | LC layer 314 retardance | Additional passive retarder 330 type | Additional passive retarder 330 retardance |
|---|---|---|---|
| Homogeneous | 750 nm | | |
| Homogeneous | | Negative C-plate | −440 nm |

Image uniformity can be assessed by comparing variation of luminance across the display for the viewing positions in polar space 29A~M as indicated.

Figure 8A:
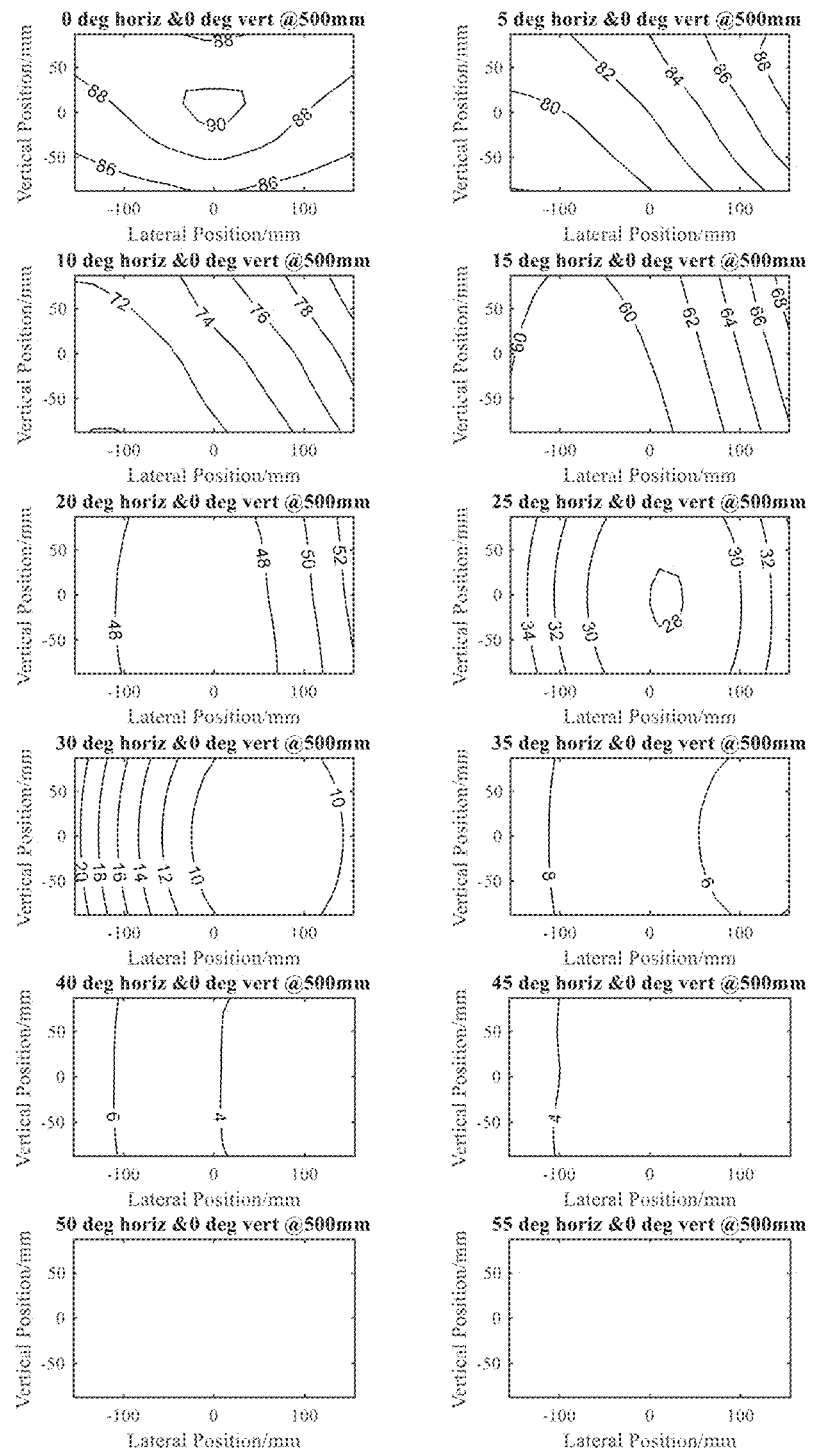
FIG. 8A is an array of schematic graphs illustrating the variation of luminance for different viewing angles in a display of FIG. 1A comprising a curved optical turning film component with variable tilt facets.
Figure 8B:
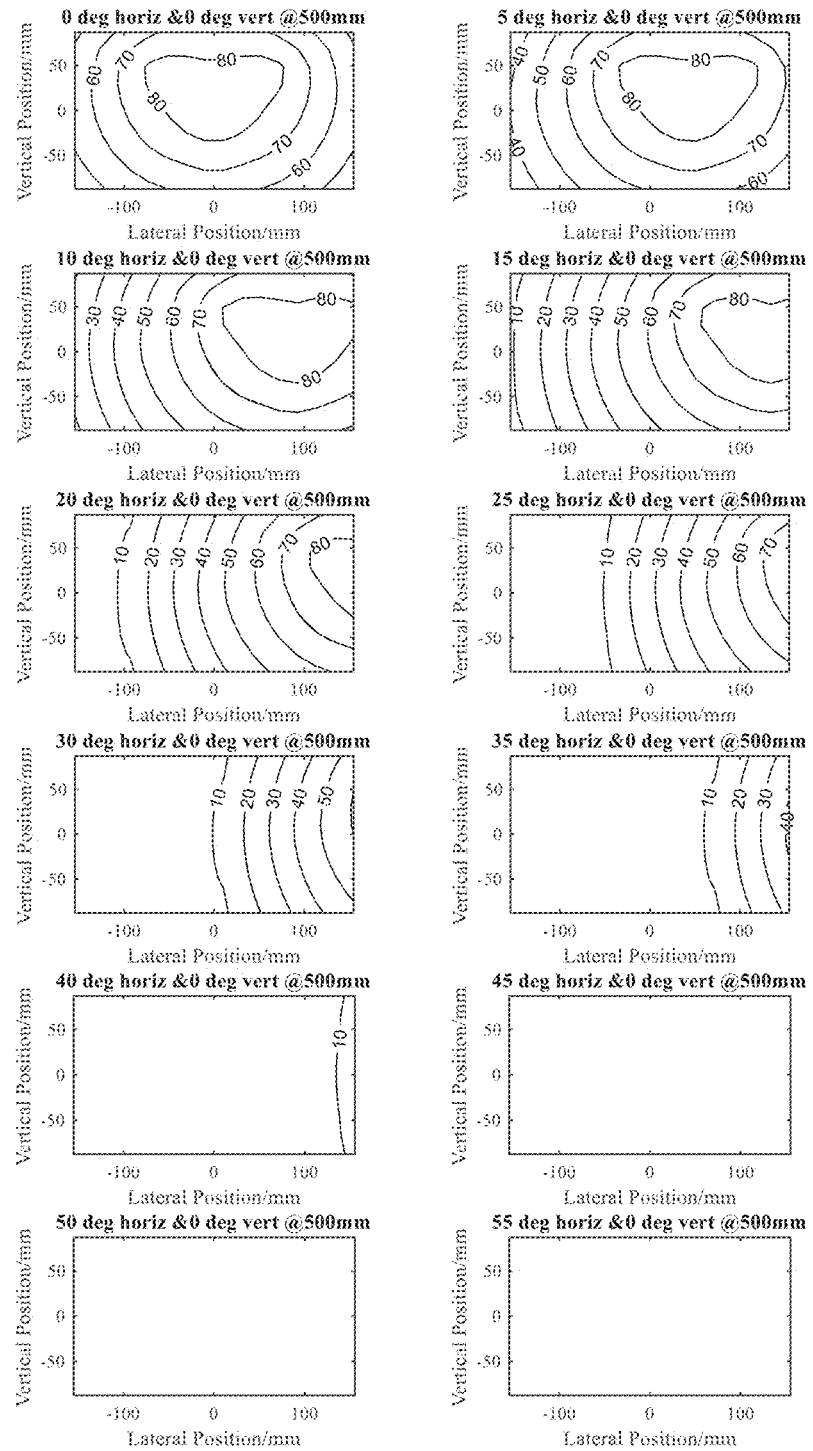
FIG. 8B is an array of schematic graphs illustrating the variation of luminance for different viewing angles in a display comprising a linear optical turning film component with uniform tilt facets.

FIG. 8A is an array of schematic graphs illustrating the variation of luminance for different viewing angles in a display 100 of FIG. 1A comprising a curved optical turning film component 50 with variable tilt facets 53; and by way of comparison with the present embodiments FIG. 8B is an array of schematic graphs illustrating the variation of luminance for different viewing angles in a display 100 comprising a linear optical turning film component 50 with uniform tilt facets 53 such that the output is unpupillated.

Comparing FIG. 8A and FIG. 8B, for each viewing angle location, the uniformity of the display 100 across the area of the display is advantageously increased. Further, the head-on luminance is not reduced and high power efficiency is achieved with low thickness.

The operation of the display in privacy mode to an observer 45 and snooper 47 will now be described.

Figure 9A:
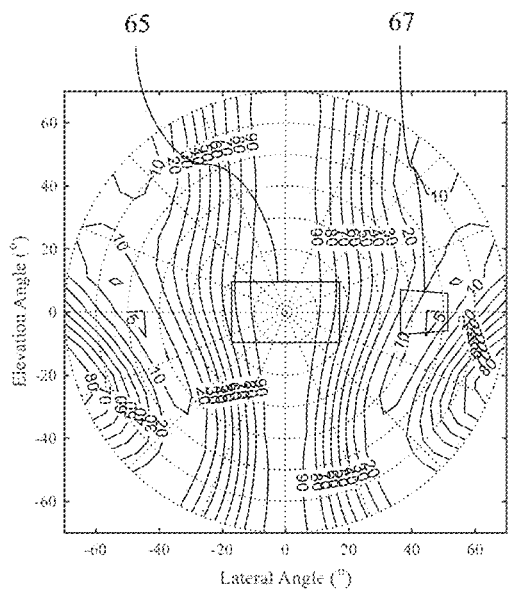
FIG. 9A is a schematic graph illustrating the polar variation of transmission of a switchable retarder arranged between parallel polarisers for switchable liquid crystal retarders driven for privacy mode.
Figure 9B:
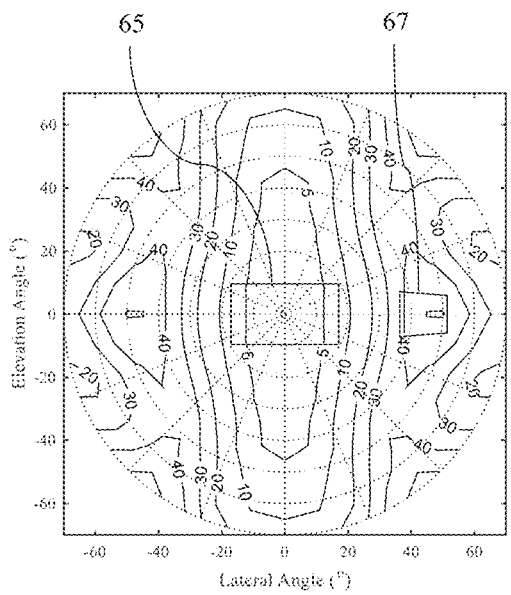
FIG. 9B is a schematic graph illustrating the polar variation of relative reflection of a switchable retarder arranged between a reflective polariser and absorbing polariser for switchable liquid crystal retarders driven for privacy mode.

FIG. 9A is a schematic graph illustrating the polar variation of transmission of a switchable retarder 300 arranged between parallel polarisers 218, 318 for the switchable liquid crystal retarders 301 driven for privacy mode; and FIG. 9B is a schematic graph illustrating the polar variation of relative reflection of a switchable retarder 300 arranged between a reflective polariser 302 and absorbing polariser 318 for switchable liquid crystal retarders 301 of TABLE 2 driven in privacy mode.

Figure 9C:
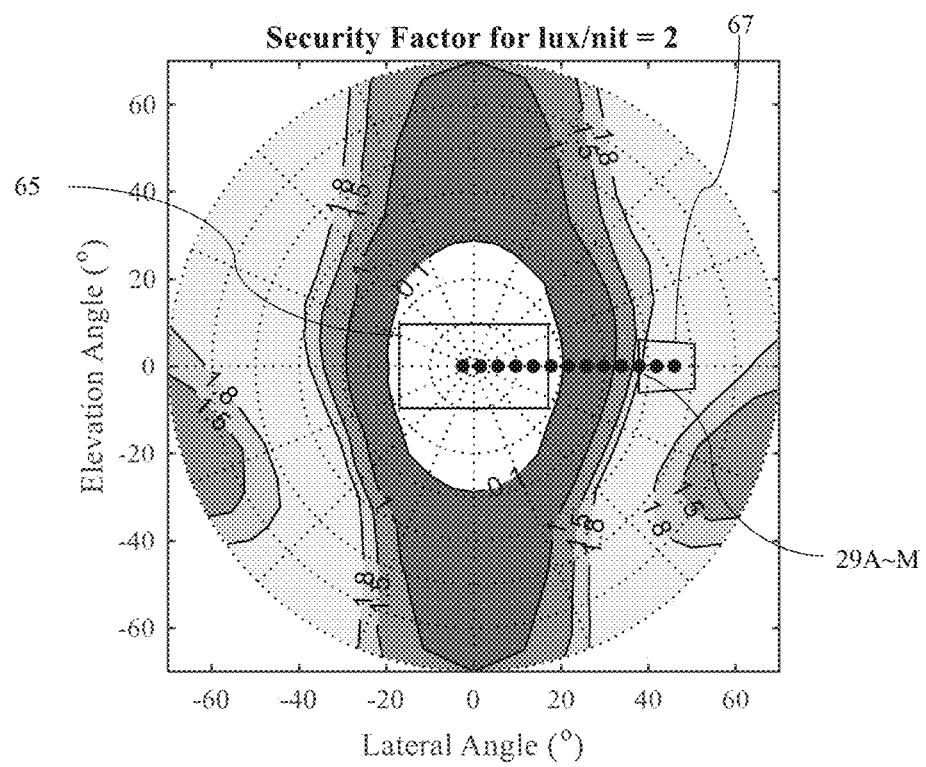
FIG. 9C is a schematic graph illustrating the polar and azimuthal variation of visual security factor, S in a privacy mode of operation for a display head-on luminance, of value $Y_{max}$ measured in nits that is half of the illuminance of value I measured in lux.

FIG. 9C is a schematic graph illustrating the polar and azimuthal variation of visual security factor, S in the switchable privacy display 100 of FIG. 1A and TABLE 2 driven in privacy mode of operation for a display 100 head-on luminance, of value $Y_{max}$ measured in nits that is half of the illuminance of value I measured in lux. The backlight 20 comprises the waveguide of FIG. 3 and the optical turning film component of TABLE 1.

The variation of uniformity of security factor S with viewing location will now be described.

Figure 10A:
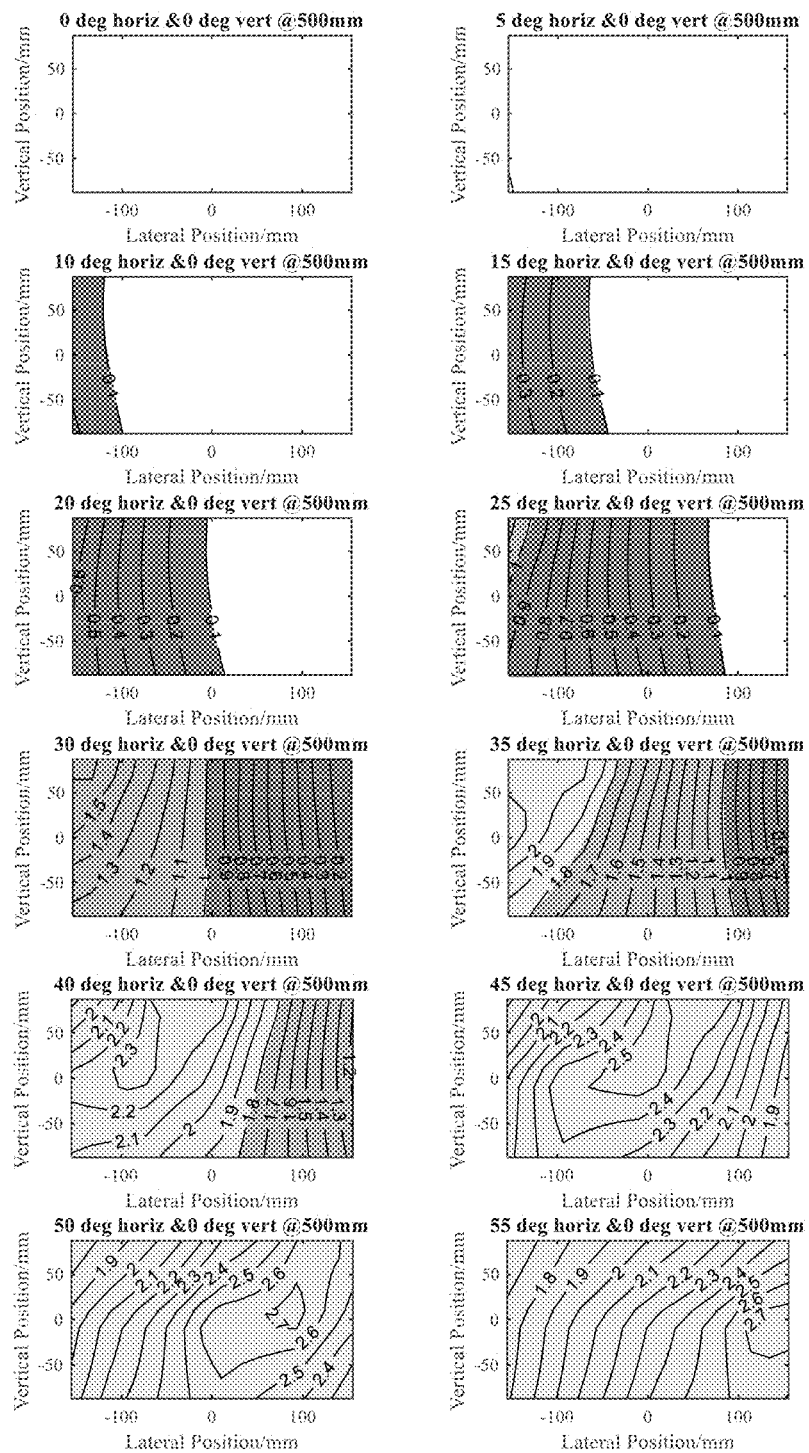
FIG. 10A is an array of schematic graphs illustrating the variation of security factor, S for different viewing angles in a display of FIG. 1A comprising a curved optical turning film component with variable tilt facets for a display head-on luminance, of value $Y_{max}$ measured in nits that is half of the illuminance of value I measured in lux.

FIG. 10A is an array of schematic graphs illustrating the variation of security factor, S for different viewing angles in a display 100 of FIG. 1A comprising a curved optical turning film component 50 with variable tilt facets 53 for a display 100 head-on luminance, of value $Y_{max}$ measured in nits that is half of the illuminance of value I measured in lux. The viewer and snooper viewing distance is set to be 500 mm. In practice snoopers will be further from the display than the viewer and increased security factor may be achieved.

Figure 10B:
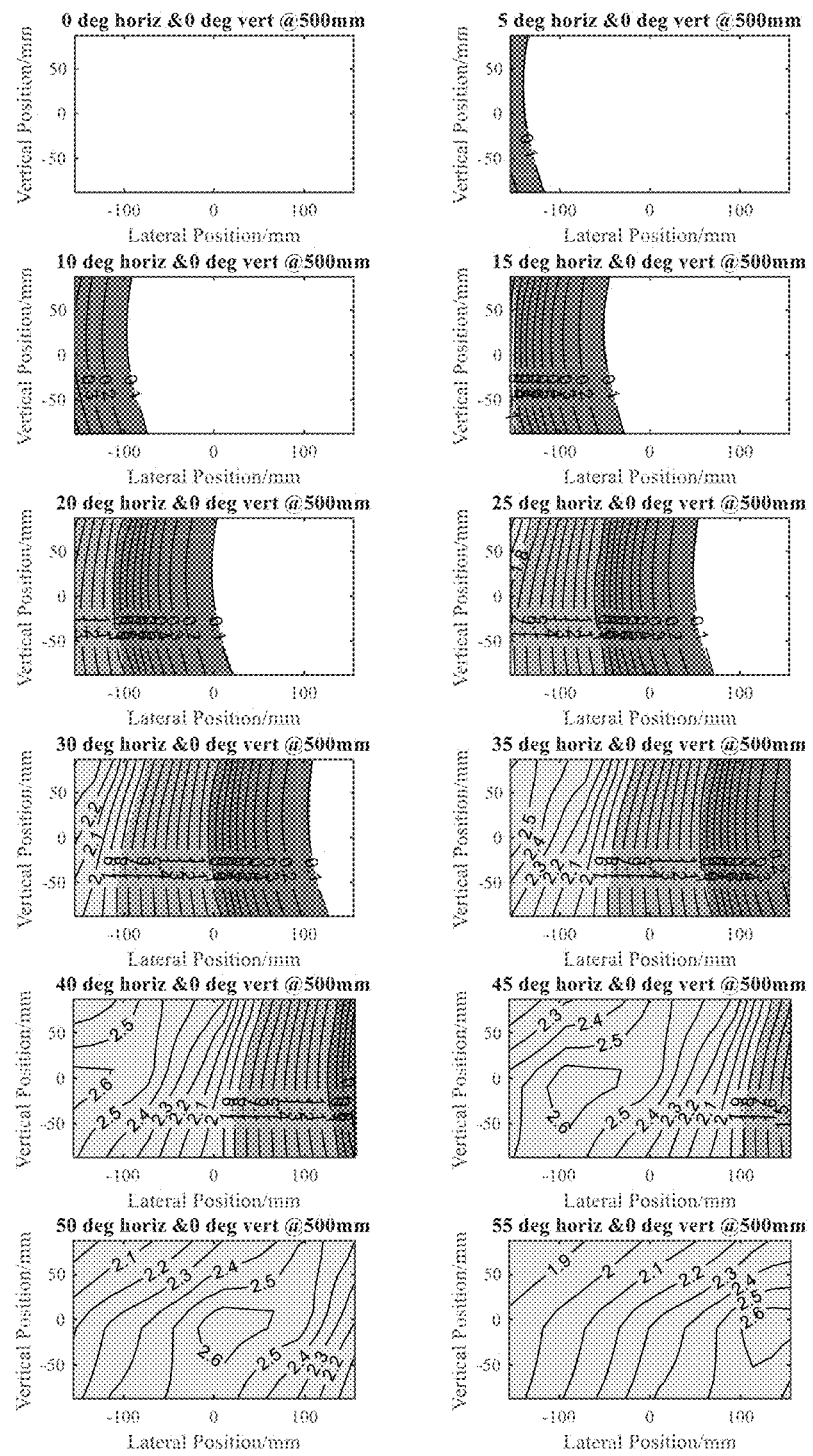
FIG. 10B is an array of schematic graphs illustrating the variation of security factor, S for different viewing angles in a display comprising a linear optical turning film component with uniform tilt facets for a display head-on luminance, of value $Y_{max}$ measured in nits that is half of the illuminance of value I measured in lux.

By way of comparison FIG. 10B is an array of schematic graphs illustrating the variation of security factor, S for different viewing angles in a display 100 comprising a linear optical turning film component 50 with uniform tilt facets 53 for a display 100 head-on luminance, of value $Y_{max}$ measured in nits that is half of the illuminance of value I measured in lux, that is for an unpupillated backlight 20. The viewer and snooper viewing distance is set to be 500 mm.

In the graphs of FIGS. 9C-10B, regions with S<0.1 represent regions of the display with high image visibility, 0.1≤S<1.0 represent regions with reduced image visibility but are not private, 1.0≤S<1.8 represent regions that are invisible depending on image content and S≥1.8 represent regions where all images are substantially invisible.

Comparing FIGS. 10A and 10B advantageously the present embodiments (of FIG. 10A) achieve increased image visibility for users near the axis. Further, for snoopers at higher angles such as at 40° increased image security is achieved across the whole of the display, that is the display has switched to full privacy mode at a faster speed. At intermediate angles, the security factor is more uniform across the display area, advantageously achieving increased security performance for all image data irrespective of location over the display active area.

It would be desirable to provide a public mode of operation with higher luminance at off-axis positions.

Figure 11A:
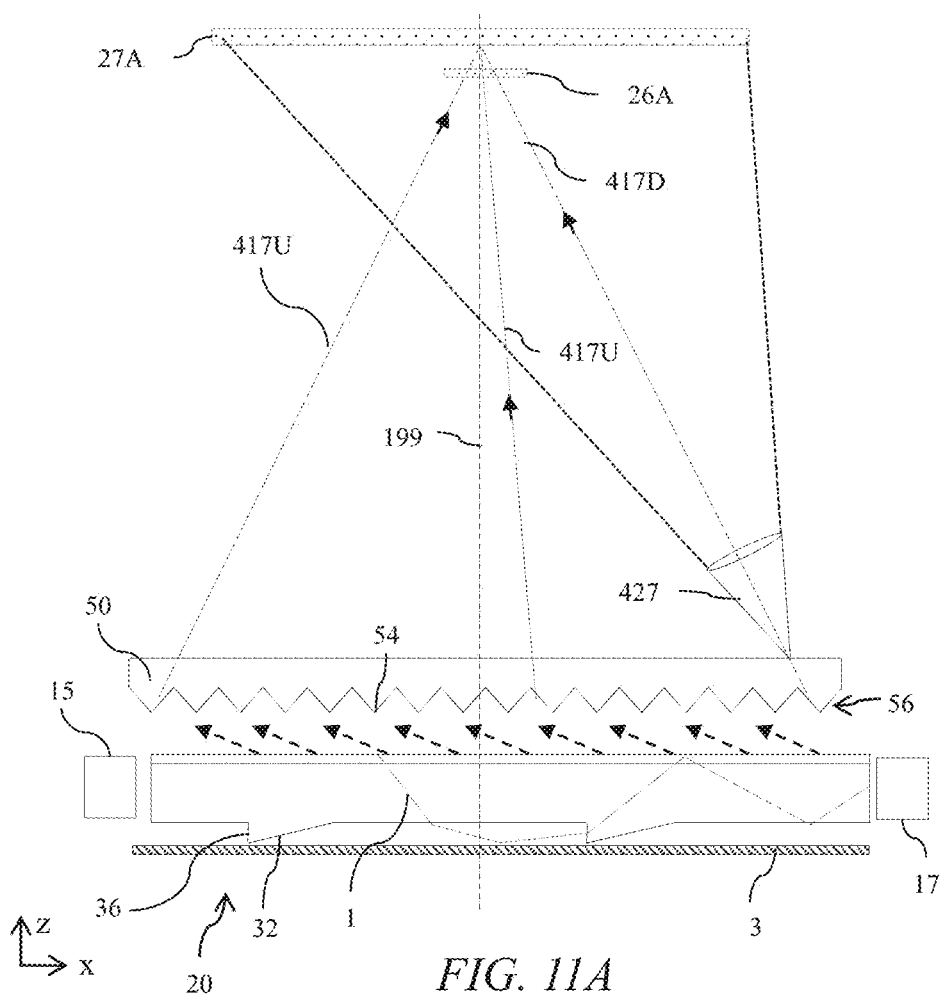
FIG. 11A is a schematic diagram illustrating a side view of a pupillated backlight for first and second light sources.
Figure 11B:
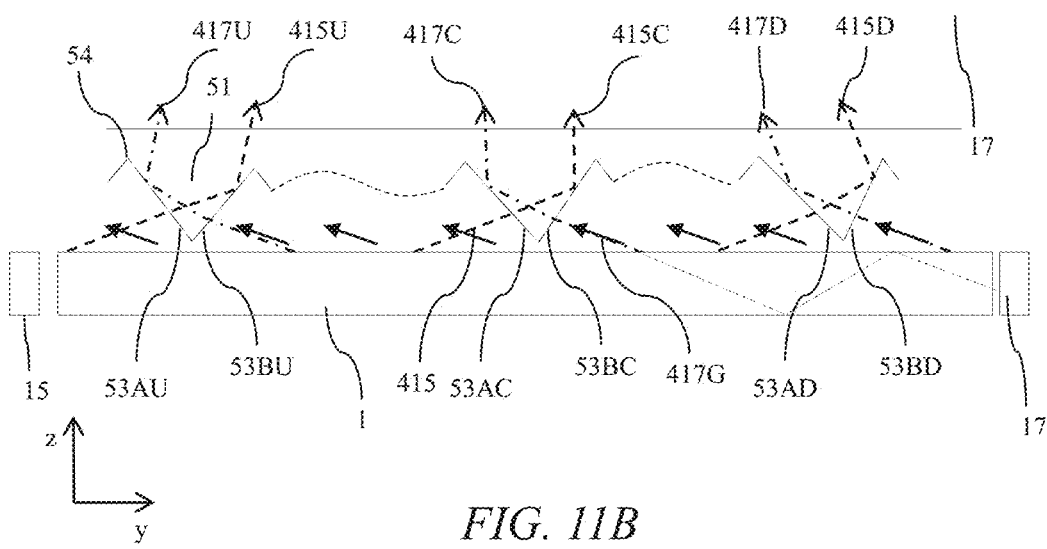
FIG. 11B is a schematic diagram illustrating a side view of operation of variable tilt facets of a turning film of a pupillated backlight for first and second light sources.

FIG. 11A is a schematic diagram illustrating a side view of a pupillated backlight 20 for first and second light sources 15, 17; and FIG. 11B is a schematic diagram illustrating a side view of operation of variable tilt facets 53 of an optical turning film component 50 of a pupillated backlight 20 for first and second light sources 15, 17. Features of the embodiment of FIGS. 11A-B not discussed in further detail may be assumed to correspond to the features with equivalent reference numerals as discussed above, including any potential variations in the features.

In comparison to the embodiments of FIGS. 4A-B, second light sources 17 are arranged at the second end 4 of the waveguide 1 arranged to input input light in an opposite direction from the at least one first mentioned light source, as further illustrated in FIG. 1A. In comparison to the light leakage of FIG. 4, light escapes the waveguide at least in part by refraction at facets 36 of the waveguide 1 at which it is incident onto reflector 3, or may be directly incident onto optical turning film component 50.

FIG. 1B illustrates that light rays 417G are output from the waveguide 1, refract onto the facets 53B and then are directed by total internal reflection at facets 53A, that is in the opposite order to the light rays 415G.

The deflected light through each input end 2, 4 is directed towards the same common optical window 26 in front of the illumination apparatus 110. As the deflection of the light rays 415, 417 is dominated by the reflection rather than the refraction, the present embodiments achieve pupillation of light rays and provide optical windows 27A. Thus light rays 417U, 415U may be directed in similar directions by means of facet angle selection γA, γB as described elsewhere herein.

Figure 11C:
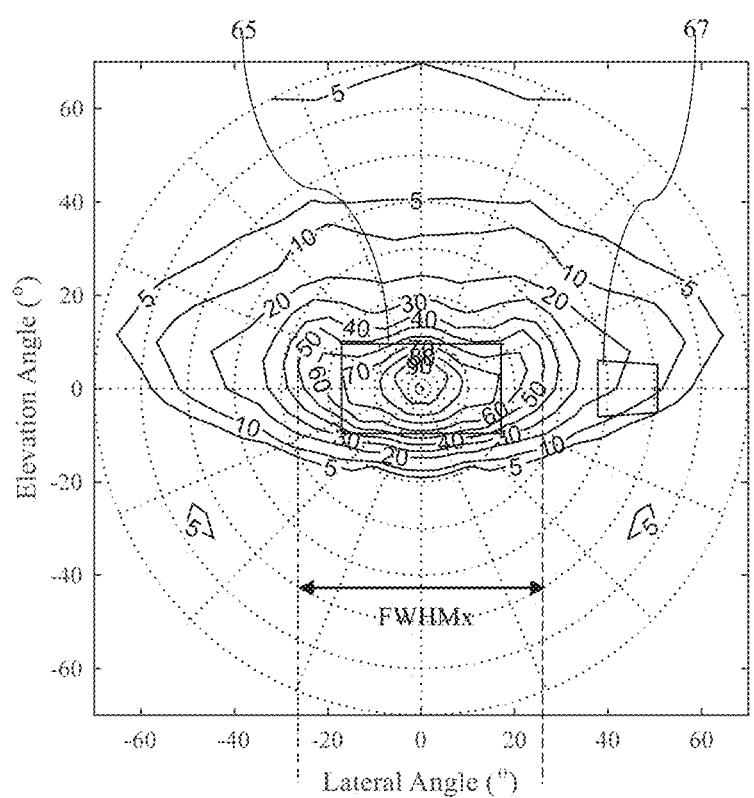
FIG. 11C is a schematic graph illustrating the polar variation of luminance for an illustrative backlight with light input at the second end of the waveguide.

FIG. 11C is a schematic graph illustrating the polar variation of luminance for an illustrative backlight 20 with light input from light sources 17 at the second end of the waveguide 1. The waveguide 1 is thus arranged to cause light from the at least one first light source 15 and the at least one second light source 17 to exit from the waveguide 1 with different angular distributions defined by light cone 427 in comparison to the narrow light cone 425 from light sources 15 and as illustrated in FIG. 4A. Advantageously increased luminance is provided in region 67 for off-axis users 47.

Such an arrangement can be used in a switchable privacy display further comprising polar control retarders 300 and polariser 318 of FIG. 1A. The light sources 15, 17 may be controlled in cooperation with the switchable polar control retarder 300. In a first mode a privacy display may be provided with a small FWHMx and in a second mode a public mode may be provided with a larger FWHMx, and increased luminance at polar locations that are greater the FWHM angles.

Alternatively such an arrangement can be used in a switchable high efficiency display of FIG. 2 and with further light sources 417 at the second end 4 of the waveguide 1. In a first mode a high efficiency display may be provided with a small FWHMx and so reduced lateral viewing freedom with limited off-axis image visibility. In a second mode a wider angle mode may be provided for enhanced off-axis image visibility.

The pupillation of FIG. 11A desirably achieves increased image uniformity from the variable tilt facets 53 of the optical turning film component 50 as described elsewhere herein.

The operation of the display backlight 20 for light rays 417G from the second end onto curved facets will now be described.

Figure 12A:
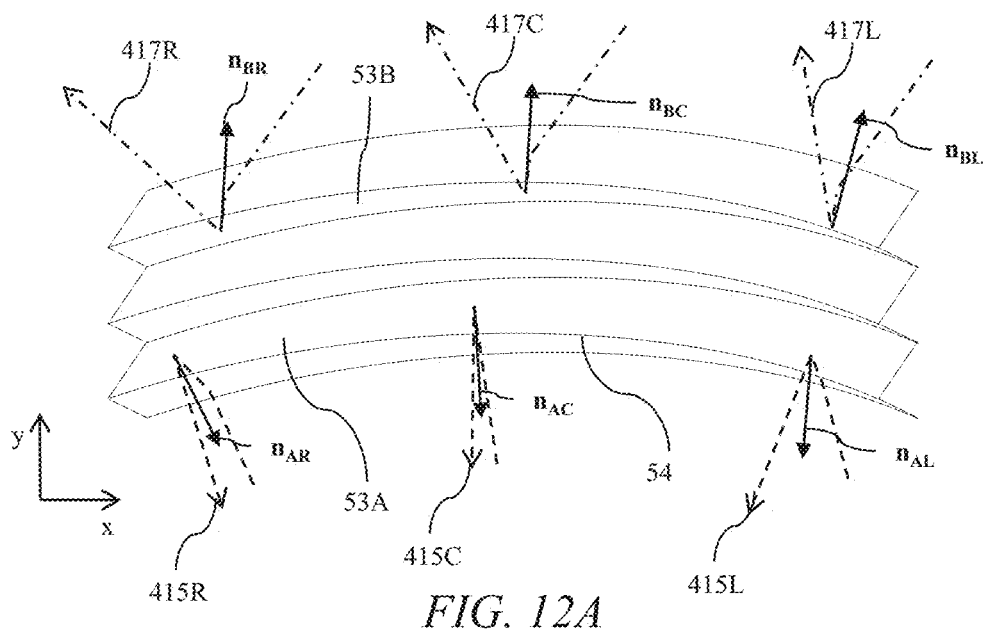
FIG. 12A is a schematic diagram illustrating a front perspective view of operation of facets of a curved optical turning film component of a pupillated backlight for light from first and second light sources.
Figure 12B:
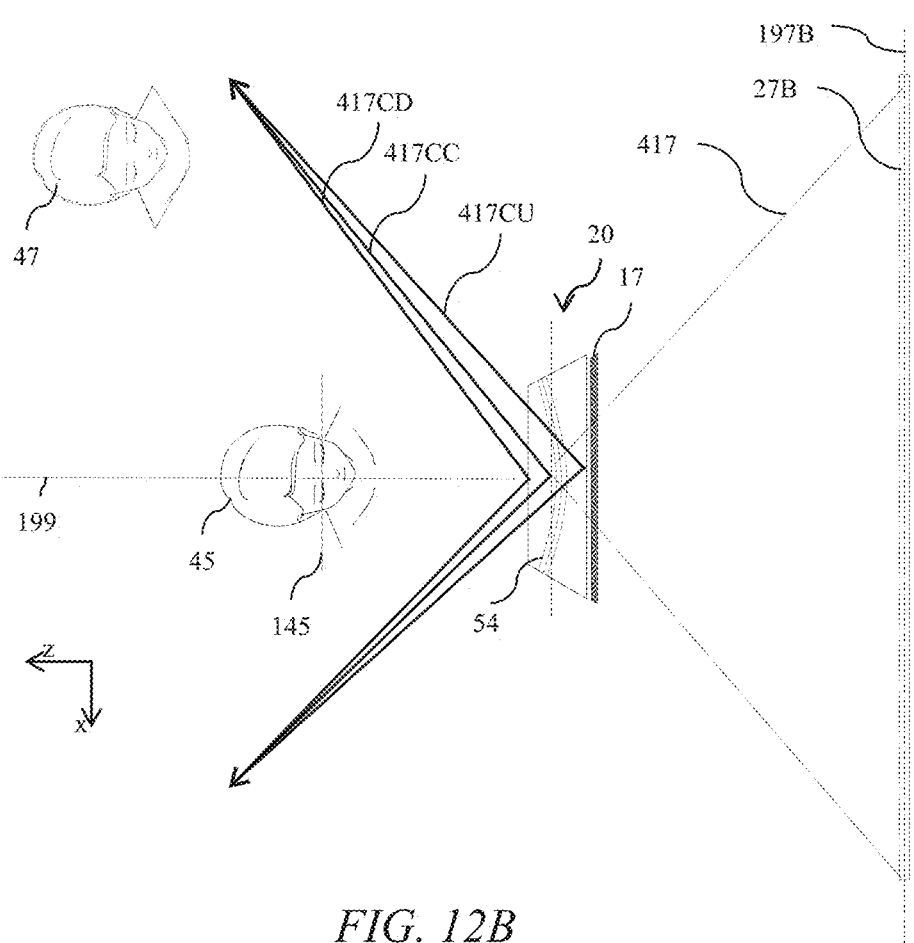
FIG. 12B is a schematic diagram illustrating a top view of operation of a curved optical turning film component of a pupillated backlight for light from the second light source.

FIG. 12A is a schematic diagram illustrating a front perspective view of operation of facets 53 of a curved optical turning film component 50 of a pupillated backlight 20 for light from first and second light sources 15, 17; and FIG. 12B is a schematic diagram illustrating a top view of operation of a curved optical turning film component 50 of a pupillated backlight 20 for light from the second light source 17. Features of the embodiment of FIGS. 12A-B not discussed in further detail may be assumed to correspond to the features with equivalent reference numerals as discussed above, including any potential variations in the features.

The lines of the ridges are curved so that the deflected light input through the first end is directed towards a common optical window 27A in front of the illumination apparatus 110 and the deflected light input through the second end 4 is directed towards a virtual common optical window 27B behind the illumination apparatus 110, in the plane 197B.

Exemplary light rays 417CD, 417CC, 417CU illustrate that the backlight 20 illuminates towards the user 45 and snooper 47, appearing to originate from the virtual optical window 27B. The luminance profile of FIG. 11C is provided across the virtual window and desirable image uniformity in the lateral direction may be advantageously achieved.

Alternative arrangements of operation of a display comprising different optical windows will now be described further.

Figure 13A:
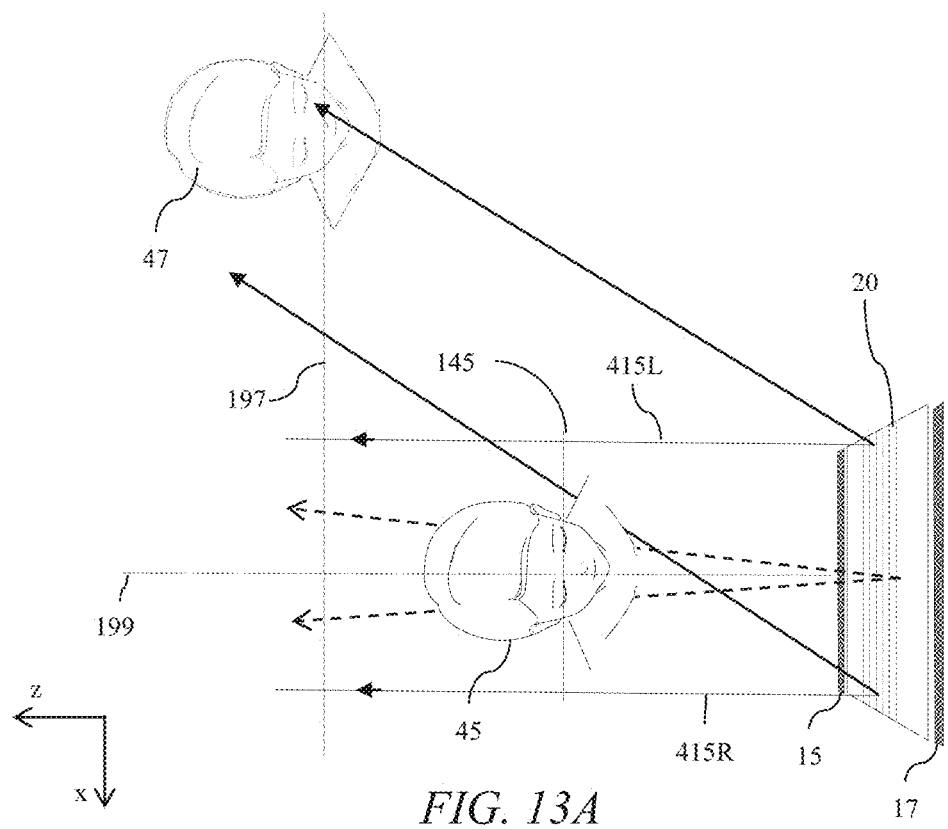
FIG. 13A is a schematic diagram illustrating a top view of operation of a linear optical turning film component of a pupillated backlight comprising variable tilt facets.

FIG. 13A is a schematic diagram illustrating atop view of operation of a linear optical turning film component 50 of a pupillated backlight 20 comprising variable tilt facets 53. Such an arrangement may be provided by the turning film component 50 of FIG. 4C for example. Advantageously for light input from the second light source 17, increased uniformity is achieved in the lateral direction in comparison to the arrangement of FIG. 12B while increased uniformity is achieved in the vertical direction. Further the cost of tooling of the optical turning film and visibility of Moiré artefacts that arise from curved lines of ridges 54 may be reduced.

Figure 13B:
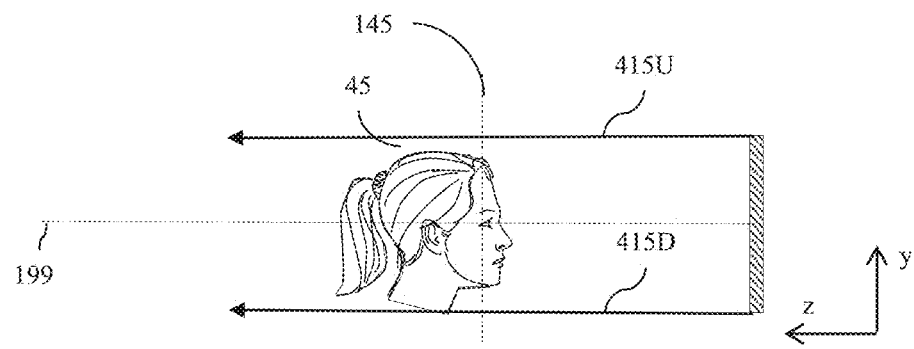
FIG. 13B is a schematic diagram illustrating a side view of operation of a curved optical turning film component of a pupillated backlight comprising uniform tilt facets.

FIG. 13B is a schematic diagram illustrating a side view of operation of a curved optical turning film component 50 of a pupillated backlight 20 comprising uniform tilt facets 53. Such an arrangement may be provided by the turning film component 50 of FIG. 5B for example.

In comparison to the arrangement of FIG. 6A, the arrangement of FIG. 13B may provide increased lateral uniformity but conventional uniformity roll-off in the vertical direction.

Features of the embodiments of FIGS. 13A-B not discussed in further detail may be assumed to correspond to the features with equivalent reference numerals as discussed above, including any potential variations in the features.

Figure 14:
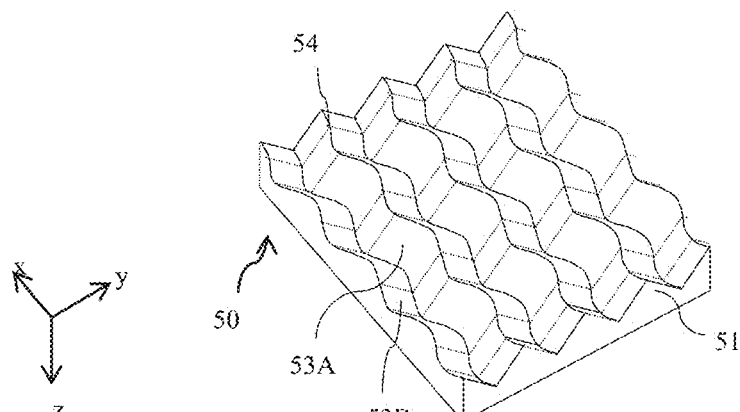
FIG. 14 is a schematic diagram illustrating a rear perspective view of a diffused surface of a turning film.

FIG. 14 is a schematic diagram illustrating a rear perspective view of a diffused surface of an optical turning film component 50. The ridges 54 and facets 53 comprise wobble. Advantageously display uniformity may be increased. Visibility of artefacts arising from manufacturing defects of waveguide 1 may be reduced, advantageously increasing yield and reducing cost. Visibility of defects from damage in use of waveguide 1 may be reduced, advantageously increasing lifetime.

Alternative arrangements of waveguide 1 will now be described.

Figure 15A:
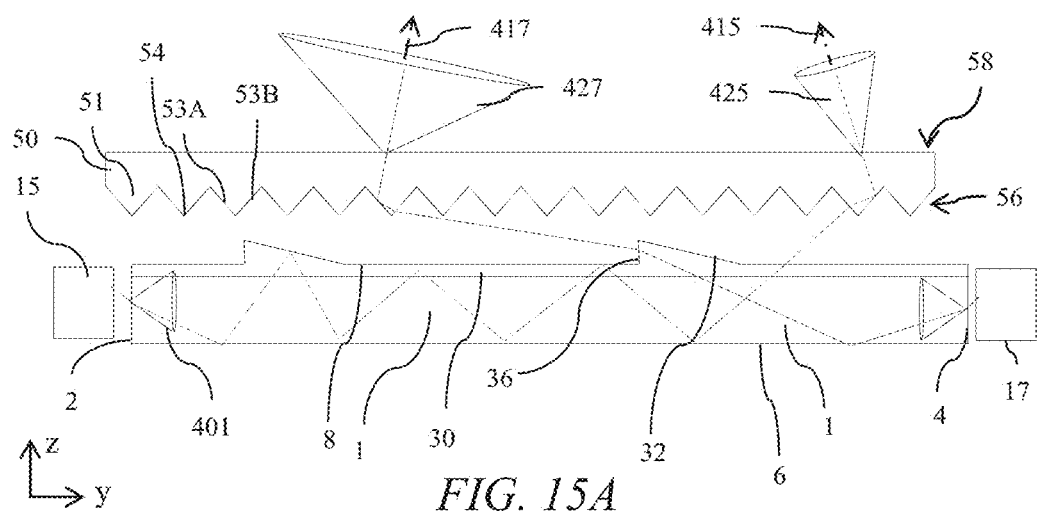
FIG. 15A is a schematic diagram illustrating a side view of a pupillated backlight for first and second light sources.
Figure 15B:
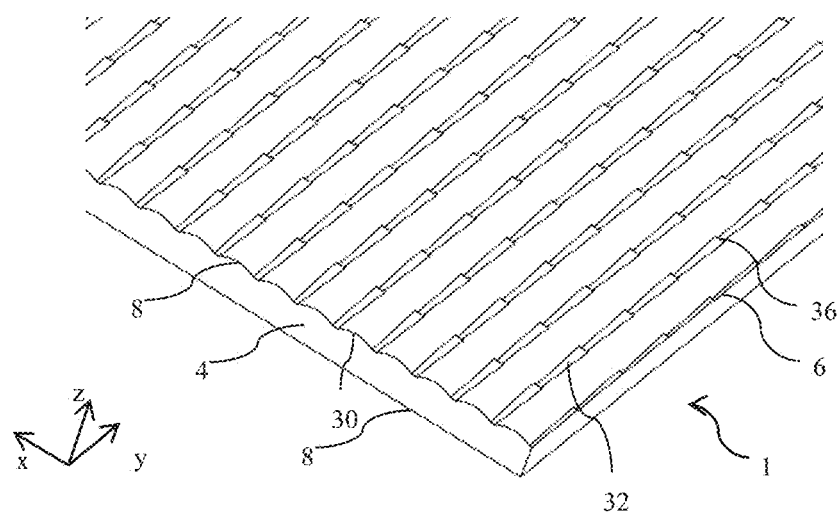
FIG. 15B and FIG. 15C are schematic diagrams illustrating a front perspective view of waveguides for use in a pupillated display.
Figure 15C:
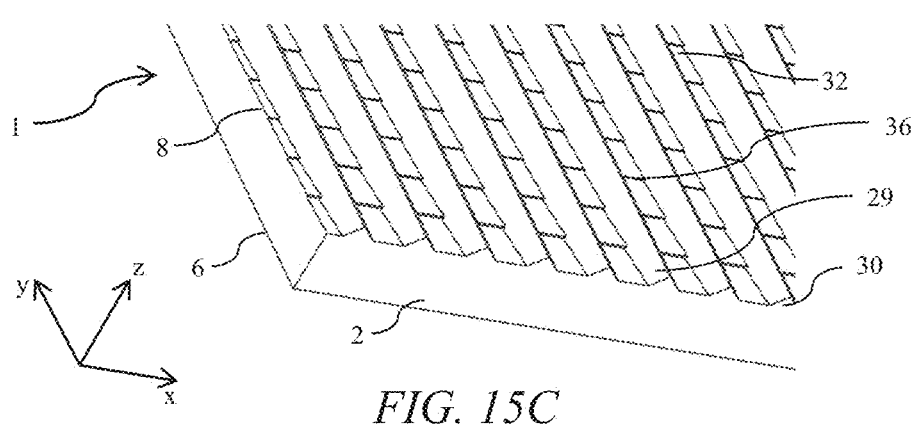

FIG. 15A is a schematic diagram illustrating a side view of a pupillated backlight 20 for first and second light sources 15, 17; and FIGS. 15B-C are schematic diagrams illustrating a front perspective view of waveguides 1 for use in a pupillated display 100. Features of the embodiments of FIGS. 15A-C not discussed in further detail may be assumed to correspond to the features with equivalent reference numerals as discussed above, including any potential variations in the features.

In comparison to the waveguide 1 of FIG. 3, the waveguides 1 have microstructures arranged on a single surface that may be the first surface 6 or may be the second surface 8. In the alternative of FIG. 15A the microstructures are arranged on the second surface 8 and light is output directly from the facets 36 onto the optical turning film component 50. The cone 417 for the second light sources 17 and cone 415 for the first light sources 15 is pupillated as described elsewhere herein.

Advantageously the cost and complexity of the waveguides 1 may be reduced.

It may be desirable to provide first and second optical windows 26, 27 that have the same or similar size.

Figure 16A:
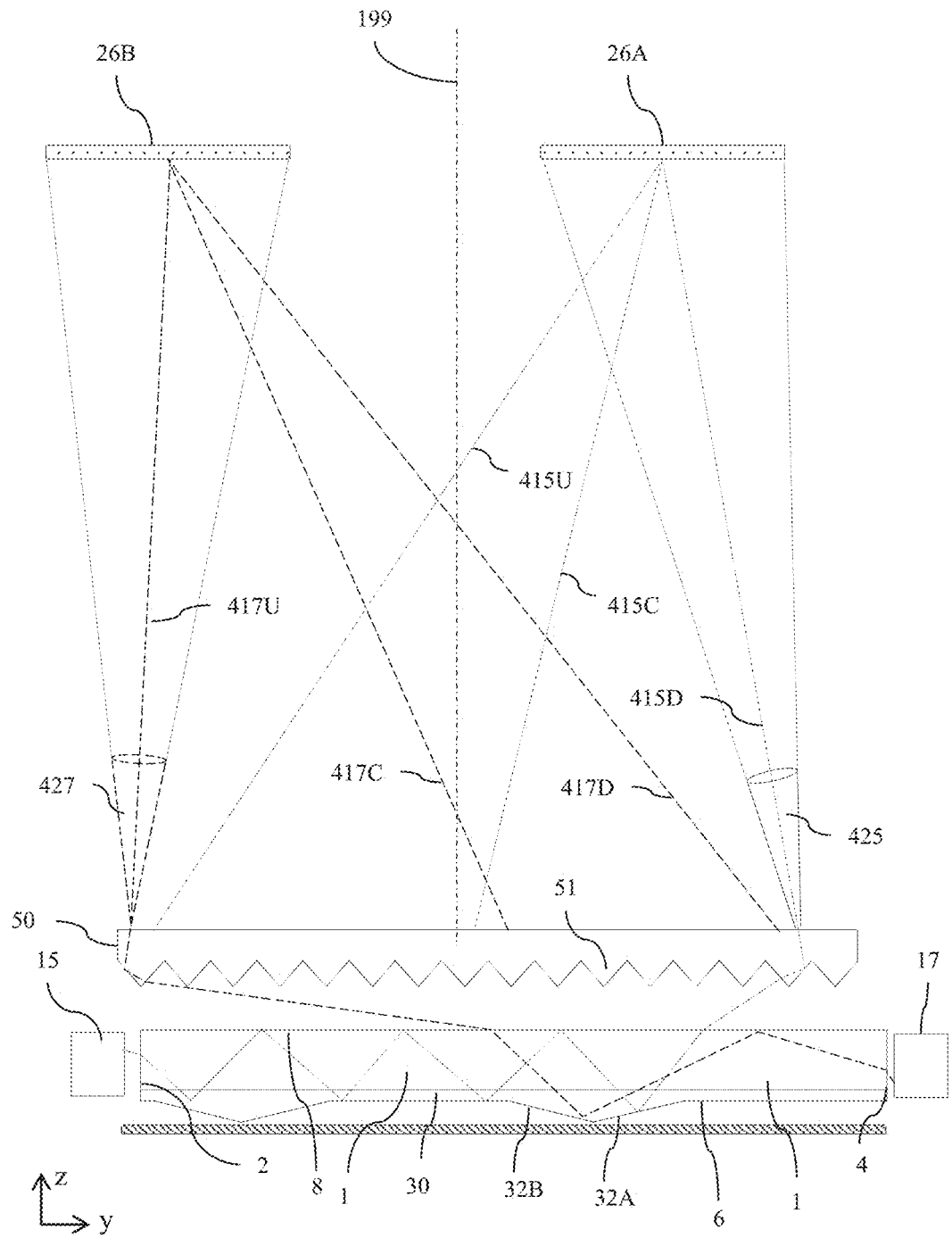
FIG. 16A is a schematic diagram illustrating a side view of a pupillated backlight for first and second light sources.
Figure 16B:
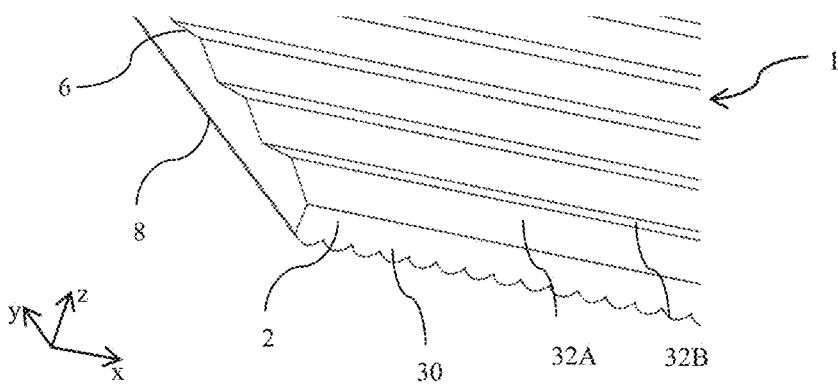
FIG. 16B and FIG. 16C are schematic diagrams illustrating a front perspective view of waveguides for use in a pupillated display.
Figure 16C:
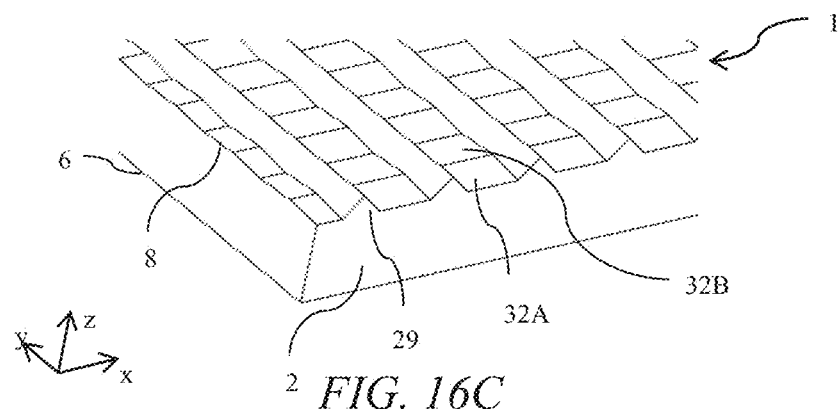

FIG. 16A is a schematic diagram illustrating a side view of a pupillated backlight 20 for first and second light sources 15, 17; and FIGS. 16B-C are schematic diagrams illustrating a front perspective view of waveguides 1 for use in a pupillated display 100. Features of the embodiments of FIGS. 16A-C not discussed in further detail may be assumed to correspond to the features with equivalent reference numerals as discussed above, including any potential variations in the features.

In an alternative embodiment, the waveguide 1 is arranged to cause light from the at least one first light source 15 and the at least one second light source 17 to exit from the waveguide 1 with a common angular distribution, such that angular distributions 425, 427 are the same.

The waveguides 1 of FIGS. 16A-C are provided with first and second facets 32A, 32B rather than the facets 32, 36 described elsewhere herein. Facets 32A, 32B may have similar magnitude of angle of the surface normal to the optical axis 199 direction, and are inclined either side of the optical axis. Output light cones 425, 427 from respective light sources 15, 17 have similar sizes and are arranged by means of the variable tilt of facets 53A, 53B in the direction orthogonal to the lateral direction to point to respective offset optical windows 26A, 26B.

FIG. 16A further illustrates that the location of first and second optical windows 26A, 26B from light sources 415, 417 respectively may be offset from the optical axis 199 from the centre of the display, as also illustrated in FIG. 4C. Such an arrangement may provide offset viewing geometries, as will be described with reference to FIG. 16D, below.

The optical windows 26A, 26B may be arranged in the same location that may be an on-axis location (centred around optical axis 199) or an off-axis location. The control system is arranged to provide illumination from both the at least one first light source 15 and the at least one second light source 17 so as to increase spatial uniformity of illumination across the illumination device for at least one viewing location. In such an arrangement, the outputs from both waveguides 1 are combined by the optical turning film component 50. Waveguides 1 may have non-uniformities of extraction in the direction orthogonal to the lateral direction, that is dependent on distance from the light source 15, so that such a combination may achieve improved extraction efficiency. Advantageously uniformity of luminance may be increased.

Figure 16D:
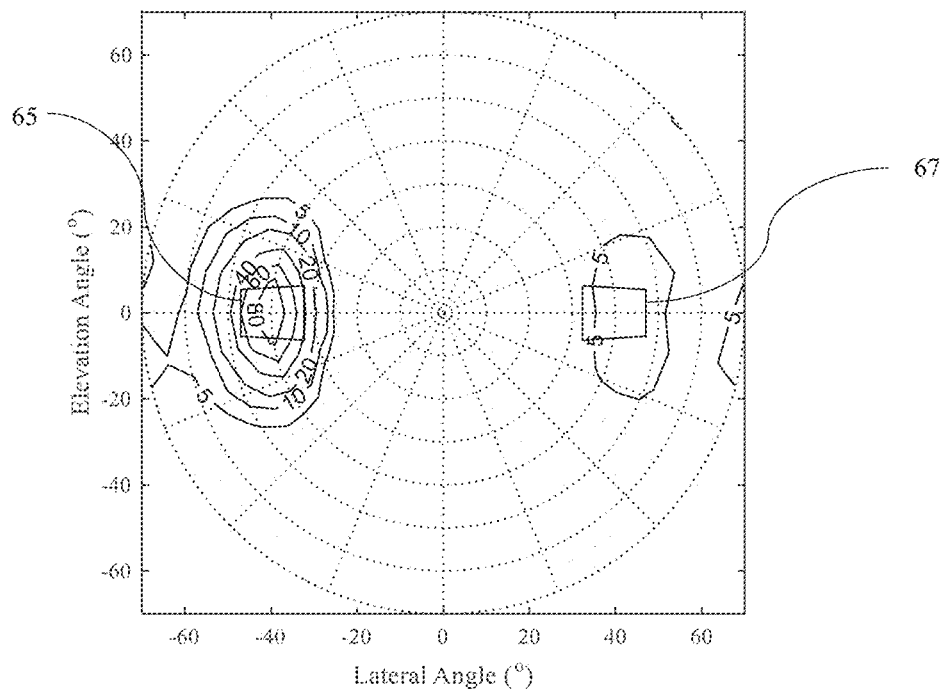
FIG. 16D is a schematic graph illustrating the polar variation of luminance for the illustrative backlight of FIGS. 16A-B with light input into the upper waveguide.

FIG. 16D is a schematic graph illustrating the polar variation of luminance for the illustrative backlight 20 of FIGS. 16A-B with light input into the upper waveguide 1 from second light source 17.

Such an output may be suitable for application to a vehicle as illustrated in FIG. 1C, with fields of view 65, 67 for driver 45 and passenger 47 respectively. The optical turning film is arranged to provide optical windows 26A, 26B such that luminance uniformity is increased.

Light input from the first light source 15 correspondingly produces a similar high luminance profile in the region of the field of view 67 for the passenger 47.

Such a backlight 20 may provide a display 100 that is visible to a driver at night-time, advantageously with low stray light to the remainder of the cabin. Further such a backlight 20 when illuminated by light source 15 only may provide high luminance to the passenger 47 and not to the driver. Such a backlight 20 may advantageously provide some degree of image privacy to the driver 45. In another mode of operation both light sources 15, 17 may be illuminated so that fields of view 65, 67 may both be illuminated. Advantageously a high efficiency display 100 may be provided.

It may be desirable to increase the uniformity of input light on to the optical turning film 50.

Figure 17A:
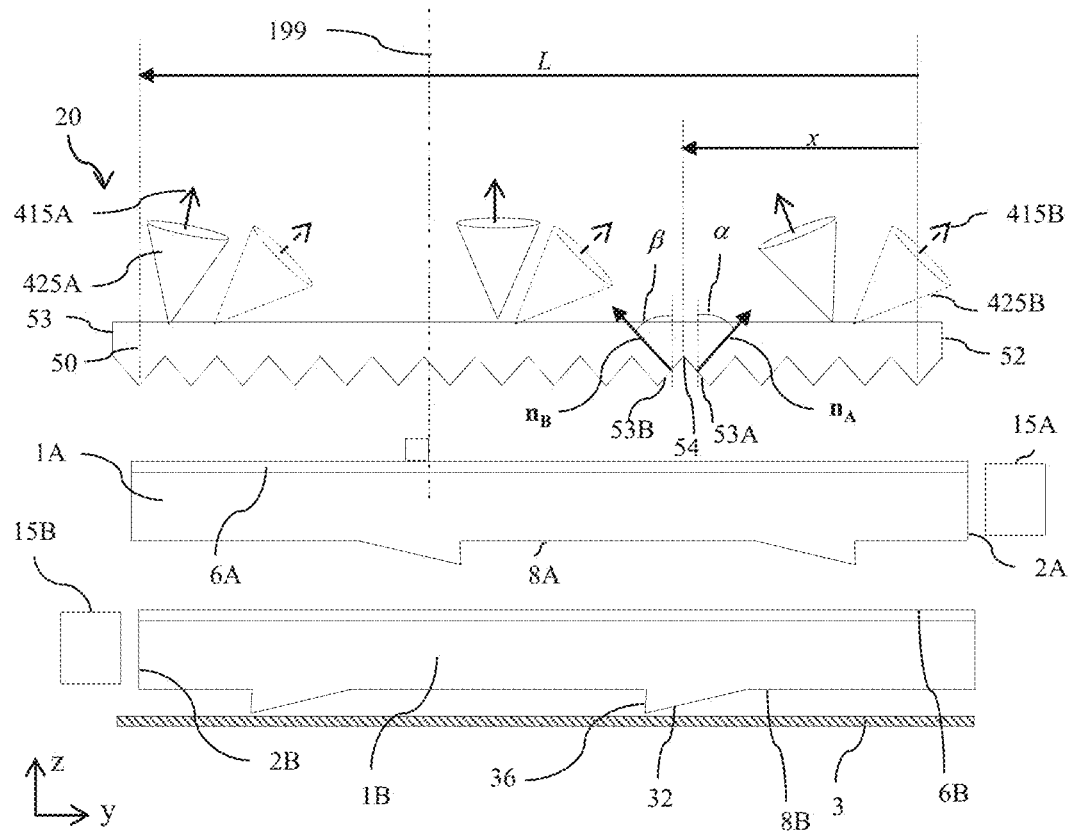
FIG. 17A is a schematic diagram illustrating a side view of a pupillated backlight for comprising first and second waveguides, each waveguide comprising a first light source.
Figure 17B:
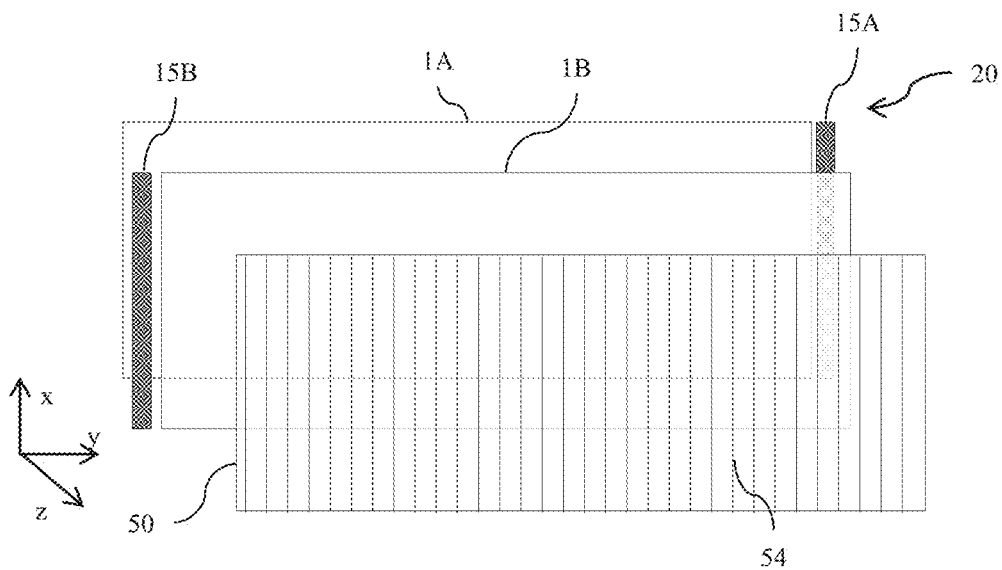
FIG. 17B is a schematic diagram illustrating a front perspective view of the pupillated backlight of FIG. 17A.

FIG. 17A is a schematic diagram illustrating a side view of a pupillated backlight 20 comprising first and second waveguides 1A, 1B each waveguide 1A, 1B comprising a respective first light source 15A, 15B; and FIG. 17B is a schematic diagram illustrating a front perspective view of the pupillated backlight of FIG. 17A. Features of the embodiments of FIGS. 17A-B not discussed in further detail may be assumed to correspond to the features with equivalent reference numerals as discussed above, including any potential variations in the features.

In comparison to FIG. 1A, the illumination apparatus further comprises at least one second light source 17 arranged to provide input light in an opposite direction from the at least one first mentioned light source 15 as viewed along the optical axis 199 normal to the plane (x-y plane). The waveguide arrangement further comprises a second waveguide 1B that extends across the same plane (x-y plane) as the first waveguide 1A and comprises: first and second opposed light guiding surfaces 6A, 8A arranged to guide light along the first waveguide 1A, the second light guiding surface being arranged to guide light by total internal reflection; and an input end 2A arranged between the first and second light guiding surfaces 6A, 8A and extending in a lateral direction between the first and second light guiding surfaces 6A, 8A. The second waveguide 1B is arranged to receive the input light from the at least one second light source 15B through the input end 2B, and being arranged to cause light from the at least one second light source 15B to exit from the second waveguide 2B through the second light guiding surface by breaking total internal reflection. The input surface of the optical turning film component 50 is arranged to receive the light exiting from the first waveguide 1A and the second waveguide 1B.

The optical turning film component 50 comprises: an input surface 56 arranged to receive the light exiting from the waveguide 1, the input surface 56 extending across the plane (x-y plane); and an output surface 58 facing the input surface 56. The input surface 56 comprises: an array of prismatic elements 52 each comprising a pair of facets 53 defining a ridge 54 therebetween. The output surface 58 is planar. For each pair of facets 53A, 53B, the first facet 53A has a normal $n_A$ on the internal side of the input surface 56 that is inclined towards a first side 52 of the optical turning film 50 and a second facet 53B has a normal $n_B$ on the internal side of the input surface 56 that is inclined towards a second side 53 of the optical turning film 50 opposite to from the first end 52, the first facets 53A having respective facet angles α, defined between the normal to the facet 53A and a normal (z-direction) to the plane (x-y plane), that vary across the array so that the deflection varies in a direction that is orthogonal (y-direction) to an optical axis 199 normal to the plane (z-direction) and corresponds to a direction orthogonal (y-direction) to the lateral direction (x-direction).

In comparison to the embodiment of FIG. 1A, FIGS. 17A-B illustrate an alternative backlight 20 of the present embodiments comprising first and second waveguides 1A, 1B with light sources 15A, 15B arranged on the short sides of the waveguides 1A, 1B and at facing ends of respective waveguides 1A, 1B.

Considering a viewing arrangement similar to that illustrated in FIG. 1C, the light sources 15A aligned with the front waveguide 1A are arranged to illuminate the passenger 45 while light sources 15B while light sources 15B aligned with the rear waveguide 1B are arranged to illuminate the driver 47. In operation, light rays 415A with cones 425A are directed to a first optical window 26A, such as near to the passenger 45 while light rays 415B with cones 425B are directed in parallel directions, that are towards the driver 47.

Figure 17C:
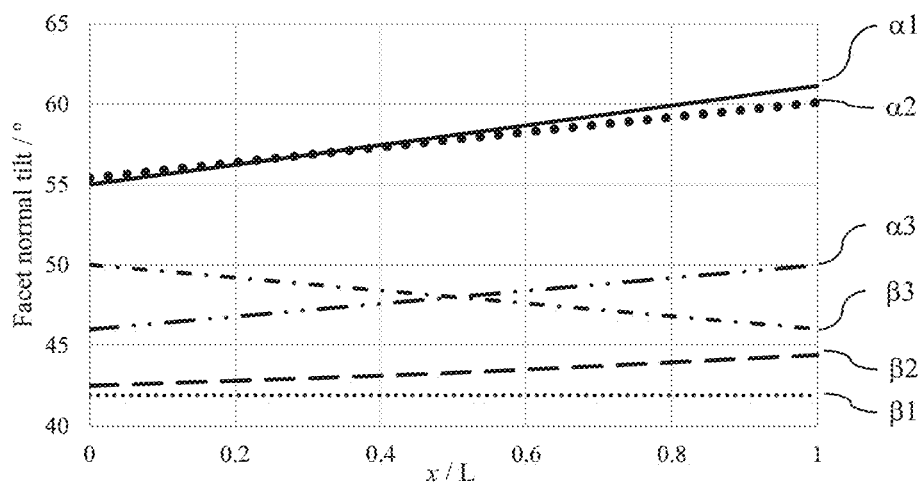
FIG. 17C is a schematic graph illustrating the variation of facet tilts for various optical turning film components for use with the backlight of FIGS. 17A-B.

FIG. 17C is a schematic graph illustrating the variation of facet 53A, 53B tilts a, 3 for various optical turning film components 50 of FIGS. 17A-B for various illustrative embodiments.

FIG. 17A illustrates the angle α to the normal for the facet 53A for which light from light sources 15A is total internally reflected after refraction at facet 53B; and the angle f to the normal for the facet 53B for which light from light sources 15B is total internally reflected after refraction at facet 53A.

For a position x from one edge of the turning film component 50 of width L, the relative position across the turning film component 50 is given by x/L.

In a first illustrative embodiment of FIG. 17C, the facet angle α1 varies with relative position x/L and the facet angle β1 is constant for all relative lateral positions, x/L. Light rays 415A are directed towards a common window 26A that is near to optical axis.

Light rays 415B are directed towards a common window 26A that is inclined to optical axis 199 by refraction at facets 53A and total internal reflection at the facets 53B. The window distance $Z_{wA}$ may be shorter than the window distance $Z_{WB}$. For example the distance $Z_{WA}$ may be near the passenger 45 nominal viewing distance while the distance $Z_{WB}$ may be at infinity. Advantageously the complexity of the tooling for forming the prismatic array is reduced. Typically the distance $Z_{WA}$ is arranged to be greater than the nominal passenger distance to advantageously achieve desirable luminance uniformity variations with lateral passenger 45 location.

Considering facets 53A, 53B at least some of the facets 53A have respective facet angles α1, α2, defined between a normal to the facet and a normal (z-direction) to the plane (x-y plane), of between 52.5° and 62.5°. In respect of at least some of the facets 53B have respective facet angles β2, defined between a normal to the facet and a normal (z-direction) to the plane (x-y plane), of between 42.5° and 52.5°. In another embodiment at least some of the facets β1 have respective facet angle, defined between a normal to the facet and a normal (z-direction) to the plane (x-y plane), of between 40° and 52.5°.

In each pair of facets 53A, 53B, a first facet 53A has a normal on the internal side of the input surface that is inclined towards the input end 2 of the first waveguide 1A and a second facet 53B has a normal on the internal side of the input surface that is inclined away from the input end 2A of the first waveguide 1A, the first facets 53A having respective facet angles α, defined between the normal to the facet and a normal (z-direction) to the plane (x-y plane), that vary across the array 50 so that the deflection varies in a direction that is orthogonal to an optical axis 199 normal (z-direction) to the plane (x-y plane) and corresponds to a direction orthogonal to the lateral direction.

Figure 17D:
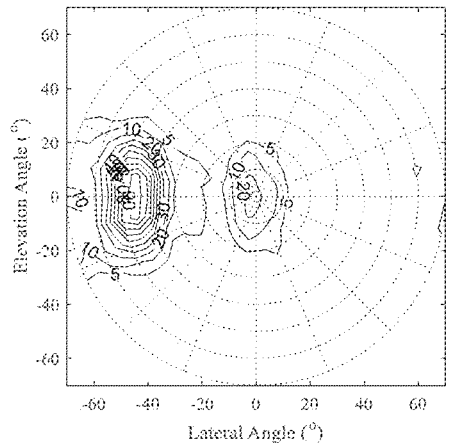
FIG. 17D is a schematic graph illustrating the polar variation of luminance for the backlight of FIG. 17A comprising the waveguide of FIG. 3 and a first optical turning film component of FIGS. 17A-C for light from the first light source.
Figure 17E:
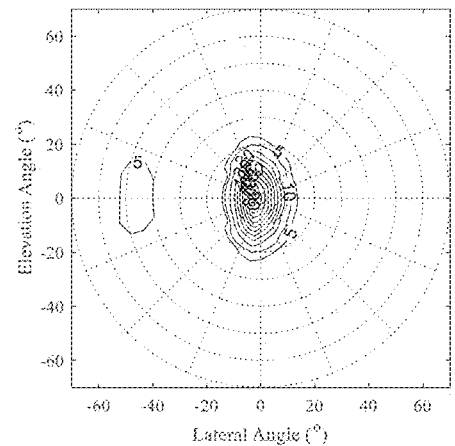
FIG. 17E is a schematic graph illustrating the polar variation of luminance for the backlight of FIG. 17A comprising the waveguide of FIG. 3 and a first optical turning film component of FIGS. 17A-C for light from the second light source.
Figure 17F:
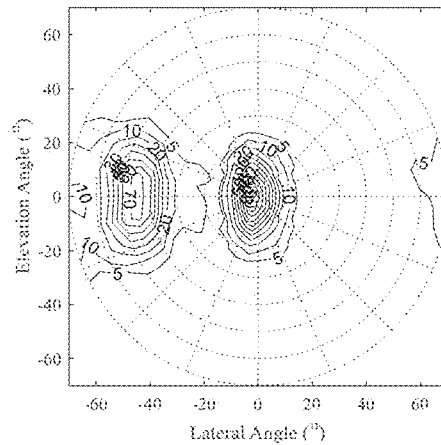
FIG. 17F is a schematic graph illustrating the polar variation of luminance for the backlight of FIG. 17A comprising the waveguide of FIG. 3 and a first optical turning film component of FIGS. 17A-C for light from the first and second light sources.

FIG. 17D is a schematic graph illustrating the polar variation of luminance for the backlight 20 of FIG. 17A comprising the waveguide 1 of FIG. 3 and the optical turning film component 50 of FIGS. 17A-C with facet 53A, 53B angles α1, β1 for light from the first light source 15A; FIG. 17E is a schematic graph illustrating the polar variation of luminance for the backlight 20 of FIG. 17A comprising the waveguide of FIG. 3 and the optical turning film component 50 with facet 53A, 53B angles α1, β1 of FIGS. 17A-C for light from the second light source 15B; and FIG. 17F is a schematic graph illustrating the polar variation of luminance for the backlight 20 of FIG. 17A comprising the waveguide of FIG. 3 and the optical turning film component 50 with facet 53A, 53B angles α1, β1 of FIGS. 17A-C for light from the first and second light sources 15A, 15B.

Referring to FIG. 17C, the first facets 53A have respective facet angles α1, defined between a normal to the facet and a normal (z-direction) to the plane (x-y plane), of between 52.5° and 62.5°. The second facets 53B have respective facet angles β1, defined between the normal to the facet and a normal (z-direction) to the plane (x-y plane), that are constant across the array. Advantageously pupillation may be provided to a second display user, achieving increased uniformity and the cost of tooling of the surface may be reduced.

In an alternative arrangement, the first facets 53A have respective facet angles α2, defined between a normal to the facet and a normal (z-direction) to the plane (x-y plane), of between 52.5° and 62.5° and the second facets 53B have respective facet angles β2, defined between the normal to the facet and a normal (z-direction) to the plane (x-y plane), that vary across the array. The second facets 53B have respective facet angles, defined between a normal to the facet and a normal (z-direction) to the plane (x-y plane), of between 40° and 52.5°. Advantageously pupillation may be provided to a second display user, achieving increased uniformity.

In an alternative embodiment, both the facet angles α2, β2 vary with relative position x/L. Light rays 415A are directed towards a common window 26A that is inclined around a 45° angle to optical axis 199 by refraction at the facets 53B and total internal reflection at facets 53A. Light rays 415B are directed by refraction at the facets 53A and total internal reflection at the facets 53B towards a common optical window 26B that is near to optical axis 199.

The deflected light from each input end 2A, 2B is directed towards respective common optical windows 26A, 26B in front of the illumination apparatus. The respective common optical windows 26A, 26B are in different locations in front of the illumination apparatus.

In alternative arrangements wherein the common optical windows 26A, 26B are in the same location, increased brightness and uniformity may be achieved and for example switching between a narrow angle and wide angle mode of operation may advantageously be achieved.

In arrangements wherein the common optical windows are in different locations, different viewing locations may be provided, advantageously with increased brightness and uniformity.

Advantageously as both light rays 415A, 415B are directed to a common optical windows 26A, 26B by total internal reflection at facets 53A, 53B respectively, pupillation may be achieved with similar window distances $Z_{WA}$, $Z_{WB}$ compared to the embodiment of FIG. 17C which has different window distances.

A backlight 20 suitable for use in a switchable privacy display 100 of the type illustrated in FIG. 1C may be provided. A privacy mode to the passenger 45 may be provided so the driver 47 cannot see the displayed image by illumination of light source 15B. A low power mode to the passenger 45 may be provided by illumination of light source 15B. A low power mode to the driver 47 may be provided by illumination of light source 15A. A sharing mode to the passenger 45 and driver 47 may be provided by illumination of light sources 15A, 15B.

In an alternative embodiment of FIG. 17C, both the facet angles α3, β3 vary with relative position x/L with facet angle α3 decreasing with relative position and one facet angle 83 increasing with relative position x/L. Light rays 415A are directed towards a common window 26A that is inclined with a large angle to optical axis 199 by refraction at the facets 53B and total internal reflection at facets 53A. Light rays 415B are directed by refraction at the facets 53A and total internal reflection at the facets 53B towards a common optical window 26B that is inclined to optical axis 199 with a large angle in the opposite direction to the window 26A. Advantageously two off-axis optical windows 26A, 26B may be achieved.

Figure 17G:
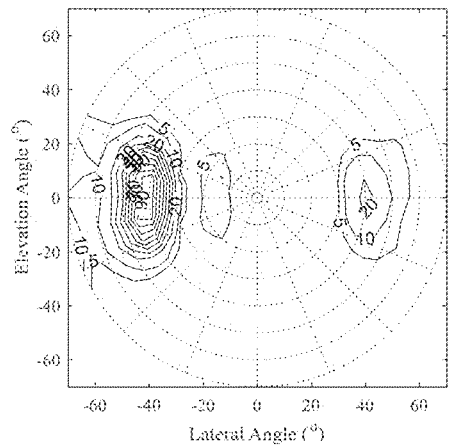
FIG. 17G is a schematic graph illustrating the polar variation of luminance for the backlight of FIG. 17A comprising the waveguide of FIG. 3 and a third optical turning film component of FIGS. 17A-C for light from the first light source.
Figure 17H:
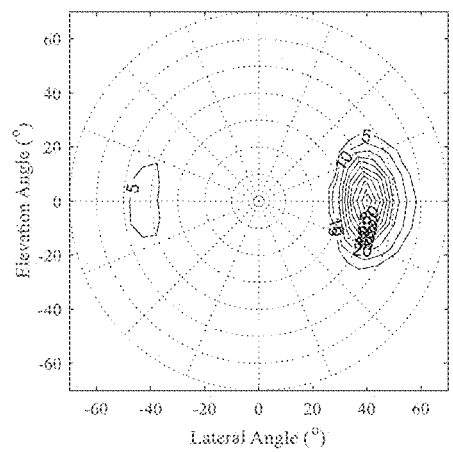
FIG. 17H is a schematic graph illustrating the polar variation of luminance for the backlight of FIG. 17A comprising the waveguide of FIG. 3 and a third optical turning film component of FIGS. 17A-C for light from the second light source.
Figure 17I:
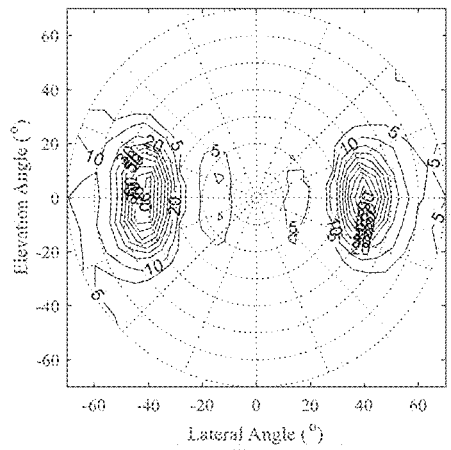
FIG. 17I is a schematic graph illustrating the polar variation of luminance for the backlight of FIG. 17A comprising the waveguide of FIG. 3 and a third optical turning film component of FIGS. 17A-C for light from the first and second light sources.

FIG. 17G is a schematic graph illustrating the polar variation of luminance for the backlight 20 of FIG. 17A comprising the waveguide 1 of FIG. 3 and the optical turning film component 50 of FIGS. 17A-C with facet 53A, 53B angles α3, β3 for light from the first light source 15A; FIG. 17H is a schematic graph illustrating the polar variation of luminance for the backlight 20 of FIG. 17A comprising the waveguide of FIG. 3 and the optical turning film component 50 with facet 53A, 53B angles α3, β3 of FIGS. 17A-C for light from the second light source 15B; and FIG. 17I is a schematic graph illustrating the polar variation of luminance for the backlight 20 of FIG. 17A comprising the waveguide of FIG. 3 and the optical turning film component 50 with facet 53A, 53B angles α3, β3 of FIGS. 17A-C for light from the first and second light sources 15A, 15B.

Referring to FIG. 17C the first facets 53A have respective facet angles α3, defined between the normal to the facet and a normal (z-direction) to the plane (x-y plane), that increase across the array with distance x/L from the input end 2A of the first waveguide 1A, and the second facets 53B having respective facet angles 63, defined between the normal to the facet and a normal (z-direction) to the plane (x-y plane), that decrease across the array with distance x/L from the input end 2A of the first waveguide 1A. The first facets 53A have respective facet angles α3, defined between a normal to the facet and a normal (z-direction) to the plane (x-y plane), of between 42.5° and 52.5° and the second facets 53B have respective facet angles β3, defined between a normal to the facet and a normal (z-direction) to the plane (x-y plane), of between 42.5° and 52.5°.

A backlight 20 suitable for use in a central automotive display 100 of the type illustrated in FIG. 1D may be provided. A low power mode to the passenger 45 may be provided by illumination of light source 15B. A low power mode to the driver 47 may be provided by illumination of light source 15A. A sharing mode to the passenger 45 and driver 47 may be provided by illumination of light sources 15A, 15B. Stray light in the vehicle 650 may be reduced to advantageously achieve increased safety during night-time driving and power efficiency is increased.

Embodiments of waveguide facets will now be described.

Figure 18A:
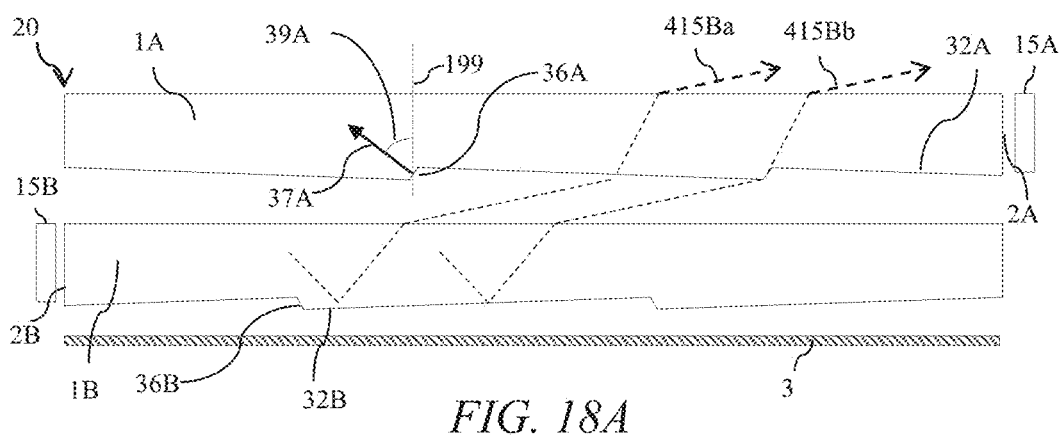
FIG. 18A is a schematic diagram illustrating a side view of a pupillated backlight for comprising first and second waveguides, each waveguide comprising gently sloped facets and steeply sloped facets with a surface normal direction that is not in the plane in which the waveguide extends.

FIG. 18A is a schematic diagram illustrating a side view of part of a pupillated backlight 20 comprising first and second waveguides 1A, 1B. Each waveguide 1A, 1B comprises gently sloped facets 32A, 32B respectively and steeply sloped facets 36A, 36B. The surface normal direction 37A of the facets 36A is not in the plane in which the waveguide 1A extends. The axis 199 is orthogonal to the plane in which the waveguide 1A extends. The facet 36A has a surface normal direction 37A that is inclined at an angle 39A to the axis 199, wherein the angle 39A is less than 90 degrees.

In an illustrative embodiment the angle 39A may be 55 degrees. More generally, the angle 39A may be at least 40 degrees and at most 70 degrees, preferably may be at least 45 degrees and at most 65 degrees and more preferably may be at least 50 degrees and at most 60 degrees.

In operation, most light rays 415Ba from the waveguide 1B are refracted and pass through the waveguide 1A with a small deviation. However some light rays 415Bb that are output from the waveguide 1B refract through the gently sloping facet 32A and are incident on the internal face of the steeply sloping facet 36A at which the light rays 415Bb undergo total internal reflection. The steeply sloping facet 36A has a surface normal direction 37A such that the totally internally reflected light rays 415Bb are in the same or a similar direction to the light rays 415Ba. Advantageously stray light is reduced and brightness is increased.

Figure 18B:
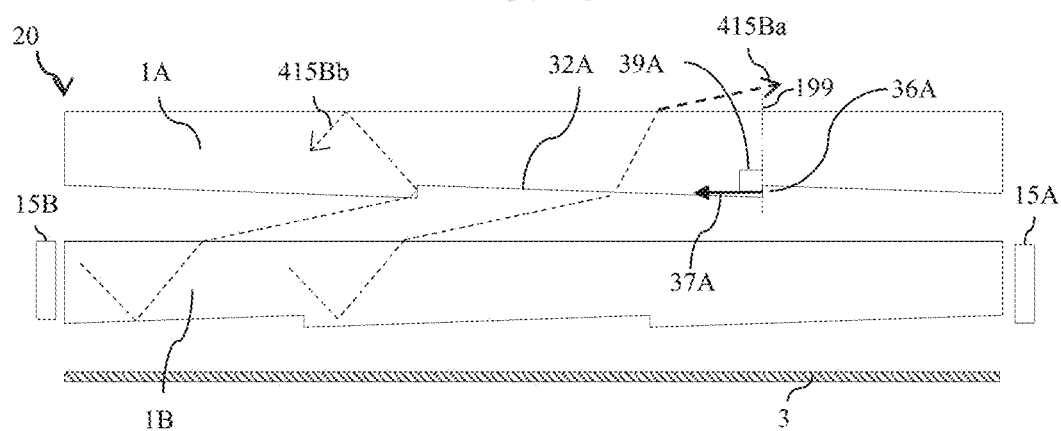
FIG. 18B is a schematic diagram illustrating a side view of a pupillated backlight for comprising first and second waveguides, each waveguide comprising gently sloped facets and steeply sloped facets with a surface normal direction that is in the plane in which the waveguide extends.

By way of comparison with the alternative of FIG. 18A, FIG. 18B is a schematic diagram illustrating a side view of a pupillated backlight 20 comprising first and second waveguides 1A, 1B wherein at least the waveguide 1A comprises steeply sloped facets 36B with a surface normal direction 37A that is in the plane in which the waveguide 1A extends. Thus the angle 39A between the axis 199 and surface normal direction 37A is substantially 90 degrees.

In operation light rays 415Bb are reflected by total internal reflection at the facet 36A and may be redirected within the waveguide 1A as illustrated. Such light rays 415Bb may provide increased stray light in undesirable polar directions that are different to the polar directions for light rays 415Ba. Luminance may be increased in undesirable polar directions, and security level of the display may be degraded.

Further light sources 17 may be provided.

Figure 18C:
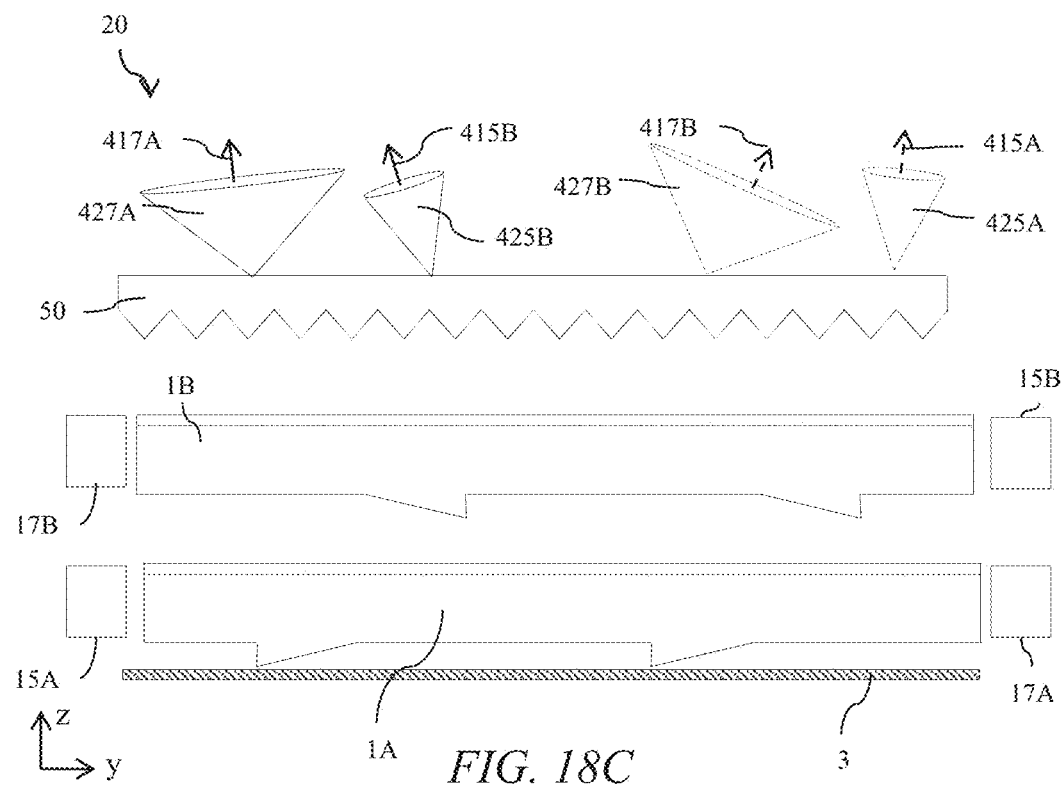
FIG. 18C is a schematic diagram illustrating a side view of a pupillated backlight for comprising first and second waveguides, each waveguide comprising a first and second light source.

FIG. 18C is a schematic diagram illustrating a side view of a pupillated backlight 20 comprising first and second waveguides 1A, 1B, each waveguide 1A, 1B comprising first and second light sources 15A, 17A and 15B, 17B respectively. Features of the embodiments of FIGS. 18A-C not discussed in further detail may be assumed to correspond to the features with equivalent reference numerals as discussed above, including any potential variations in the features.

Light rays 415A with cones 425A are directed to a first optical window 26A, such as near to a passenger 47 while light rays 415B with cones 425B are directed to a second optical window 26B, such as near to a driver 45. Further light rays 417A with cones 427A are directed to the second optical window 26B, while light rays 417B with cones 427B are directed to the first optical window 26A.

In comparison to the arrangement of FIG. 17A, the second light sources 17A, 17B may provide a switchable wide angle output at locations of driver 45 and passenger 47 of FIG. 1C. Advantageously viewing freedom of the display may be increased when light sources 17A, 17B are illuminated.

The respective common optical windows 26A, 26B may be in the same location in front of the illumination apparatus. Advantageously brightness and uniformity may be increased.

It may be desirable to provide an optical window 26 with multiple luminance maxima.

Figure 19A:
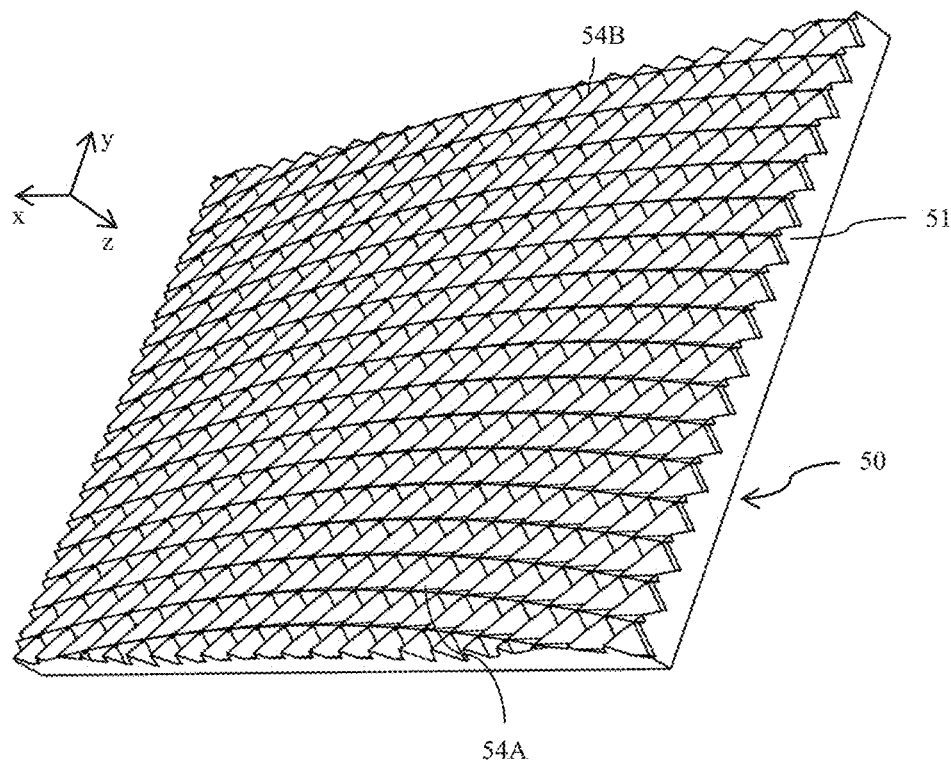
FIG. 19A is a schematic diagram illustrating a side perspective view of a turning film comprising first and second arrays of prismatic elements wherein the first array of prismatic elements comprises curved prismatic elements.
Figure 19B:
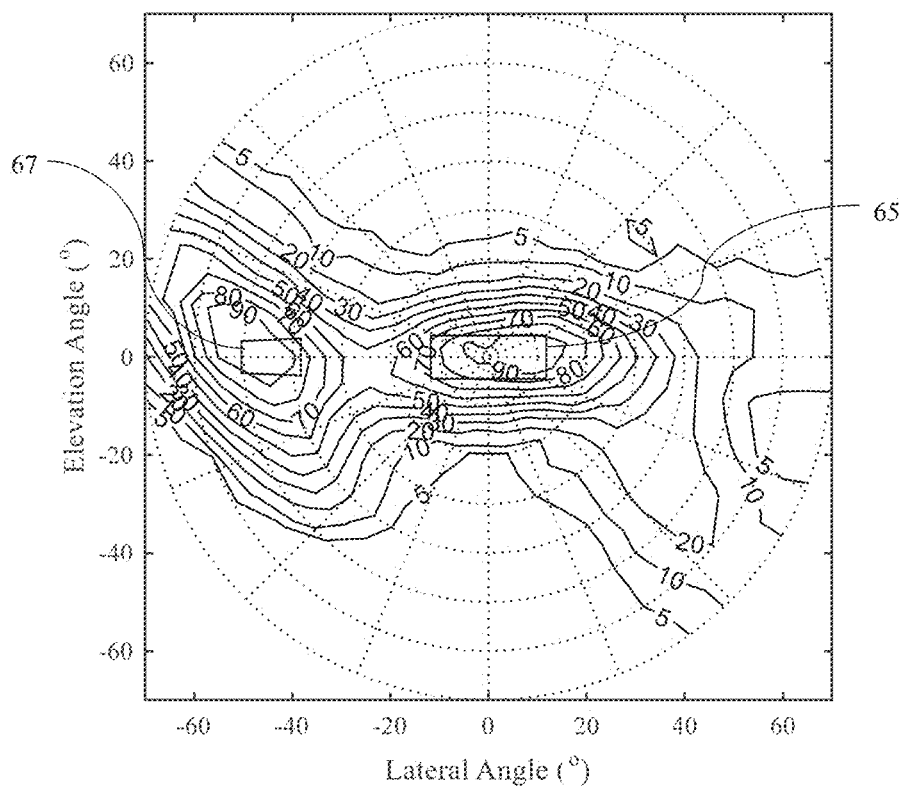
FIG. 19B is a schematic graph illustrating the polar variation of luminance for a backlight comprising the waveguide of FIG. 3 and the optical turning film component of FIG. 19A.

FIG. 19A is a schematic diagram illustrating a side perspective view of an optical turning film component 50 comprising first and second arrays of prismatic elements wherein the first array of prismatic elements comprises curved prismatic elements 51; and FIG. 19B is a schematic graph illustrating the polar variation of luminance for a backlight 20 comprising the waveguide 1 of FIG. 3 and the optical turning film component 50 of FIG. 19A. Features of the embodiment of FIG. 19A not discussed in further detail may be assumed to correspond to the features with equivalent reference numerals as discussed above, including any potential variations in the features.

The lines of ridges 54A are curved in the plane of the optical turning film component 50 while the lines of the ridges 54B are linear in the plane. As illustrated in FIG. 19B, such a film may conveniently provide desirably high luminance in the region of an on-axis user 45 with field of view 65 in an on-axis location and a second user 47 in an off-axis location with field of view 67. The pupillation of the curved ridges 54A of the optical turning film component 50 may be arranged to provide an optical window 26AB (such as illustrated in FIG. 5C) at or near the observer 45 in such that the uniformity across the field of view 65 is advantageously increased.

The pupillation of the linear ridges 54B may provide an extended window 26B such that uniformity is increased for the observer 47 with field of view 67.

In alternative embodiments both ridges 54A, 54B may have lines that are linear in the plane. Advantageously visibility of Moiré may be reduced.

In alternative embodiments either or both ridges 54A, 54B may have ridges that are curved. Advantageously uniformity may be increased for both users 45, 47.

In the embodiment and alternative embodiments of FIG. 19A, advantageously display efficiency and/or display luminance may be increased for illumination of observers with typical viewing locations. The tilts of the ridges, or the arithmetic mean tangential angle projected on to the plane for first and second ridges 54A, 54B may be adjusted to achieve location of maximum luminance and desirable observer locations.

Figure 19C:
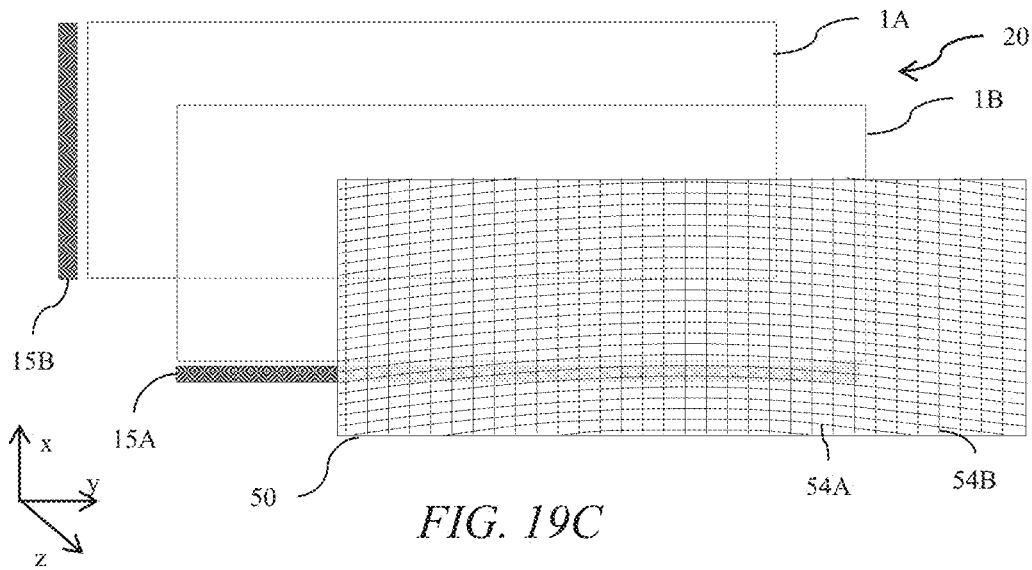
FIG. 19C is a schematic diagram illustrating a front perspective view of a pupillated backlight comprising an optical turning film with a first array of prismatic elements that is linear and a second array of prismatic elements that is curved.

FIG. 19C is a schematic diagram illustrating a front perspective view of a pupillated backlight comprising an optical turning film with a first array of prismatic elements that is linear and a second array of prismatic elements that is curved. Features of the embodiment of FIG. 19C not discussed in further detail may be assumed to correspond to the features with equivalent reference numerals as discussed above, including any potential variations in the features.

In the alternative embodiment of FIG. 19C, the light sources 15B are arranged on the left-hand side of the waveguide 1B and the light sources 15A are arranged on the lower side of the waveguide 1A.

In comparison to the light turning film component 50 of FIG. 19A, the peaks 54B are orthogonal to the lateral direction. Such peak 54B direction provides facets that in operation behave in a similar manner (but not identically) to the turning film component 50 as illustrated in FIGS. 17B-C.

In comparison to the arrangement of FIG. 17B, the embodiment of FIG. 19C may advantageously achieve increased luminance to the user 45.

Figure 19D:
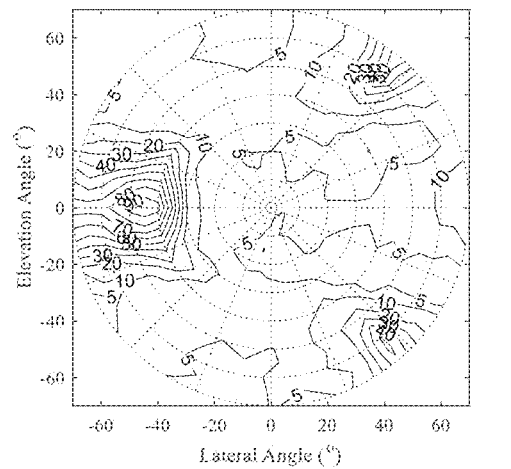
FIG. 19D is a schematic graph illustrating the polar variation of luminance for the backlight of FIG. 19C comprising the waveguide of FIG. 3 for light from the first light source.
Figure 19E:
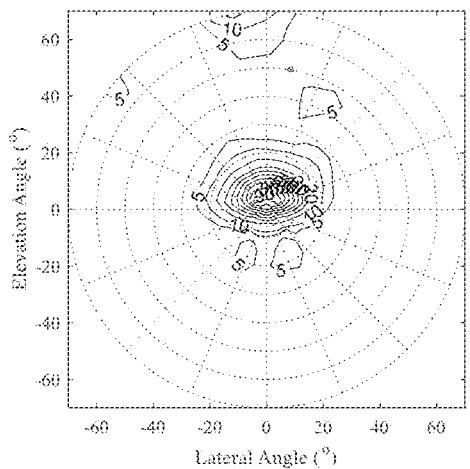
FIG. 19E is a schematic graph illustrating the polar variation of luminance for the backlight of FIG. 19C comprising the waveguide of FIG. 3 for light from the second light source.
Figure 19F:
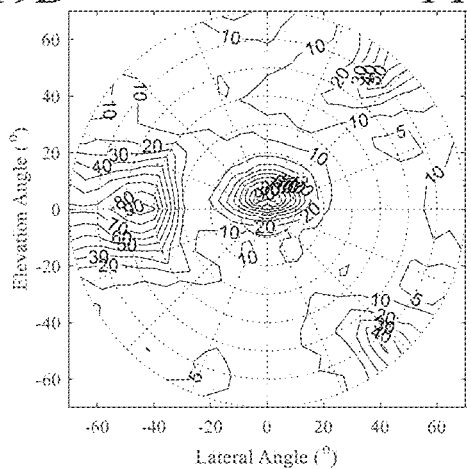
FIG. 19F is a schematic graph illustrating the polar variation of luminance for the backlight of FIG. 19C comprising the waveguide of FIG. 3 for light from the first and second light sources.

FIG. 19D is a schematic graph illustrating the polar variation of luminance for the backlight of FIG. 19C comprising the waveguide of FIG. 3 for light from the first light source 15A; FIG. 19E is a schematic graph illustrating the polar variation of luminance for the backlight of FIG. 19C comprising the waveguide of FIG. 3 for light from the second light source 15B; and FIG. 19F is a schematic graph illustrating the polar variation of luminance for the backlight of FIG. 19C comprising the waveguide of FIG. 3 for light from the first and second light sources 15A, 15B. Advantageously a backlight 20 suitable for use in a switchable privacy display 100 of the type illustrated in FIG. 1C may be provided. A privacy mode to the passenger 45 may be provided so the driver 47 cannot see the displayed image by illumination of light source 15B. A low power mode to the passenger 45 may be provided by illumination of light source 15B. A low power mode to the driver 47 may be provided by illumination of light source 15A. A sharing mode to the passenger 45 and driver 47 may be provided by illumination of light sources 15A, 15B.

It may be desirable to provide different outputs for different regions of a display.

Figure 20:
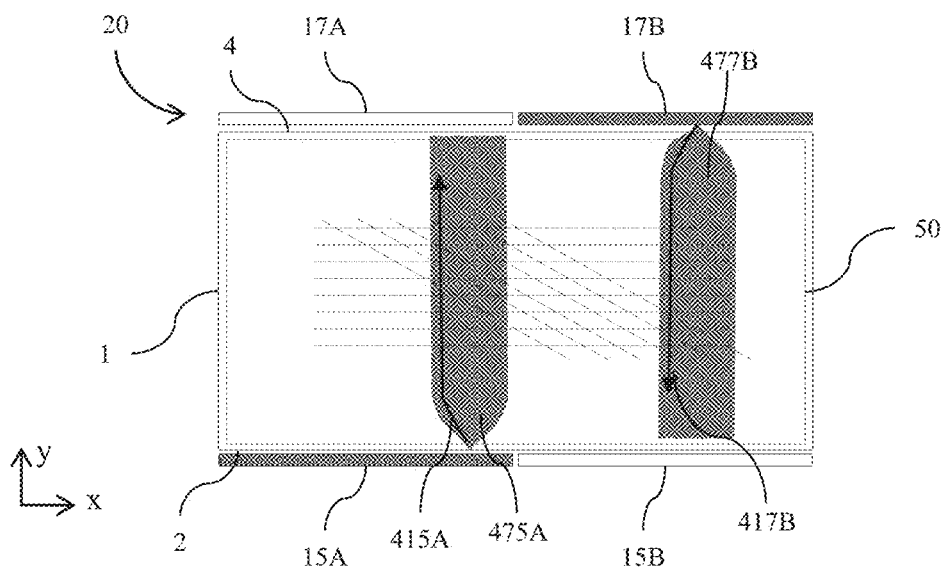
FIG. 20 is a schematic diagram illustrating a top view of a segmented backlight.

FIG. 20 is a schematic diagram illustrating a top view of some elements of a backlight 20 that is segmented. Features of the embodiment of FIG. 20 not discussed in further detail may be assumed to correspond to the features with equivalent reference numerals as discussed above, including any potential variations in the features.

First light source 15 comprises first and second parts 15A, 15B and second light source 17 comprises first and second parts 17A, 17B. Waveguide 1 may be of the type illustrated elsewhere herein, or may be first and second waveguides 1A, 1B for example as illustrated in FIG. 16B, in which case light sources 15AA, 15AB and light sources 15BA, 15BB are provided at respective ends of the waveguide.

Light rays 415A propagating within the waveguide 1 are input with an expanding cone in the lateral direction. The microstructures on the surfaces 6, 8 of the waveguide 1 adjust the ray 415A propagation directions to achieve some collimation in the lateral direction and thus illumination regions 475A are provided with limited extent in the lateral direction. Such collimation can achieve partial illumination of the backlight in regions 475A that are determined by the location of the light source along the first input end 2.

Similarly light rays 417B propagating within the waveguide 1 are input with an expanding cone in the lateral direction. Some collimation is provided in the lateral direction and thus illumination regions 477B are provided with limited extent in the lateral direction. Such collimation can achieve partial illumination of the backlight in regions 477B that are determined by the location of the light source along the input end 4.

By control of light sources 15A, 15B and 17A, 17B, the directionality of output may be different for different regions of the backlight 20. In an illustrative example, in one mode of operations, the left side of the display 100 may be arranged for high image visibility to both users 45, 47 and the right side of the display 100 may be provided for high image security factor to a snooper 47 with high image visibility to the user 45. In other illustrative modes of operation, the whole display 100 may be arranged to be seen by both users 45, 47 or the whole display 100 may be arranged to be private to the user 45.

The number of light sources 15A-N may be adjusted to increase the number of addressable regions of display control.

It may be desirable to provide a curved display.

Figure 21:
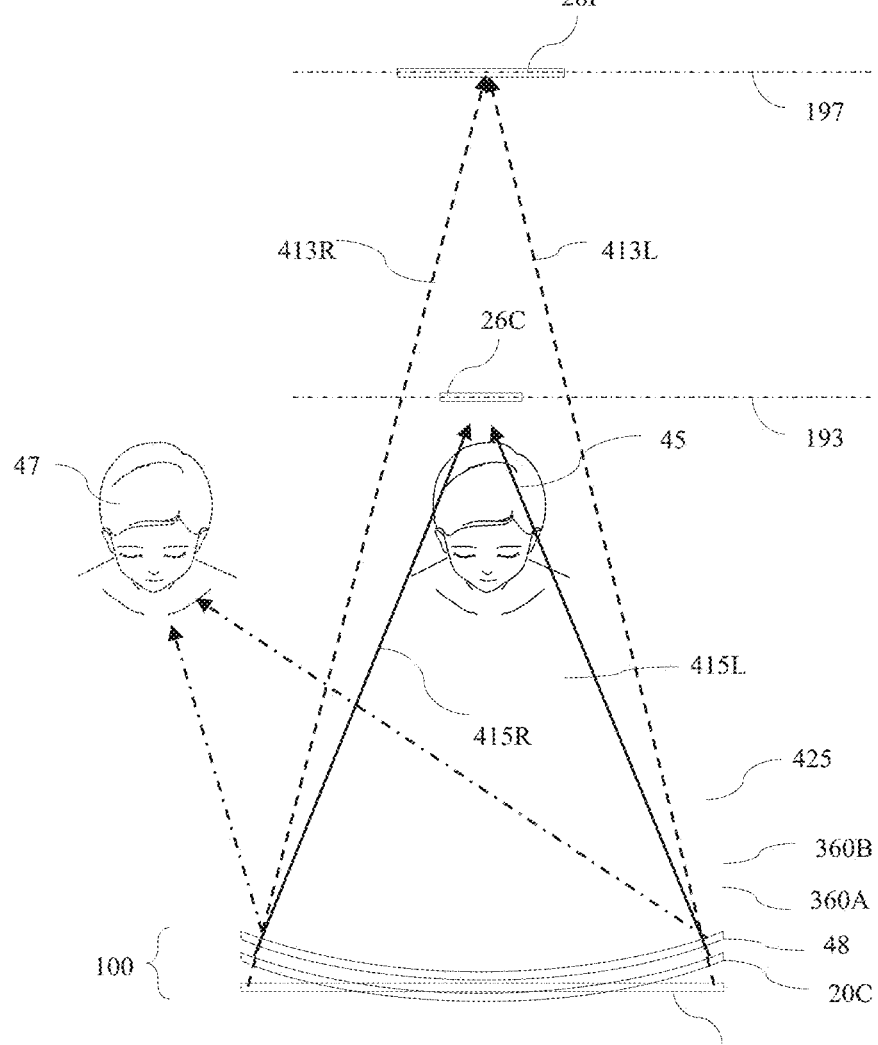
FIG. 21 is a schematic diagram illustrating atop view of a curved display comprising a light pupillating turning film.

FIG. 21 is a schematic diagram illustrating a top view of a curved display 100 comprising a light pupillating optical turning film component 50. Features of the embodiment of FIG. 21 not discussed in further detail may be assumed to correspond to the features with equivalent reference numerals as discussed above, including any potential variations in the features.

In comparison to the embodiments described elsewhere herein, the backlight 20C is curved. For comparison purposes the backlight 20F that is the backlight 20C before curving is illustrated. The backlight 20F is provided with a waveguide 1, and optical turning film component 50 that is pupillated in at least one axis (by means of variable tilt facets 53, by means of curved ridges 54 or both) to provide an optical window 26F in a window plane 197F as described elsewhere herein. After curving, backlight 20C provides a modified optical window 26C in a modified window plane 197C that is closer to the backlight than the optical window 26F.

Advantageously the curvature of the display can be provided for comfortable viewing by the user 45, and the optical window 26C can be provided for desirable image uniformity and variation of uniformity with user 45 location. Further in a privacy display, increased uniformity of security factor can be provided to off-axis snooper 47.

Operation of the switchable retarders of FIG. 1A and FIG. 1B will now be described.

Figure 22A:
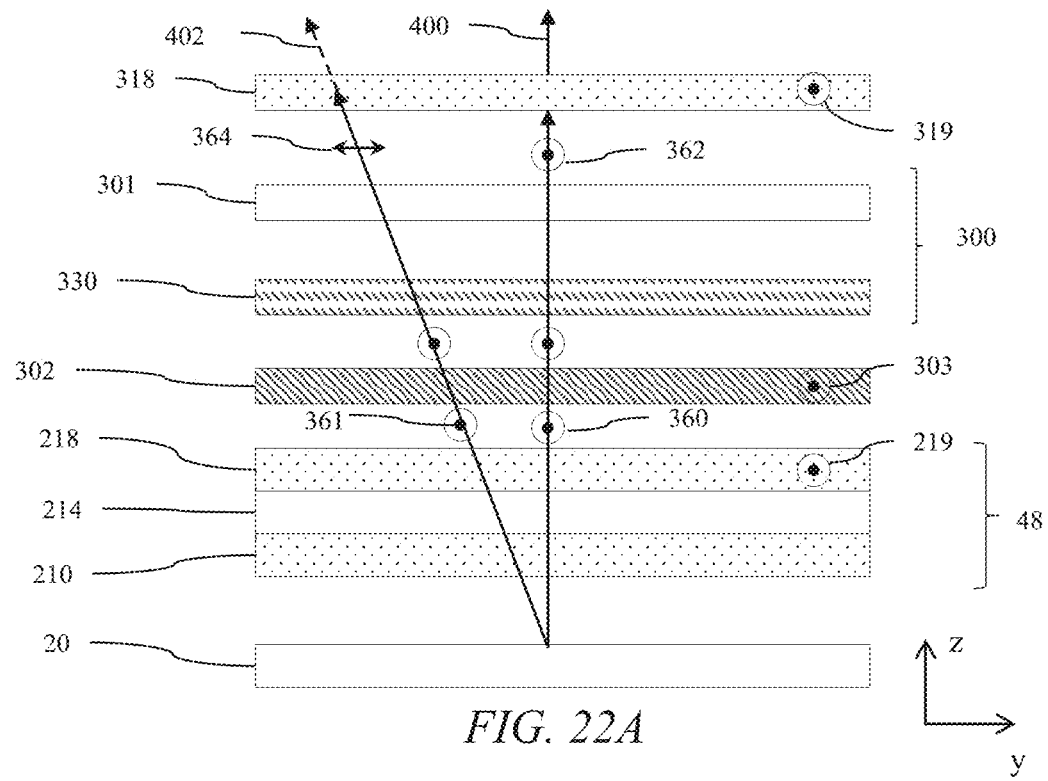
FIG. 22A is a schematic diagram illustrating in side view propagation of output light from a spatial light modulator through the optical stack of FIG. 1B in a privacy mode of operation.

FIG. 22A is a schematic diagram illustrating in side view propagation of output light from a spatial light modulator through the optical stack of FIG. 1A in a privacy mode of operation.

When the layer 314 of liquid crystal material 414 is driven to operate in the privacy mode, the retarders 300 provide no overall transformation of polarisation component 360 to output light rays 400 passing therethrough along an axis perpendicular to the plane of the switchable retarder, but provides an overall transformation of polarisation component 361 to light rays 415 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

The polar distribution of light transmission illustrated in FIG. 9A modifies the polar distribution of luminance output of the underlying spatial light modulator 48. In the case that the spatial light modulator 48 comprises a directional backlight 20 then off-axis luminance may be further be reduced as described above.

Features of the embodiment of FIG. 22A not discussed in further detail may be assumed to correspond to the features with equivalent reference numerals as discussed above, including any potential variations in the features.

Advantageously, a privacy display is provided that has low luminance to an off-axis snooper while maintaining high luminance for an on-axis observer.

The operation of the reflective polariser 302 for light from ambient light source 604 will now be described for the display operating in privacy mode.

Figure 22B:
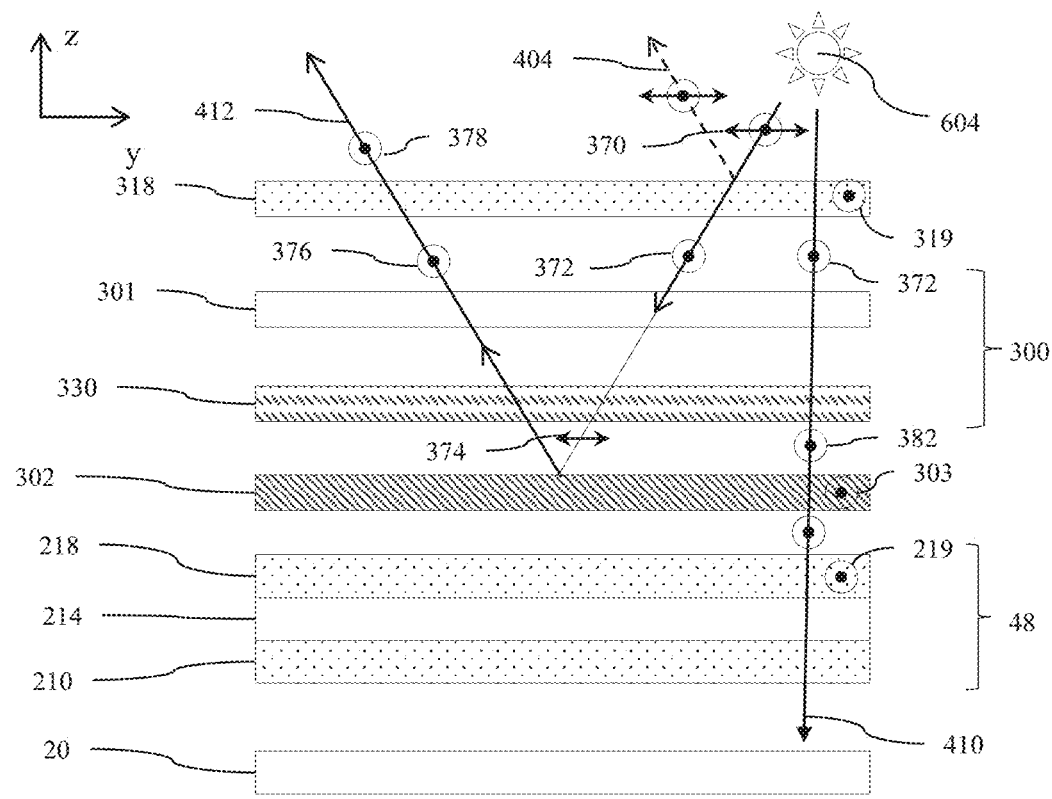
FIG. 22B is a schematic diagram illustrating in top view propagation of ambient illumination light through the optical stack of FIG. 1B in a privacy mode of operation.

FIG. 22B is a schematic diagram illustrating in top view propagation of ambient illumination light through the optical stack of FIG. 1A in a privacy mode of operation.

Ambient light source 604 illuminates the display device 100 with unpolarised light. Additional polariser 318 transmits light ray 410 normal to the display device 100 with a first polarisation component 372 that is a linear polarisation component parallel to the electric vector transmission direction 319 of the additional polariser 318.

In both states of operation, the polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 9B thus illustrates that high reflectivity can be provided at typical snooper locations by means of the privacy state of the retarders 300. Thus, in the privacy mode of operation, the reflectivity for off-axis viewing positions is increased as illustrated in FIG. 9B, and the luminance for off-axis light from the spatial light modulator is reduced as illustrated in FIG. 9A.

In the public mode of operation, the control system 710, 752, 350 is arranged to switch the switchable liquid crystal retarder 301 into a second retarder state in which a phase shift is introduced to polarisation components of light passing therethrough along an axis inclined to a normal (z-direction) to the plane (x-y plane) of the switchable liquid crystal retarder 301.

By way of comparison, solid angular extent 415D may be substantially the same as solid angular extent 415B in a public mode of operation. Such control of output solid angular extents 415C, 415D may be achieved by synchronous control of the sets 15, 17 of light sources and the at least one switchable liquid crystal retarder 300.

Advantageously a privacy mode may be achieved with low image visibility for off-axis viewing and a large solid angular extent may be provided with high efficiency for a public mode of operation, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

A transmissive spatial light modulator 48 arranged to receive the output light from the backlight; an input polariser 210 arranged on the input side of the spatial light modulator between the backlight 20 and the spatial light modulator 48, an output polariser 218 arranged on the output side of the spatial light modulator 48; an additional polariser 318 arranged on the output side of the output polariser 218; and a switchable liquid crystal retarder 300 comprising a layer 314 of liquid crystal material arranged between the at least one additional polariser 318 and the output polariser 218 in this case in which the additional polariser 318 is arranged on the output side of the output polariser 218; and a control system 710 arranged to synchronously control the light sources 15, 17 and the at least one switchable liquid crystal retarder 300.

Control system 710 further comprises control of voltage controller 752 that is arranged to provide control of voltage driver 350, in order to achieve control of switchable liquid crystal retarder 301.

Features of the embodiment of FIG. 22B not discussed in further detail may be assumed to correspond to the features with equivalent reference numerals as discussed above, including any potential variations in the features.

Advantageously, a privacy display is provided that has high reflectivity to an off-axis snooper while maintaining low reflectivity for an on-axis observer. As described above, such increased reflectivity provides enhanced privacy performance for the display in an ambiently illuminated environment.

Operation in the public mode will now be described.

Figure 23A:
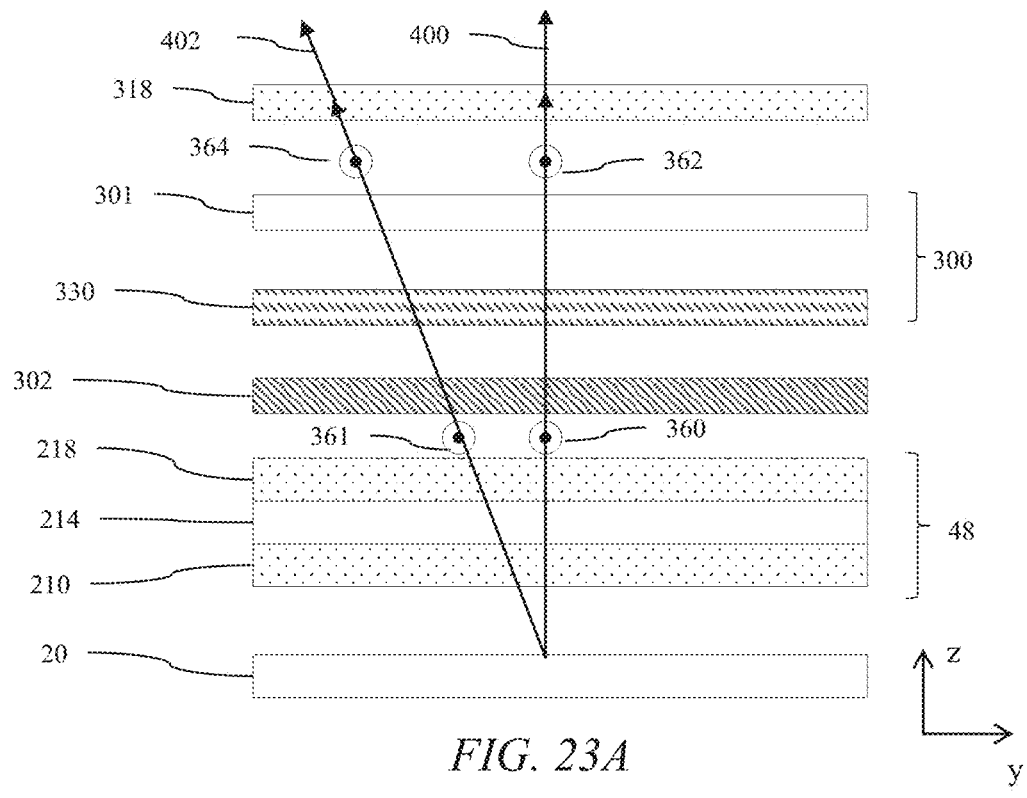
FIG. 23A is a schematic diagram illustrating in side view propagation of output light from a spatial light modulator through the optical stack of FIG. 1B in a public mode of operation.
Figure 23B:
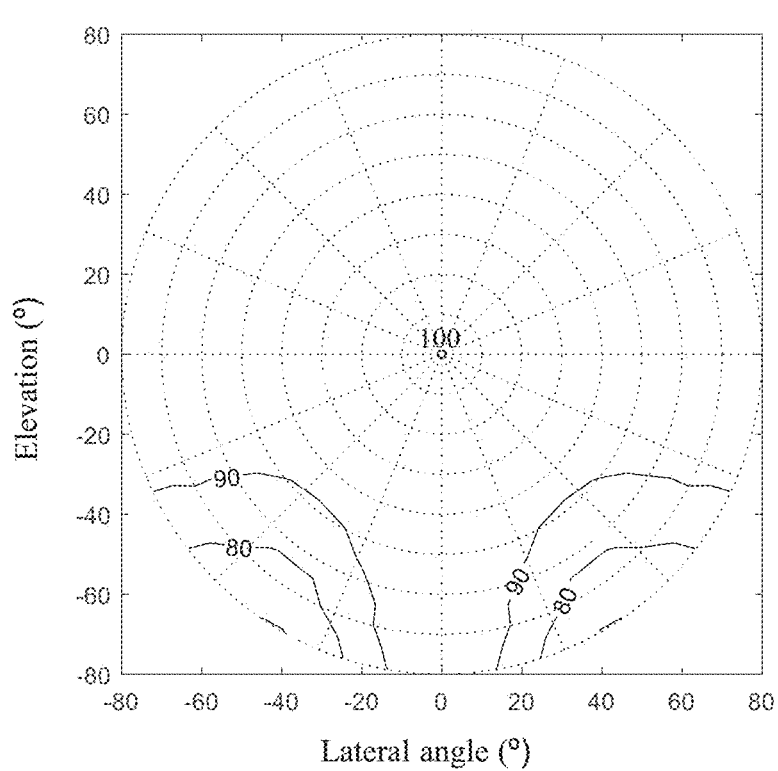
FIG. 23B is a schematic graph illustrating the variation of output luminance with polar direction for the transmitted light rays in FIG. 23A.

FIG. 23A is a schematic diagram illustrating in side view propagation of output light from a spatial light modulator through the optical stack of FIG. 1A in a public mode of operation; and FIG. 23B is a schematic graph illustrating the variation of output luminance with polar direction for the transmitted light rays in FIG. 23A.

Features of the embodiment of FIG. 23A and FIG. 23B not discussed in further detail may be assumed to correspond to the features with equivalent reference numerals as discussed above, including any potential variations in the features.

When the liquid crystal retarder 301 is in a first state of said two states, the polar control retarder 300 provides no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 23B is substantially uniformly transmitting across a wide polar region. Advantageously a display may be switched to a wide field of view.

Figure 23C:
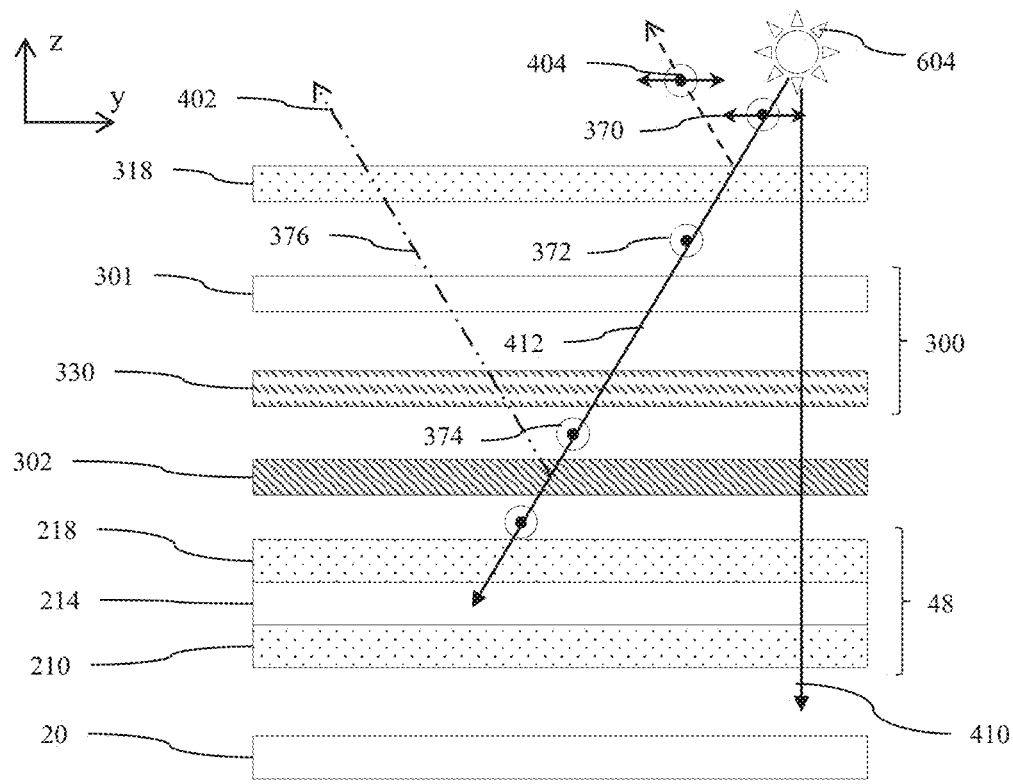
FIG. 23C is a schematic diagram illustrating in top view propagation of ambient illumination light through the optical stack of FIG. 1B in a public mode of operation.
Figure 23D:
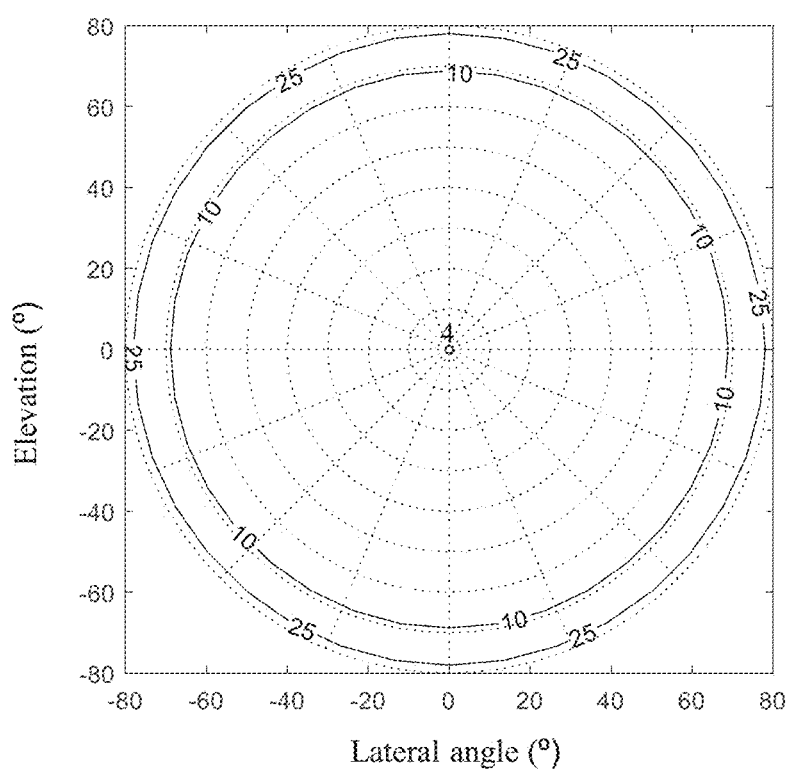
FIG. 23D is a schematic graph illustrating the variation of reflectivity with polar direction for the reflected light rays in FIG. 23C.

FIG. 23C is a schematic diagram illustrating in top view propagation of ambient illumination light through the optical stack of FIG. 1A in a public mode of operation; and FIG. 23D is a schematic graph illustrating the variation of reflectivity with polar direction for the reflected light rays in FIG. 23C.

Thus when the liquid crystal retarder 301 is in the first state of said two states, the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in the public mode, input light ray 412 has polarisation state 372 after transmission through the additional polariser 318. For both head-on and off-axis directions no polarisation transformation occurs and thus the reflectivity for light rays 415 from the reflective polariser 302 is low. Light ray 412 is transmitted by reflective polariser 302 and lost in the display polarisers 218, 210 or the backlight of FIG. 1A.

Features of the embodiment of FIG. 23C and FIG. 23D not discussed in further detail may be assumed to correspond to the features with equivalent reference numerals as discussed above, including any potential variations in the features.

Advantageously in a public mode of operation, high luminance and low reflectivity is provided across a wide field of view. Such a display can be conveniently viewed with high contrast by multiple observers.

Other types of switchable privacy display will now be described.

A display device 100 that may be switched between privacy and public modes of operation comprises an imaging waveguide and an array of light sources as described in U.S. Pat. No. 9,519,153, which is incorporated by reference herein in its entirety. The imaging waveguide images an array of light sources to optical windows that may be controlled to provide high luminance on-axis and low luminance off-axis in a privacy mode, and high luminance with a large solid angle cone for public operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An illumination apparatus comprising:
at least one light source arranged to provide input light;
a waveguide arrangement comprising at least a first waveguide that extends across a plane and comprises:
first and second opposed light guiding surfaces arranged to guide light along the first waveguide, the second light guiding surface being arranged to guide light by total internal reflection; and
an input end arranged between the first and second light guiding surfaces and extending in a lateral direction between the first and second light guiding surfaces,
the first waveguide being arranged to receive the input light from the at least one light source through the input end, and being arranged to cause light from the at least one light source to exit from the first waveguide through the second light guiding surface by breaking total internal reflection; and
an optical turning film component comprising:
an input surface arranged to receive the light exiting from the first waveguide, the input surface extending across the plane; and
an output surface facing the input surface,
wherein the input surface comprises:
an array of prismatic elements each comprising a pair of facets defining a ridge therebetween, the ridges extending along an array of lines across the plane in which the input surface extends, wherein the prismatic elements are arranged to deflect the light exiting the first waveguide, the deflection varying in at least one direction across the plane so that the deflected light is directed from a virtual common optical window behind the illumination apparatus.

2. An illumination apparatus according to claim 1, wherein the lines are curved across the plane so that the deflection varies in a direction that is orthogonal to an optical axis normal to the plane and corresponds to the lateral direction.

3. An illumination apparatus according to claim 1, wherein the facets have respective facet angles, defined between a normal to the facet and a normal to the plane, that vary across the array so that the deflection varies in a direction that is orthogonal to an optical axis normal to the plane and corresponds to a direction orthogonal to the lateral direction.

4. An illumination apparatus according to claim 1, wherein the lines of the array have an arithmetic mean tangential angle projected on to the plane of 0° from the lateral direction.

5. An illumination apparatus according to claim 1, wherein the lines of the array have an arithmetic mean tangential angle projected on to the plane that is inclined at more than 0° from the lateral direction.

6. An illumination apparatus according to claim 1, wherein the optical turning film component has a rectangular shape across the plane and the lateral direction is along a major or minor axis of the rectangular shape.

7. An illumination apparatus according to claim 1, wherein the output surface is planar.

8. An illumination apparatus according to claim 1, wherein the facets have respective facet angles, defined between a normal to the facet and a normal to the plane, of between 40° and 70°, preferably between 42.5° and 65°, and more preferably between 42.5° and 62.5°.

9. An illumination apparatus according to claim 1, wherein at least some of the facets have respective facet angles, defined between a normal to the facet and a normal to the plane, of between 52.5° and 62.5°.

10. An illumination apparatus according to claim 1, wherein in respect of at least some of the facets have respective facet angles, defined between a normal to the facet and a normal to the plane, of between 42.5° and 52.5°.

11. An illumination apparatus according to claim 1, wherein at least some of the facets have respective facet angle, defined between a normal to the facet and a normal to the plane, of between 40° and 52.5°.

12. An illumination apparatus according to claim 1, wherein in each pair of facets, a first facet has a normal on the internal side of the input surface that is inclined towards the input end of the first waveguide and a second facet has a normal on the internal side of the input surface that is inclined away from the input end of the first waveguide, the first facets having respective facet angles, defined between the normal to the facet and a normal to the plane, that vary across the array so that the deflection varies in a direction that is orthogonal to an optical axis normal to the plane and corresponds to a direction orthogonal to the lateral direction.

13. An illumination apparatus according to claim 12, wherein the first facets have respective facet angles, defined between a normal to the facet and a normal to the plane, of between 52.5° and 62.5°.

14. An illumination apparatus according to claim 12, wherein the second facets have respective facet angles, defined between the normal to the facet and a normal to the plane, that are constant across the array.

15. An illumination apparatus according to claim 12, wherein the second facets have respective facet angles, defined between the normal to the facet and a normal to the plane, that vary across the array.

16. An illumination apparatus according to claim 12, wherein the second facets have respective facet angles, defined between a normal to the facet and a normal to the plane, of between 40° and 52.5°.

17. An illumination apparatus according to claim 12, wherein the first facets have respective facet angles, defined between the normal to the facet and a normal to the plane, that increase across the array with distance from the input end, and the second facets having respective facet angles, defined between the normal to the facet and a normal to the plane, that decrease across the array with distance from the input end.

18. An illumination apparatus according to claim 17, wherein the first facets have respective facet angles, defined between a normal to the facet and a normal to the plane, of between 42.5° and 52.5° and the second facets have respective facet angles, defined between a normal to the facet and a normal to the plane, of between 42.5° and 52.5°.

19. An illumination apparatus according to claim 1, wherein the at least one light source comprises an array of light sources arrayed across the input end.

20. An illumination apparatus according to claim 1, wherein the common optical window is aligned with an optical axis that extends from the centre of the optical turning film component normal to the plane.

21. An illumination apparatus according to claim 1, wherein the common optical window is offset from an optical axis that extends from the centre of the optical turning film component normal to the plane.

22. An illumination apparatus according to claim 1, wherein the first waveguide further comprises a second input end arranged between the first and second light guiding surfaces opposite to the first mentioned input end, and the illumination apparatus further comprises at least one second light source arranged to input light into the waveguide through the second input end in an opposite direction from the at least one first mentioned light source.

23. An illumination apparatus according to claim 22, further comprising a control system arranged to control the at least one first light source and the at least one second light source independently.

24. An illumination apparatus according to claim 23, wherein in one mode of operation the control system is arranged to provide illumination from both the at least one first light source and the at least one second light sources so as to increase spatial uniformity of illumination across the illumination device for at least one viewing location.

25. An illumination apparatus according to claim 22, wherein the waveguide is arranged to cause light from the at least one first light source and the at least one second light source to exit from the waveguide with different angular distributions.

26. An illumination apparatus according to claim 22, wherein the waveguide is arranged to cause light from the at least one first light source and the at least one second light source to exit from the waveguide with a common angular distribution.

27. A backlight apparatus comprising:
an illumination apparatus according to claim 1; and
a rear reflector arranged to receive light exiting from the first surface of waveguide and direct it back through the waveguide.

28. A display apparatus comprising:
a backlight apparatus according to claim 27; and
a spatial light modulator arranged to receive light from the backlight apparatus.

29. A display apparatus according to claim 28, further comprising:
at least one display polariser arranged on a side of the spatial light modulator;
an additional polariser arranged on the same side of the spatial light modulator as the display polariser; and
at least one polar control retarder arranged between the display polariser and the additional polariser, the at least one polar control retarder including a switchable liquid crystal retarder comprising a layer of liquid crystal material.

30. A vehicle having a display apparatus according to claim 29 mounted therein.

31. An optical turning film component comprising:
an input surface for receiving light exiting from a waveguide through a light guiding surface of the waveguide by breaking total internal reflection, the input surface extending across a plane; and
an output surface facing the input surface,
wherein the input surface comprises:
an array of prismatic elements each comprising a pair of facets defining a ridge therebetween, the ridges extending along an array of lines across the plane in which the input surface extends, wherein the prismatic elements are arranged to deflect the light exiting the waveguide, the deflection varying in at least one direction across the plane so that the deflected light is directed from a virtual common optical window behind the illumination apparatus.

32. An optical turning film component according to claim 31, wherein the lines are curved across the plane so that the deflection varies in a direction orthogonal to an optical axis that is normal to the plane and corresponds to the lateral direction.

33. An optical turning film component according to claim 31, wherein the facets have respective facet angles, defined between a normal to the facet and a normal to the plane, that vary across the array so that the deflection varies in a direction that is orthogonal to an optical axis normal to the plane and corresponds to a direction orthogonal to the lateral direction.

34. An optical turning film component according to claim 31, wherein the lines of the array have an arithmetic mean tangential angle projected on to the plane of 0° from the lateral direction.

35. An optical turning film component according to claim 31, wherein the lines of the array have an arithmetic mean tangential angle projected on to the plane that is inclined at more than 0° from the lateral direction.

36. An optical turning film component according to claim 31, wherein the optical turning film component has a rectangular shape across the plane and the lateral direction is along a major or minor axis of the rectangular shape.

37. An optical turning film component according to claim 31, wherein the output surface is planar.

38. An optical turning film component according to claim 31, wherein the facets have respective facet angles, defined between a normal to the facet and a normal to the plane, of between 40° and 70°, preferably between 42.5° and 65°, and more preferably between 42.5° and 62.5°.

39. An optical turning film component according to claim 31, wherein at least some of the facets have respective facet angles, defined between a normal to the facet and a normal to the plane, of between 52.5° and 62.5°.

40. An optical turning film component according to claim 31, wherein in respect of at least some of the facets have respective facet angles, defined between a normal to the facet and a normal to the plane, of between 42.5° and 52.5°.

41. An optical turning film component according to claim 31, wherein at least some of the facets have respective facet angles Vie, defined between a normal to the facet and a normal to the plane, of between 40° and 52.5°.

42. An optical turning film component according to claim 31, wherein in each pair of facets, a first facet has a normal on the internal side of the input surface that is inclined towards a first side of the optical turning film and a second facet has a normal on the internal side of the input surface that is inclined towards a second side of the optical turning film opposite to the first end, the first facets having respective facet angles, defined between the normal to the facet and a normal to the plane, that vary across the array so that the deflection varies in a direction that is orthogonal to an optical axis normal to the plane and corresponds to a direction orthogonal to the lateral direction.

43. An optical turning film component according to claim 42, wherein the first facets have respective facet angles, defined between a normal to the facet and a normal to the plane, of between 52.5° and 62.5°.

44. An optical turning film component according to claim 42, wherein the second facets have respective facet angles, defined between the normal to the facet and a normal to the plane, that are constant across the array.

45. An optical turning film component according to claim 42, wherein the second facets have respective facet angles, defined between the normal to the facet and a normal to the plane, that vary across the array.

46. An optical turning film component according to claim 42, wherein the second facets have respective facet angles, defined between a normal to the facet and a normal to the plane, of between 40° and 52.5°.

47. An optical turning film component according to claim 42, wherein the first facets have respective facet angles, defined between the normal to the facet and a normal to the plane, that increase across the array in a direction from the first side to the second side, and the second facets having respective facet angles, defined between the normal to the facet and a normal to the plane, that decrease across the array in direction from the first side to the second side.

48. An optical turning film component according to claim 47, wherein the first facets have respective facet angles, defined between a normal to the facet and a normal to the plane, of between 42.5° and 52.5° and the second facets have respective facet angles, defined between a normal to the facet and a normal to the plane, of between 42.5° and 52.5°.

49. An optical turning film component according to claim 31, wherein the common optical window is aligned with an optical axis that extends from the centre of optical turning film component normal to the plane.

50. An optical turning film component according to claim 31, wherein the common optical window is offset from an optical axis that extends from the centre of optical turning film component normal to the plane.

51. An optical turning film component according to claim 31, wherein the lines are straight and facet angles of respective facets, defined between a normal to the facet and a normal to the plane, vary across the array so that the deflection varies in a direction orthogonal to the optical axis corresponding to a direction orthogonal to the lateral direction.

* * * * *